United States Patent [19]
De Greef et al.

[11] Patent Number: 6,078,745
[45] Date of Patent: Jun. 20, 2000

[54] METHOD AND APPARATUS FOR SIZE OPTIMIZATION OF STORAGE UNITS

[75] Inventors: Eddy De Greef, Erps-Kwerps; Francky Catthoor, Temse; Hugo De Man, Leuven, all of Belgium

[73] Assignee: Siemens AG, Munich, Germany

[21] Appl. No.: 09/049,699

[22] Filed: Mar. 27, 1998

Related U.S. Application Data

[60] Provisional application No. 60/045,232, Mar. 29, 1997, and provisional application No. 60/041,793, Apr. 2, 1997.

[51] Int. Cl.$^7$ .................................................. G06F 12/06
[52] U.S. Cl. .......................................... 395/705; 395/707
[58] Field of Search .................................... 395/705, 709

[56] References Cited

U.S. PATENT DOCUMENTS

| | | | |
|---|---|---|---|
| 5,794,049 | 8/1998 | Lindholm | 395/706 |
| 5,805,863 | 9/1998 | Chang | 395/500 |
| 5,848,275 | 12/1998 | Maydan et al. | 395/705 |
| 5,872,990 | 2/1999 | Luick et al. | 395/800.24 |
| 5,875,340 | 2/1999 | Quarnstrom et al. | 395/733 |

OTHER PUBLICATIONS

Lefebvre, Vincent, et al., "Storage Management in Parallel Programs," *5th Euromicor Workshop on Parrellel & Distributed Processing*, pp. 1–8, Jan. 1997.

Feautrier, Paul, "Dataflow Analysis of Array and Scalar References," *International Journal of Parallel Programming*, 20(1), pp. 23–53, 1991.

Polychronopoulos, Constantine D., "Compiler Optimizations for Enhancing Parallelism and Their Impact on Architecture Design," *IEEE Transactions on Computers*, 37(8), pp. 991–1004, Aug. 1988.

Li, Wei, et al., "A Singular Loop Transformation Framework Based on Non–singular Matrices," Proceedings of the Fifth Annual Workshop on Language and Compilers for Parallelism, pp. 1–22, Aug. 1992.

Weijia, Shang, et al., "Generalized Cycle Shrinking," *Algorithms and Parallel VLSI Architectures II*, pp. 131–144, 1992.

Swaaij, Michaël F.X.B. van, et al., "Automating High Level Control Flow Transformations For DSP Memory Management," Proceedings of the IEEE Workshop on VLSI Signal Processing, 11 pages, Oct. 1992.

Darte, Alain, et al., "Loop nest scheduling and transformations," *Advances in Parallel Computing 6*, pp. 1–24, 1993.

Lengauer, Christian, "Loop Parallelization in the Polytope Model," Proceedings of the Fourth International Conference on Concurrency Theory (CONCUR93), pp. 1–19, Aug. 1993.

(List continued on next page.)

*Primary Examiner*—Reba I. Elmore
*Attorney, Agent, or Firm*—Knobbe Martens Olson & Bear LLP

[57] ABSTRACT

The present invention provides a method and an apparatus for reducing the storage size required for temporary data by storage order optimization. Advantageously, the execution order optimization and the storage order optimization may be treated independently. The storage size optimization is preferably performed by determining an optimum intra-array and/or inter-array storage order based on a geometrical model. The geometrical model provides a representation of the address space occupied by an array as a function of time and allows the calculation of the window size of the occupied address/time domain of the array. Where calculations would be time-consuming, these may be shortened by making simplifying assumptions, e.g. calculation of upper and lower bounds of the window size of the occupied address/time domain of an array rather than an exact calculation. Further, heuristical simplifications are described to reduce run-times for the optimization process.

31 Claims, 48 Drawing Sheets

OTHER PUBLICATIONS

Franssen, Frank H.M., et al., "Modeling Piece–wise Linear and Data dependent Signal Indexing for Multi–dimensional Signal Processing," Proceedings of the Sixth ACM/IEEE International Workshop on High Level Synthesis, pp. 245–255, Nov. 1992.

Balasa, Florin, et al., "Transformation of Nested Loops with Modulo Indexing to Affine Recurrences," *Parrellel Processing Letters*, 4(3), pp. 1–12, Dec. 1994.

Wilde, Dorna, et al., "Memory Reuse Analysis in the Polyhedral Model," Proceedings of Euro–Par '96, pp. 389–397, Aug. 1996.

Mumcuoglu et al. Accurate Geometric and Physical Response Modeling for Statistical Image Reconstruction in High Resolution PET. Nov. 1996. p. 1569–73. IEEE.

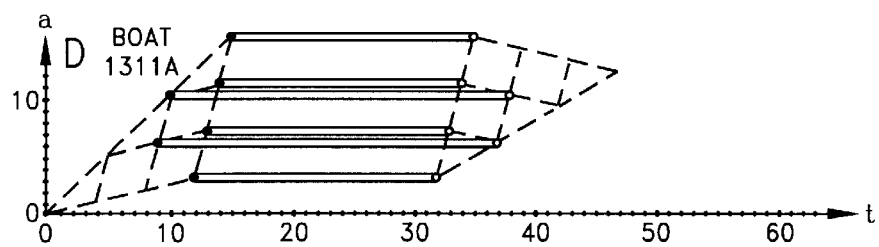
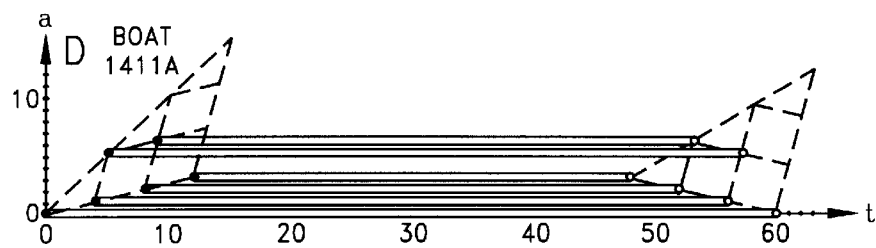
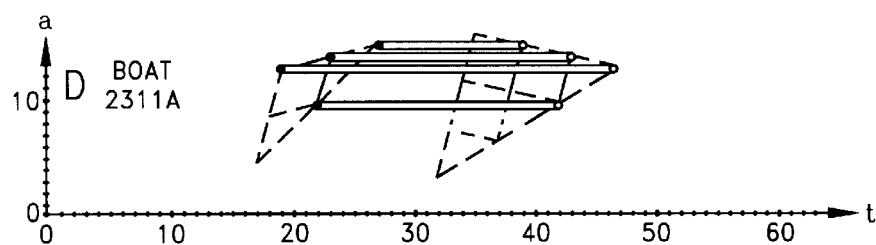
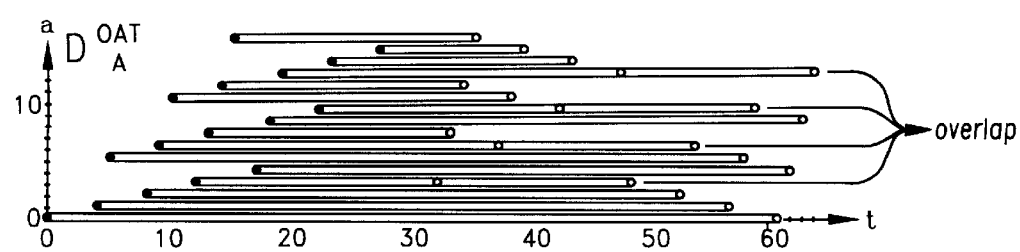
FIG. 6

FIG. 12B
FIG. 12A
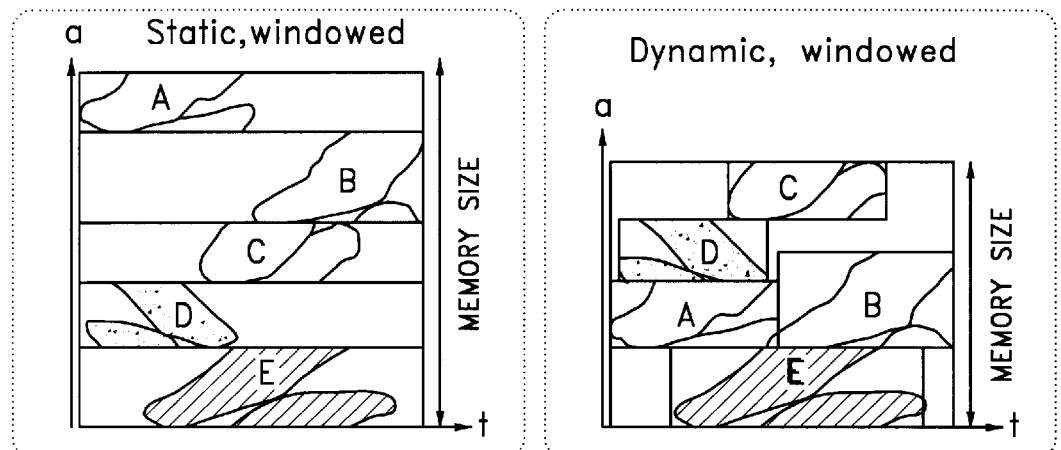
$$A^{real}_x = A^{abstr}_x \mod W_x + C_x$$
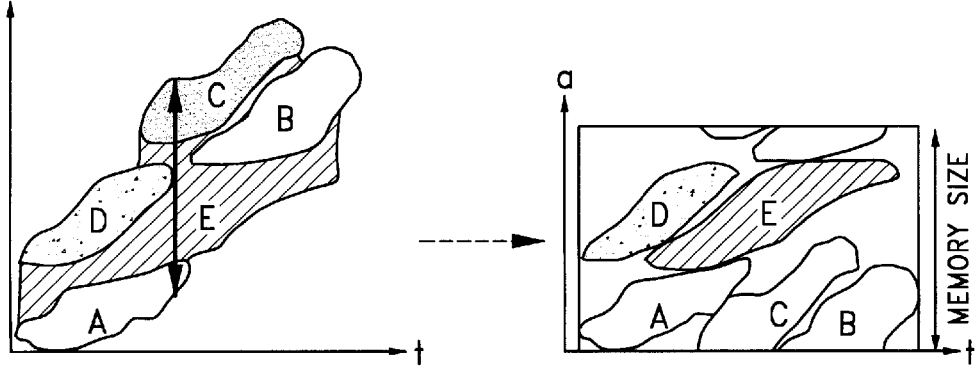
$$A^{real}_x = (S_x * A^{abstr}_x + C_x) \mod W$$
FIG. 13

☐ occupied address/time tuples
☐ "lost" address/time tuples

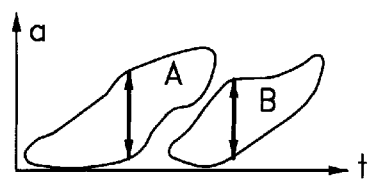
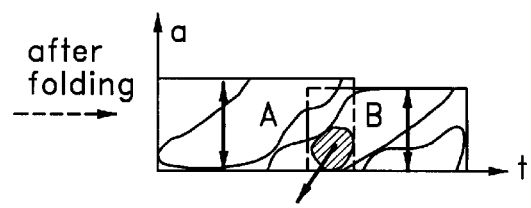
*FIG.27A*  *FIG.27B*
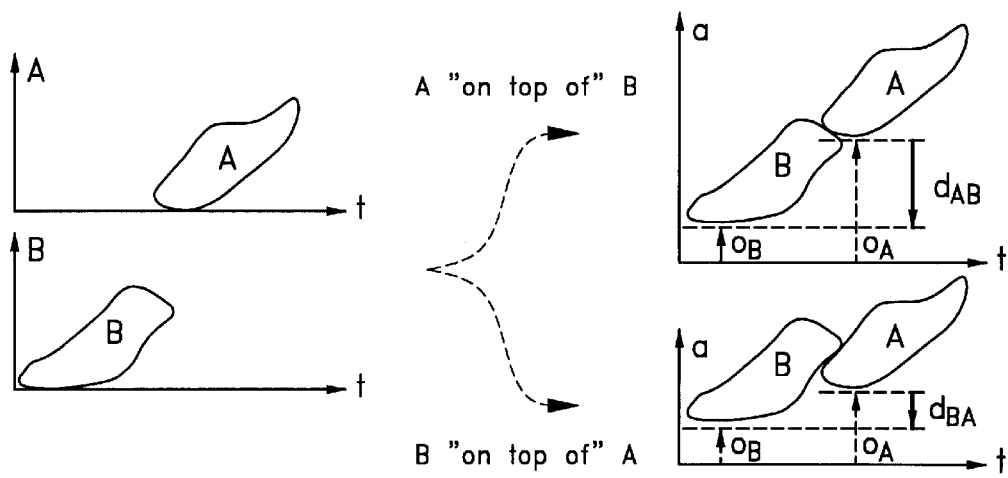
*FIG.28*
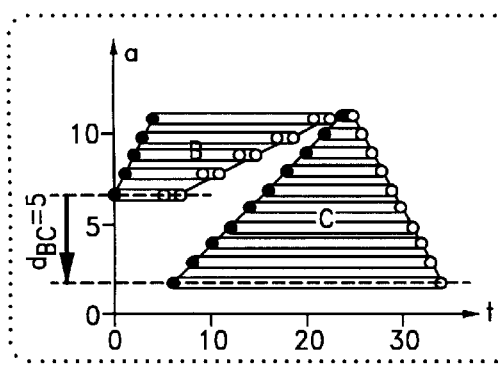
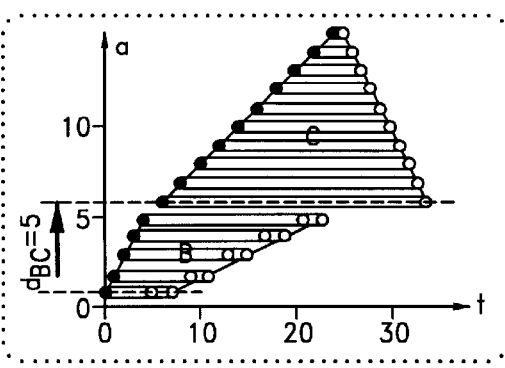
*FIG.29A*  *FIG.29B*

▦ Placement, splitting disabled
▧ Window calculation, splitting disabled
▨ Placement, splitting enabled
▩ Window calculation, splitting enabled

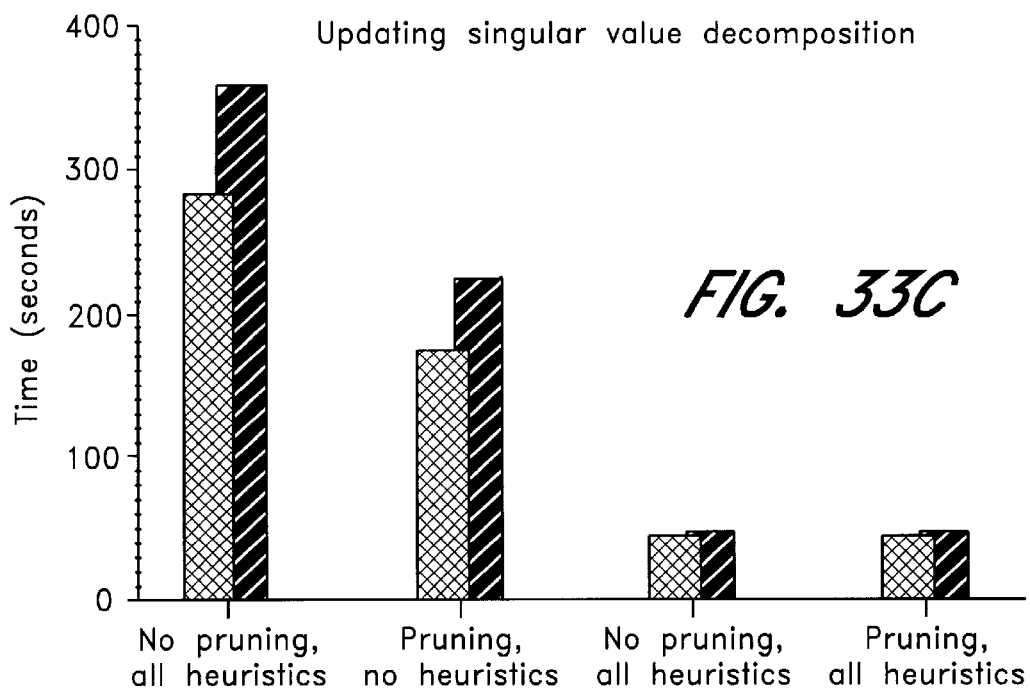
FIG. 33C
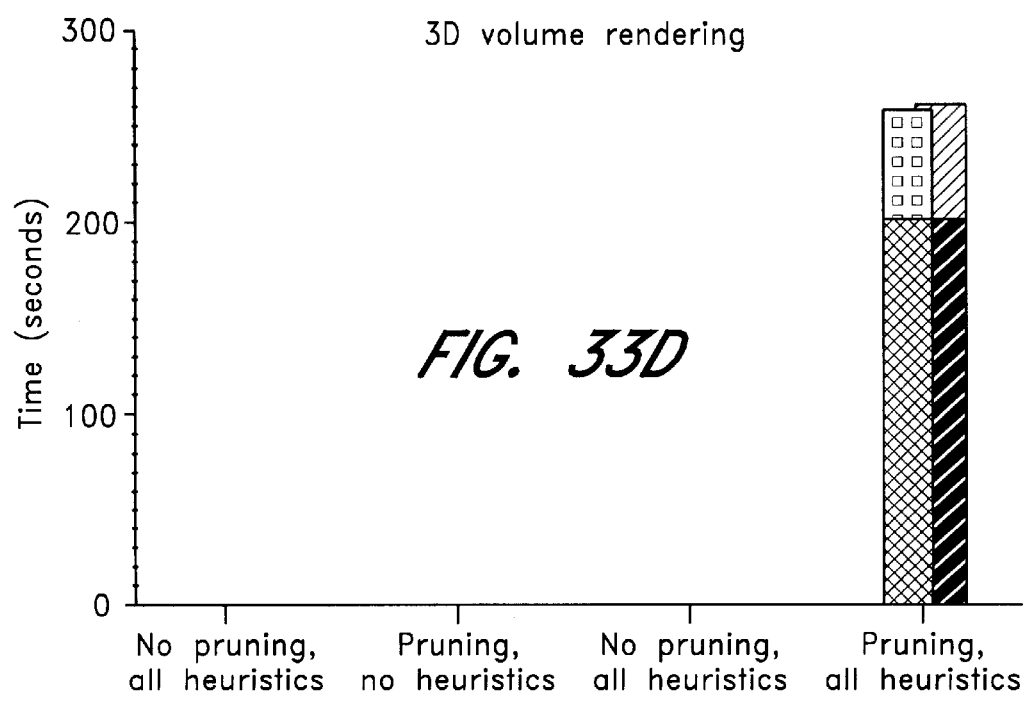
FIG. 33D
 Placement, splitting disabled
 Window calculation, splitting disabled
 Placement, splitting enabled
 Window calculation, splitting enabled

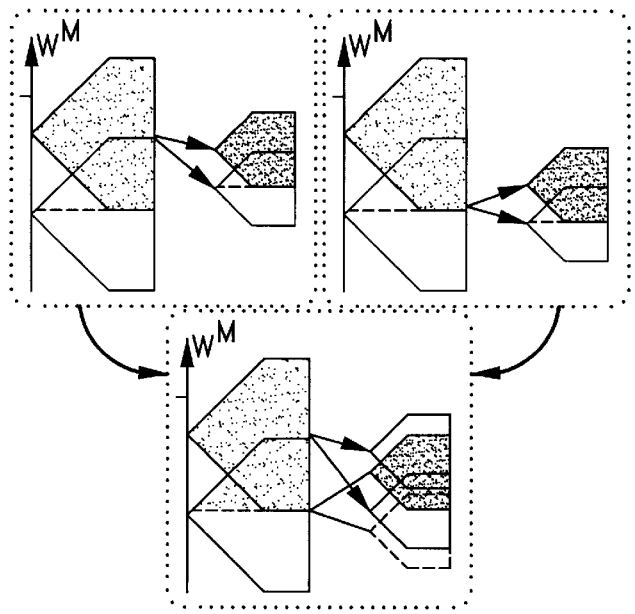
*FIG. 48A*  *FIG. 48B*
*FIG. 48C*
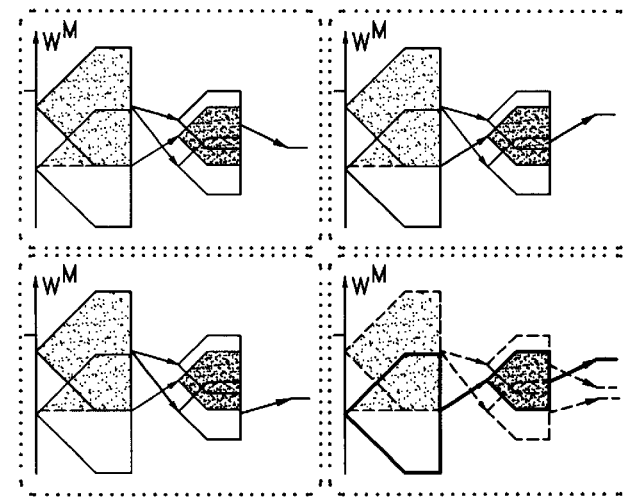
*FIG. 49A*  *FIG. 49B*
*FIG. 49C*  *FIG. 49D*

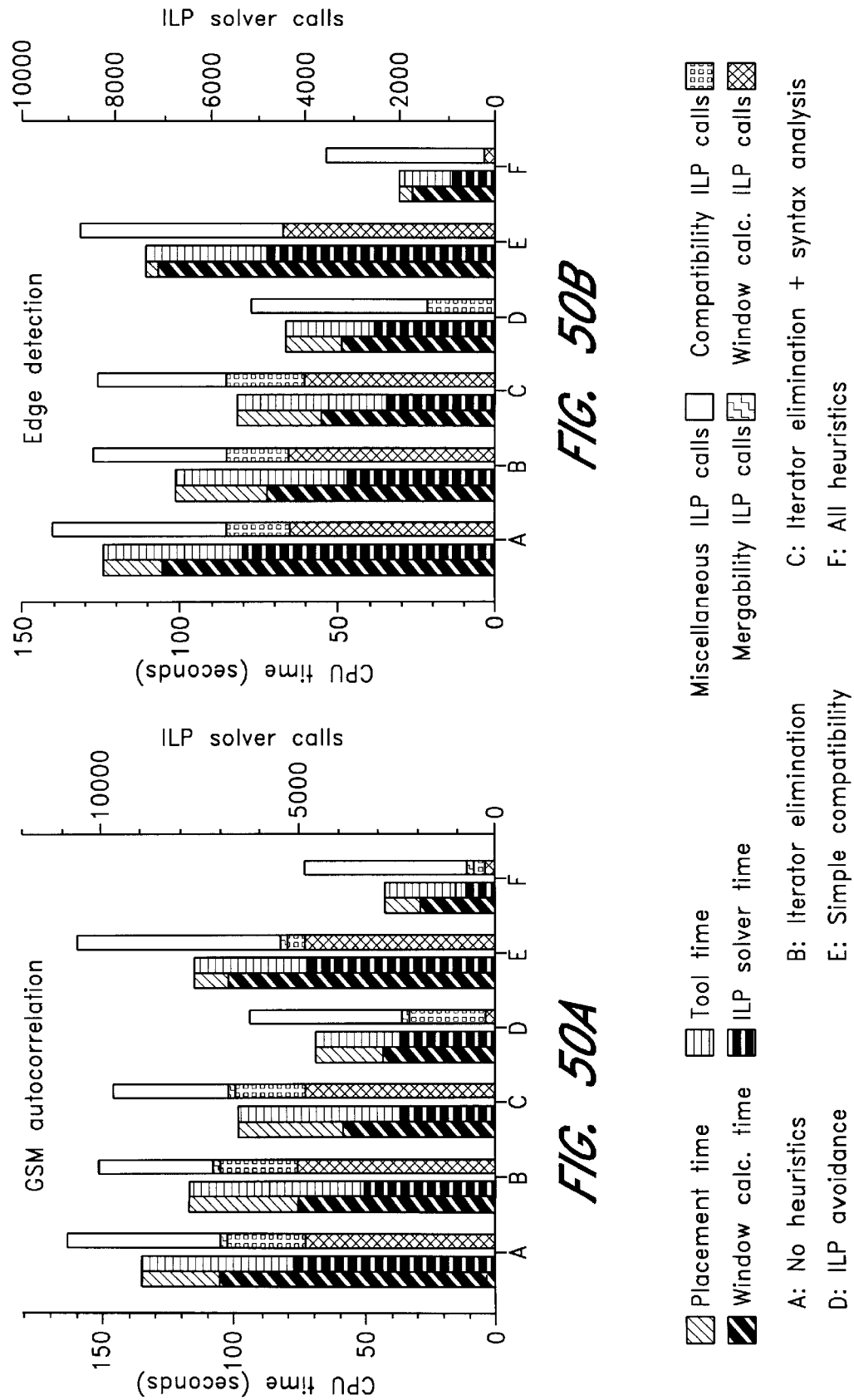

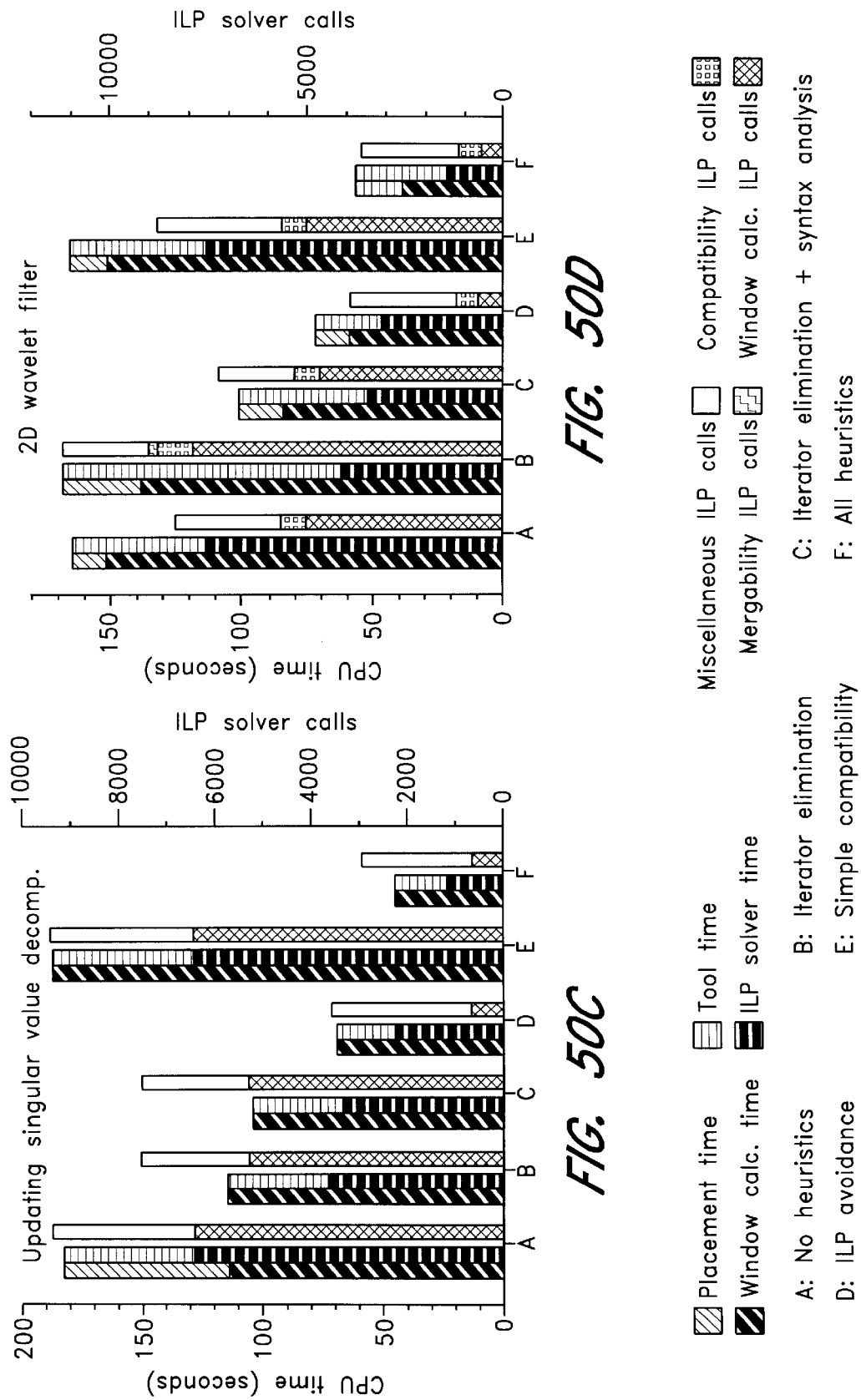

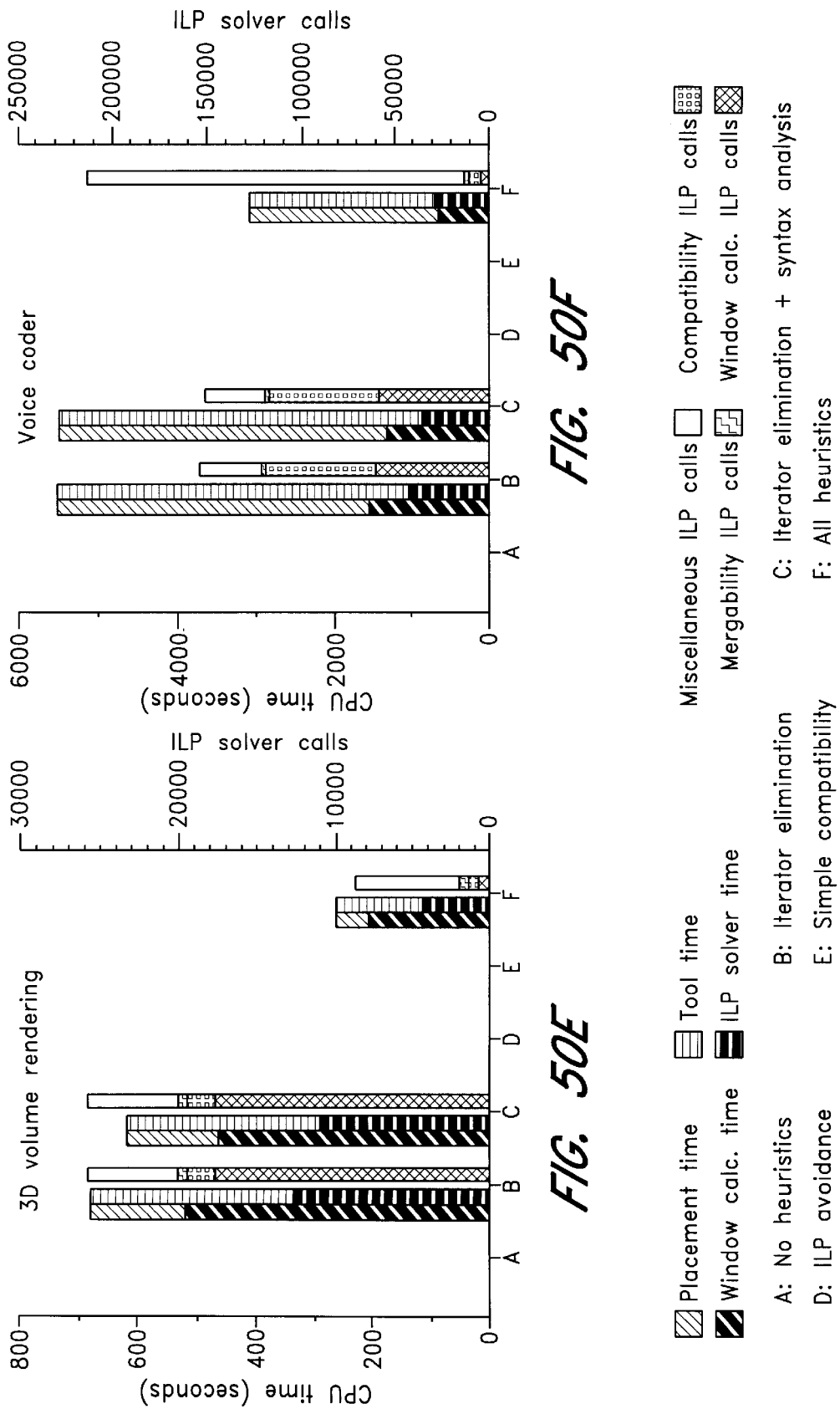

METHOD AND APPARATUS FOR SIZE OPTIMIZATION OF STORAGE UNITS

This application claims the benefit of U.S. Provisional Application No. 60/045,232, filed Mar. 29, 1997, and U.S. Provisional Application No. 60/041,793, filed Apr. 2, 1997.

The present invention relates a method and apparatus (e.g. a compiler) which may find application for the reduction of storage size required for temporary data during the execution of a set of commands, e.g. a computer program. The present invention is particularly suitable for the reduction of storage size for multimedia applications and other applications which process data in the form of multi-dimensional arrays.

TECHNICAL BACKGROUND

Due to the enormous progress that has been made during the last few decades in the area of integrated circuits (ICs), the complexity of systems implemented in silicon has been increasing drastically. This has lead to system-on-a-chip designs where all the components previously combined on a board are now integrated on a single die. The design of these systems often requires trade-offs to be made between the cost factors such as: chip area/count, power consumption, design time, and execution speed. The vast majority of recent signal processing systems that have to be implemented in silicon, including multimedia systems, require huge amounts of data to be processed, transferred and stored temporarily. As a result, the largest contributions to the area and power cost factors originate from data storage and transfers. Data-intensive signal processing applications can be subdivided into two classes: most multimedia applications (including video and medical imaging,) and network communications protocols (e.g. ATM network protocols). On application specific integrated circuits (ASICs), typically more than half of the silicon area is being occupied by storage units and related hardware such as address generation logic. Moreover, most of the power consumption in these systems is directly related to data accesses and transfers, both for custom hardware and for processors. Therefore, there is a need to improve data storage and transfer management and to reduce the chip area/count and power consumption.

Unfortunately, any effective optimization would require relatively aggressive global transformations of the system specifications and, due to the high complexity of modern systems, such transformations are often impossible to perform manually in an acceptable time. Many designers are not even aware that such optimizations might affect the area and power cost considerably. Commercially available CAD tools for system synthesis currently offer little or no support for global system optimizations. They usually support system specification and simulation, but lack support for global design exploration and certainly for automated global optimizations. They include many of the currently well-known scalar optimization techniques (e.g. register allocation and assignment) but these are not suited for dealing with large amounts of multi-dimensional data. Also standard software compilers are limited mainly to local (scalar) optimizations.

For instance, storage size requirements for multi-dimensional data have received only little attention from the compiler communities because they were (initially) not seen as a cost (nor a problem). The storage order of data was originally even not seen as a optimization parameter, e.g. it was simply defined by the programming language (e.g. row-major in C or column-major in Fortran), and the optimization efforts were concentrated on obtaining the highest possible degree of parallelism. If a bad storage order is chosen, many "holes" in the memories may be formed, i.e. locations that cannot be used at certain moments in time, resulting in increased storage size requirements. Unfortunately, manual optimization of the storage requirements is very tedious and error-prone for real life applications, because it involves complex bookkeeping. Techniques to help designers take better decisions, or even to automate this difficult task, are therefore certainly desirable.

It is an object of the present invention to provide a method and an apparatus for reducing the storage space required for temporary data when executing a program, particularly to reduce the storage size of multi-dimensional data arrays as these have the largest impact on the storage cost.

Another object of the present invention is to find a storage order for each (part of an) array such that the overall required size (number of locations) of the memories is minimal.

Another object of the present invention is to find an optimal layout of the arrays in the memories such that the reuse of memory locations is maximal.

SUMMARY OF THE INVENTION

The present invention may provide a method for optimizing before run-time the size of a storage unit for storing temporary data, comprising the step of: loading into a compiling means execution commands and a definition of at least: a first data structure, at least one of the execution commands requiring access to said at least first data structure; and an optimizing step for reducing the storage size of the temporary data in said storage unit required for the execution of the commands with a substantially given execution order, said optimizing step including an intra-structure optimizing step for optimizing an intra-structure storage order at least within said first data structure and said optimizing step also including calculating a window size for said first data structure, said intra-structure optimizing step being based on a geometrical model.

The present invention may also provide a method for optimizing before run-time the size of a storage unit for storing temporary data, comprising the steps of: loading into a compiler means a definition of at least a first and a second data structure and execution commands, at least one of said execution commands requiring access to at least one of said first and second data structures; and an optimizing step for reducing the storage size of the temporary data in said storage unit required for the execution of the commands with a substantially given execution order, said optimizing step including an inter-structure optimizing step of optimizing an inter-structure storage order between said first and second data structures, said inter-structure optimizing step being based on a geometrical model.

The present invention also includes a compiling apparatus comprising: means for loading execution commands and a definition of at least a first data structure, at least one of the execution commands requiring access to said at least first data structure; and means for reducing the storage size of temporary data required for the execution of the commands with a substantially given execution order, said reducing means including intra-structure optimizing means for optimizing an intra-structure storage order at least within said first data structure, said intra-structure optimizing means including means for calculating a window size for said first data structure based on a geometrical model.

The present invention also includes a compiling apparatus comprising: means for loading a definition of at least a first and a second data structure and execution commands, at least one of said execution commands requiring access to at least one of said first and second data structures; and means for reducing the storage size of the temporary data required for the execution of the commands with a substantially given execution order, said reducing means including means for optimizing an inter-structure, storage order between said first and second data structures, said inter-structure optimizing means being adapted to carry out the optimization based on a geometrical model.

In accordance with the present invention the objects of the invention may be solved by decomposing the problem into two sub-problems, which can be solved independently or together: intra-array storage order optimization and inter-array storage order optimization. During storage order optimization, the detailed layout of the large data structures in the memories is being decided upon, i.e. the storage order of the data. Storage order in accordance with the present invention relates to how data is allocated to real or virtual memory space before run-time, e.g. at compile time. Given the memory configuration and data-to-memory assignment, this task tries to find a placement of the multi-dimensional data in the memories at compile time in such a way that memory locations are reused as much as possible during the execution of the signal processing application. The goal of this task is to minimize the required sizes of the memories. This directly has impact on the chip area occupation and indirectly also on the power consumption. This task is extremely difficult to perform manually due to the complex code transformations and bookkeeping that are required. Automation of this task is therefore crucial to keep the design time acceptable. The present invention particularly targets the class of applications in which the placement of data is handled at compile time. For some network applications the placement of data is handled at run-time, which requires different techniques. Due to the dominant influence of the data storage and transfers on the overall system cost, the present invention is intended to be applied very early in the design process, i.e. before the synthesis of address generation hardware, datapaths, and controllers.

By tackling the data storage and transfer related issues first, one may impose additional constraints on the remaining synthesis tasks, which may lead to suboptimal solutions for these tasks. However, the dominance of the data storage and transfers on the overall system cost is usually overwhelming, such that suboptimal solutions for the remaining tasks have only a secondary effect on the overall cost. Moreover, application studies have shown that near-optimal solutions for the datapaths can usually still be found by applying the appropriate transformations. Given the fact that the storage order optimization task is located near the end of the optimization script, where the execution order and the data-to-memory assignments have been substantially fixed, its input contains information about what data are stored in what memories and when these data enter and leave the memories.

The dependent claims define individual further embodiments of the present invention. The present invention will now be described with reference to the following drawings.

BRIEF DESCRIPTION OF THE DRAWINGS

FIG. 6 is an example of BOAT- and OAT-domains according to the present invention.

FIG. 12a shows static windowed and FIG. 12b shows dynamic windowed allocation strategies according to the present invention.

FIG. 13 shows dynamic allocation with a common window according to the present invention.

FIG. 27 shows a folding conflict according to the present invention.

FIG. 28 shows distances between two OAT-domains according to the present invention.

FIGS. 29a and b shows a distance calculation according to the present invention.

FIGS. 47–49 show partial distance calculations according to the present invention.

FIG. 50 shows experimental results of the speed-up heuristics according to the present invention.

Figure 1A:
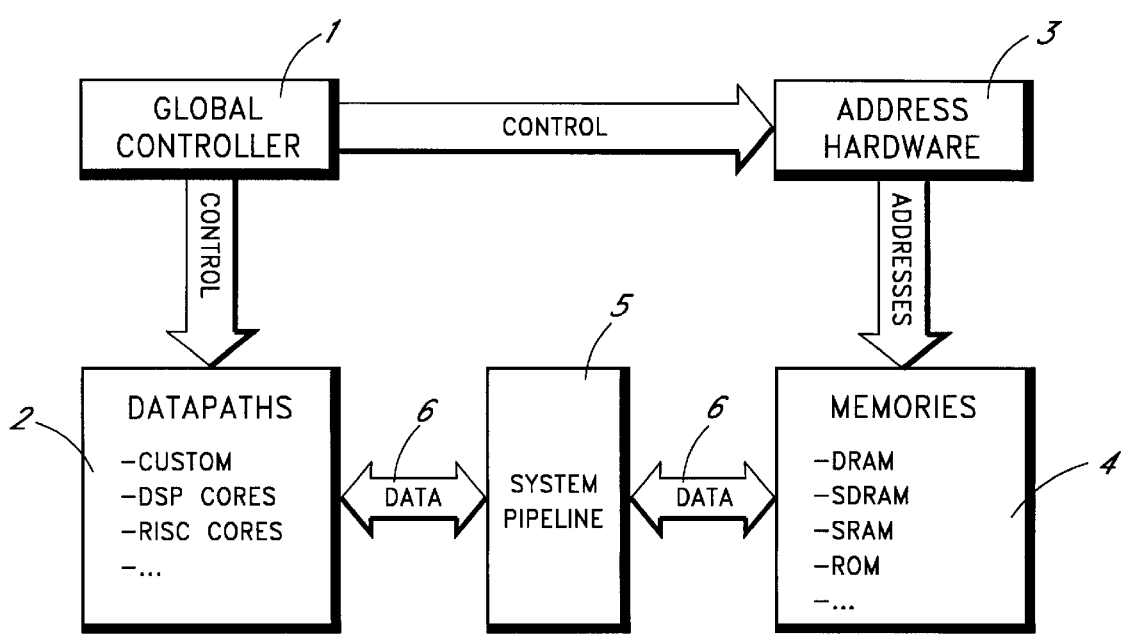
FIG. 1a is a schematic global view of a target architecture for use with the present invention.

| DEFINITION OF SYMBOLS USED |
|---|
| $A_m^{abstr}()$ abstract address equation for array variable m |
| $\tilde{A}_m^{abstr}()$ partial abstract address equation for array variable m |
| $A_m^{real}()$ real address equation for array variable m |
| $C_m^{addr}()$ storage order constraint (vector) function of $D_m^{var}$ |
| $C_{ikm}^{def}()$ constraint (vector) function of $D_{ikm}^{def}$ |
| $C_i^{iter}()$ contraint (vector) function of $D_i^{iter}$ |
| $C_{jlm}^{oper}()$ constraint (vector) function of $D_{jlm}^{oper}$ |
| $C_{jlm}^{rtime}()$ execution order constraint (vector) function of $D_{jlm}^{oper}$ |
| $C_i^{time}()$ execution order constraint (vector) function of $D_i^{iter}$ |
| $C_m^{var}()$ constraint (vector) function of $D_m^{var}$ |
| $C_{ikm}^{wtime}()$ execution order constraint (vector) function of $D_{ikm}^{def}$ |
| $D_m^{addr}$ storage address domain of $D_m^{var}$ |
| $D_{ijklm}^{BOAT}$ binary occupied address/time domain for definition k of statement I writing array variable m and operand l of statement j reading the same array variable |
| $D^{COAT}$ collective occupied address/time domain |
| $D_{ikm}^{def}$ definition domain of definition k of statement i for array variable m |
| $D_i^{iter}$ iteration domain of statement i |
| $D_m^{OAT}$ occupied address/time domain of array variable m |
| $D_{jlm}^{oper}$ operand domain of operand l of statement j for array variable m |
| $D_{jlm}^{rtime}$ read execution time domain of $D_{jlm}^{oper}$ |
| $D_m^{var}$ variable domain of array variable m |
| $D_{ikm}^{wtime}$ execution time domain of $D_{ikm}^{def}$ |
| $F_{ikm}^{def}()$ unknown constraint (vector) function of $D_{ikm}^{def}$ |
| $F_i^{iter}()$ unknown constraint (vector) function of $D_i^{iter}$ |
| $F_{jlm}^{oper}()$ unknown constraint (vector) function of $D_{jlm}^{oper}$ |
| $F_m^{var}()$ unknown constraint (vector) function of $D_m^{var}$ |
| $M_{ikm}^{def}$ definition mapping between $D_i^{iter}$ and $D_{ikm}^{def}$ |
| $M_{ijklm}^{flow}$ dependency relation for definition k of statement i writing array variable m and operand l of statement j reading the same array variable |
| $M_{jlm}^{oper}$ operand mapping between $D_i^{iter}$ and $D_{jlm}^{oper}$ |
| $O_m^{addr}()$ storage order function of $D_m^{var}$ |
| $O_{jlm}^{rtime}()$ read execution order offset function of $D_{jlm}^{oper}$ |
| $O_i^{time}()$ execution order function of $D_i^{iter}$ |
| $O_{ikm}^{wtime}()$ write execution order offset function of $D_{ikm}^{def}$ |

DESCRIPTION OF THE ILLUSTRATIVE EMBODIMENTS

The present invention will be described with reference to certain embodiments and examples and with reference to certain schematic drawings but the invention is not limited thereto but only by the claims. The present invention will be described for convenience with reference to multimedia applications but is not limited thereto. The present invention may find application in any storage reduction application, particularly those in which multi-dimensional arrays of data are processed. In particular the present invention may be independent from or included within a global optimization scheme which may include one or more of: removal of algorithmic bottle-necks, global data life-time reduction, exploitation of memory hierarchy through data reuse, storage cycle budget Distribution, memory allocation and assignment, e.g. number and types, formal verification and address hardware generation. In the following reference is made to certain "strategies", each of these strategies is an independent embodiment of the present invention.

Most real-life multimedia applications deal with large amounts of multidimensional arrays. The search space for all the possible storage orders of ill these arrays becomes very large. First of all the number of possible storage orders for an array quickly explodes when the number of dimensions increases. For single-assignment code, which reveals the true dimensionality of the data, this number can be as high as 10 in practice. Secondly, the presence of multiple arrays enables reuse of storage locations between different arrays, which increases the complexity of the optimization task. Finding a good storage order is crucial though, as the required storage sizes may vary with orders of magnitude depending on the storage order.

The target architecture in accordance with the present invention can be very heterogeneous and imposes few constraints except that a global system pipeline should be present between the memories and the datapaths. A simplified global view is shown in FIG. 1a. The main components in the target architecture are the datapaths 2, the memories 4, the address generation hardware 3, and the global controller 1. The main focus of the present invention lies on data storage and transfers, regions 4 and 6 in FIG. 1a. The datapath 2 may be composed of (a mixture of) several types of execution units, e.g. custom hardware and embedded DSP or RISC cores, i.e. the application may be implemented completely in hardware or in a combination of hardware and software. Also the memories 4 in the architecture useable with the present invention can be of different natures. For instance, ROMs, several kinds of RAMs, FIFOs, and pointer-addressed memories can be present in various combinations.

The global controller 1 and the address generation hardware 3 may be implemented in custom hardware, but the invention is not limited thereto. For instance if an embedded DSP core is integrated in the datapath 2, it is possible that it has one or more integrated programmable address generators that can be used to control the memories.

Figure 1B:
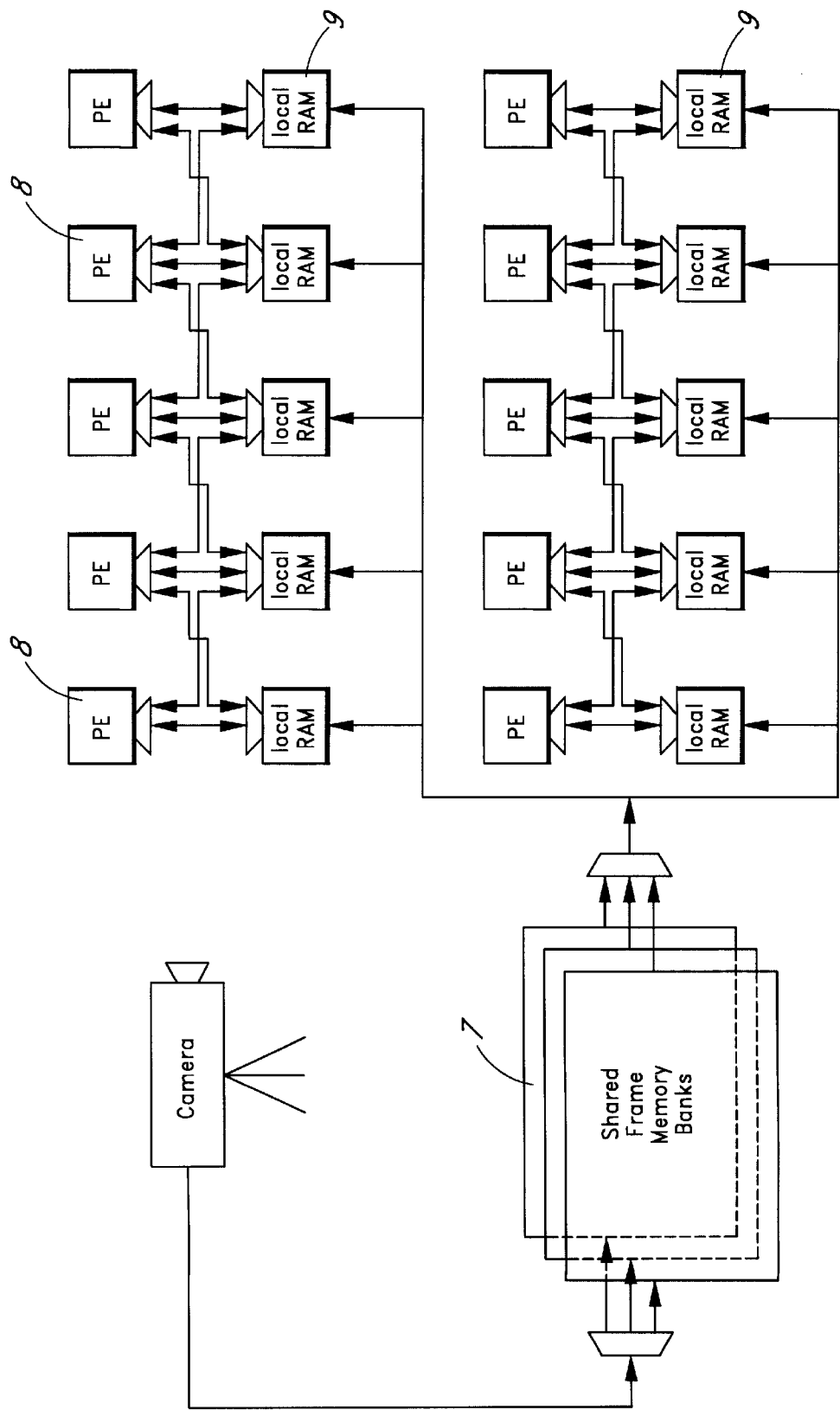
FIG. 1b is a particular target architecture for use with the present invention.

The different main components in the architectures in accordance with the present invention are not limited to those shown in FIG. 1a, various components may be intermixed in the final hardware implementation. For instance, a DSP core may have an integrated local RAM or, as mentioned above, integrated address generators. Moreover, it is not necessary that the whole system is integrated on a single chip. For instance, large background memories may be implemented on separate chips. An example of a SIMD-type target architecture is shown schematically in FIG. 1b which may be used for implementing block-oriented video algorithms. The architecture contains a few shared memory banks 7 and several processing elements 8 with local memories 9. Each of the PE's 8 has access to the local memories 9 of its left and right neighbors. After deciding on the detailed execution order and data distribution, we exactly know which data is stored in each memory 7 or 9 and when this data is accessed. Given this information the storage order optimization in accordance with the present invention can be applied. The present invention may also be applied to MIMD-type architectures with shared memories provided that the memory accesses can be synchronized and that their relative order is known before run-time.

The vast majority of multimedia applications may be described by a "program" in a certain language. This program specifies what operations have to be executed on what data and many times also how they have to be executed, e.g. in what order operations have to be executed or in what order data have to be stored. In the latter case the language is called procedural. In case the "how" is not specified, the language is called applicative. However, when the application is described in a procedural language, the "how" is usually not really part of the specification. It is mostly present only as a matter of convenience, e.g. because procedural programs can easily be executed. Determining how this program will eventually be executed in the final (hardware or software) implementation, is precisely the job of the designer (or the design tool). Usually he has the freedom to ignore, or at least modify, the specification of the "how" in the original description, as long as the implementation meets the functional and timing constraints. Moreover, it is usually even allowed to change the (internal) "what" of the program as long as the (external) I/O-behavior is not modified.

Figure 2:
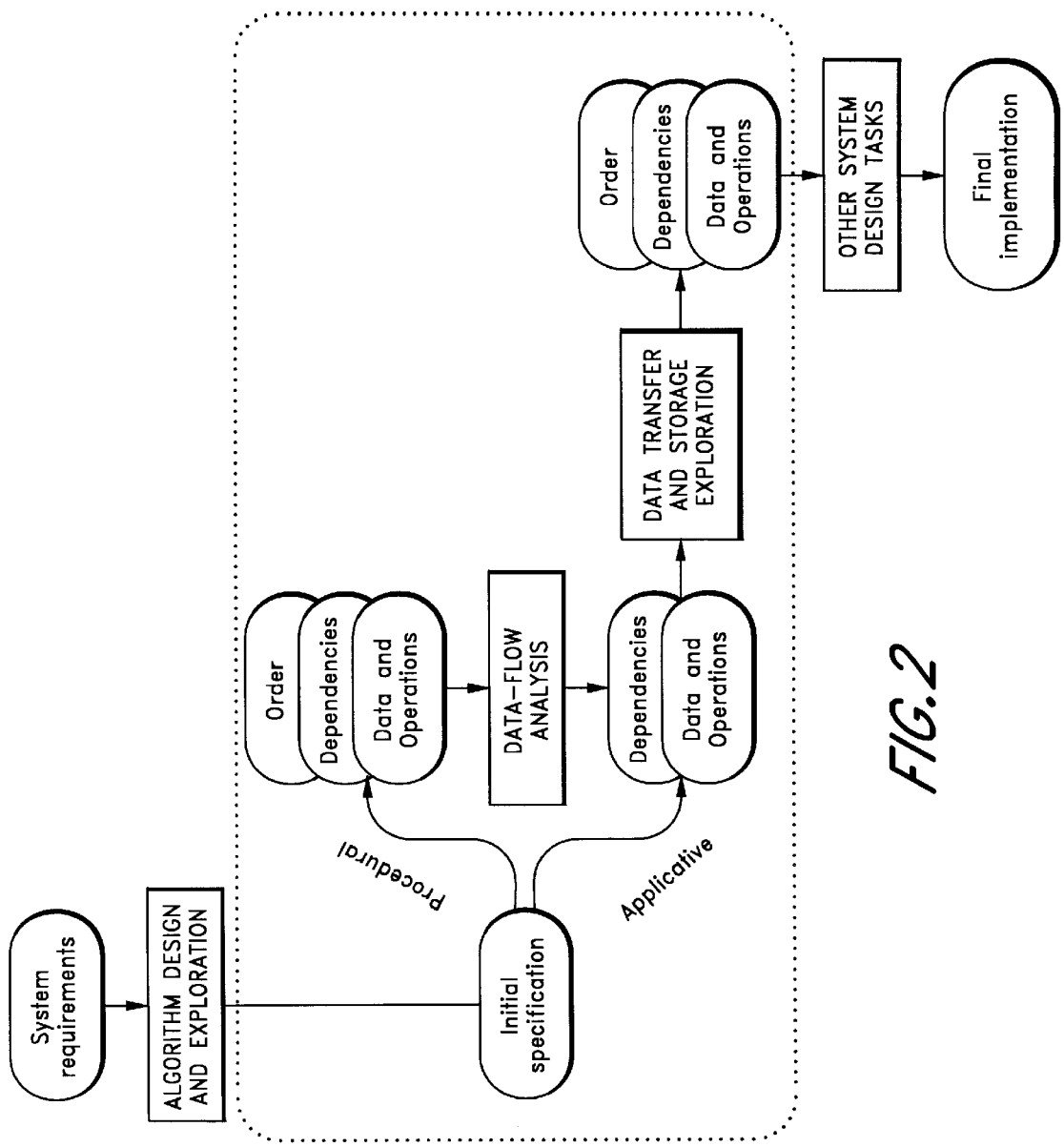
FIG. 2 is a schematic representation of the flow from system requirements to final implementation of which the present invention may form a part.

Nevertheless, the "what" is the most important part of the specification. It consists of two major components: the data and the operations on the one hand and the dependencies between them on the other hand. Data and operations are usually heavily modified during earlier steps in the design flow. For instance, the algorithms used to implement a certain functionality may be heavily changed during the initial design stages. A (simplified) flow from system requirements to final implementation can be represented as in FIG. 2.

The system design process usually starts with the algorithm design and exploration of different algorithm alternatives. The result of this phase is an initial algorithmic specification of the system. In case this specification is given as a procedural program, data-flow analysis allows us to extract the "real" specification, i.e. the data and operations and the dependencies between them, at least in theory. In case the original specification is applicative, this step can be skipped as it is already the "real" specification. Next we can proceed with the data transfer and storage exploration, and impose a(n) (new) order on the execution of operations and the storage of data. This is the input for other system design tasks, such as traditional high-level synthesis.

Naturally, in case the original specification was procedural, it is the intention that the newly imposed order leads to a better implementation than the original one would have. The data-flow analysis step is crucial to reach this goal, because it reveals the freedom that is present in the initial specification.

Given the important role of the data, the operations, the dependencies and the order in this flow, it is important to model them accurately. Multimedia applications not only typically consist of thousands or even millions of operations and data elements, but also exhibit a large degree of regularity (for instance, one can recognize large groups of operations and data that are treated in a similar way).

In the parallel compiler and regular array synthesis communities the main interest lies in the accurate modeling of the execution of program statements and the dependencies between these executions in order to be able to exploit the potential parallelism. This has lead to the definition of the concept of an iteration domain (P. Feautrier, "Dataflow analysis of array and scalar references" International Journal of Parallel Programming, 20(1) pp 23–53, 1991) also called iteration space (C. D. Polychronopoulos, "Compiler optimizations for enhancing parallelism and their impact on architecture design", IEEE Trans. on Computers, 37(8) pp 991–1004, August 1988; W. Li and K. Pingali, "A singular loop transformation framework based on non-singular matrices", Proc. of the Fifth Annual Workshop on Language and Compilers for Parallelism, New Haven, August 1992), index set (Weijia Shang, Matthew T. O'Keefe, Jose A. B. Fortes, "Generalized cycle shrinking" in Algorithms and Parallel VLSI Architectures II, pp 132–144. Elsevier Science, 1992), node space (M. van Swaaij, F. Franssen, F. Catthoor, and H. De Man "Automating high-level control flow transformations for DSP memory management" Proc. of the IEEE Workshop on VLSI Signal Processing, Napa Valley, Calif., October 1992), computation domain (A. Darte, T. Risset, and Y. Robert "Loop nest scheduling and transformations", Advances in Parallel Computing 6, pages 309–332. North Holland, Amsterdam environments and tools for parallel scientific computing edition, 1993), or index space (Christian Lengauer "Loop parallelization in the polytope model", Proc. of the Fourth International Conference on Concurrency Theory (CONCUR93), Hildesheim, Germany, August 1993). An iteration domain is a mathematical description of the executions of a statement in a program. It is a geometrical domain in which each point with integral coordinates represents exactly one execution of the statement. Each statement has its own iteration domain, and the set of points in this domain represents all the executions of this statement. The execution of a specific statement as referred to as an operation. The different mathematical dimensions of such a domain generally correspond to the different iterators of the loops surrounding the corresponding statement (but this is not strictly required). The domain itself is described by means of a set of constraints corresponding to the boundaries of these iterators. In general, the loop boundaries are not constant. Moreover, the program may contain conditional statements. The iteration domain model can easily incorporate these properties though, provided that the loop boundaries and conditions are functions of the iterators of the surrounding loops.

Another important concept is that of auxiliary dimensions, which are also called wildcards. Sometimes it is not possible to represent an iteration domain only by constraints on its dimensions. In those cases, it may be necessary to introduce extra dimensions in order to be able to correctly describe the iteration domain. This is for instance the case if the loop iterators are not incremented by 1 after each execution of the loop.

In general the auxiliary dimensions of a domain are not unique. They only act as a mathematical aid for describing specific constraints. Any combination of auxiliary dimensions and constraints that results in the same orthogonal projection onto the real dimensions is therefore equivalent from a modeling point of view. Of course, from a manipulation or transformation point of view, this is not true. One representation can be more efficient than another one for certain purposes. For instance, certain techniques can only operate efficiently on dense domains or domains that are described as mappings of dense domains.

Sometimes the reasons for the introduction of auxiliary dimensions are less straightforward. Modulo operations in array index expressions may be handled in an efficient way through the introduction of extra (auxiliary) dimensions. Mainly for technical reasons, the iteration domain models being used in parallel compilers and regular array synthesis were usually restricted to be described only by affine constraints. By doing so, many of the well-known results from linear algebra can be used for analysis and optimization of programs. The class of programs that can be handle,d by these restricted models is quite large. However, there is no fundamental reason why the models should not be capable of representing arbitrary functions instead of only affine functions. Of course there have been some practical reasons, i.e. if non-affine functions are present, the techniques for analyzing and optimizing the corresponding programs may have to be extended and may become computationally more complex.

In accordance with the present invention, modeling is done not only of the executions of the statements of a program (by means of iteration domains), but also of the accesses to the program variables, and especially of the array variables. Accordingly, definition domains, operand domains and variable domains (definition domains and operand domains have also been called operation space and operand space respectively) are required. In the remainder of this text, reference is made to program variables simply as variables, i.e. the "program" prefix will not be used but is implied. There should be no confusion with mathematical variables, which are used in the mathematical descriptions of the different domains.

Typically the variables being written or read during the execution of a program are grouped into sets of similar variables, which are called arrays or more generally: data structures. These arrays are arranged as multi-dimensional structures, in which each individual variable can be addressed by a unique set of indices. These multi-dimensional structures are suited to be modeled by geometrical domains. A variable domain is a mathematical description of an array of variables. Each point with integer coordinates in this domain corresponds to exactly one variable in the array.

During the execution of a program, not every statement accesses each array of variables completely. Typically, the executions of a statement only access part of one or a few arrays. The definition and operand domains of a statement describe which variables are being accessed during all possible executions of that statement. Each point with integer coordinates in these domains corresponds to exactly one variable that is being written (in case of a definition domain) or read (in case of an operand domain). Possibly, a variable is written or read multiple times during the execution of a program, even by the same statement.

The relations between the executions of the statements and the variables that are being written or read, are represented by means of mathematical mappings between the dimensions of the iteration domains and the dimensions of the definition or operand domains. These mappings will be referred to as the definition mappings and operand mappings respectively. Note that in general, the definition or operand domains may require the use of extra auxiliary dimensions, next to the dimensions of the corresponding iteration domain. We refer to these mappings as the definition mappings and the operand mappings respectively.

The present invention includes the extension of the above affine models to include non-affine and even non-manifest control and data flow. Manifest means that both the control flow and the data flow (i.e. data values) of the program are known at compile time. Programs can be described by means of iteration, variable, definition, and operand domains/mappings, provided that the program is affine and manifest. In general, these domains and mappings have the following form:

$$\mathbf{D}_i^{\text{iter}} = \{\mathbf{i} \mid \exists \alpha \in \mathbb{Z}^{n_{i2}} \text{ s.t. } \mathbf{C}_i^{\text{iter}}(\mathbf{i}, \alpha) \geq 0 \wedge \mathbf{i} \in \mathbb{Z}^{n_{i1}}\} \quad (1.1)$$

$$\mathbf{D}_m^{\text{var}} = \{\mathbf{s} \mid \exists \beta \in \mathbb{Z}^{n_{m2}} \text{ s.t. } \mathbf{C}_m^{\text{var}}(\mathbf{s}, \beta) \geq 0 \wedge \mathbf{s} \in \mathbb{Z}^{n_{m1}}\} \quad (1.2)$$

$$\mathbf{M}_{ikm}^{\text{def}} = \{\mathbf{i} \to \mathbf{d} \mid \exists \gamma \in \mathbb{Z}^{nd_{ikm}} \text{ s.t.} \quad (1.3)$$
$$\mathbf{C}_{ikm}^{\text{def}}(\mathbf{d}, \mathbf{i}, \gamma) \geq 0 \wedge \mathbf{d} \in \mathbb{Z}^{n_{m1}}\}$$

-continued $$D_{ikm}^{def} = \{d \mid \exists i \in D_i^{iter}, \gamma \in \mathbb{Z}^{nd_{ikm}} \text{ s.t.} \quad (1.4)$$
$$C_{ikm}^{def}(d, i, \gamma) \geq 0 \wedge d \in \mathbb{Z}^{n_{ml}}\}$$

$$M_{jlm}^{oper} = \{j \rightarrow o \mid \exists \delta \in \mathbb{Z}^{no_{jlm}} \text{ s.t.} \quad (1.5)$$
$$C_{jlm}^{oper}(o, j, \delta) \geq 0 \wedge o \in \mathbb{Z}^{n_{ml}}\}$$

$$D_{jlm}^{oper} = \{o \mid \exists j \in D_j^{iter}, \delta \in \mathbb{Z}^{no_{jlm}} \text{ s.t.} \quad (1.6)$$
$$C_{jlm}^{oper}(o, j, \delta) \geq 0 \wedge o \in \mathbb{Z}^{n_{ml}}\}$$

In these equations, $C_i^{iter}(\ )$, $C_m^{var}(\ )$, $C_{ikm}^{def}(\ )$, and $C_{jlm}^{oper}(\ )$ represent sets of constraint functions of $D_i^{iter}$, $D_m^{var}$, $D_{ikm}^{def}$, and $D_{jlm}^{oper}$ respectively. Note that in practice, many of the inequalities described by these constraint functions can be reduced to equalities, but from a modeling point of view this makes no difference. Therefore, and in order to keep the notation a simple as possible, we continue to use the inequalities rotation. Also note that the main dimensions of the iteration domains can be seen as auxiliary dimensions of the corresponding definition and operand domains. In many cases, these dimensions can be eliminated, as they are existentially quantified (just as any other auxiliary dimension).

The definition and operand mappings will not be referred to explicitly anymore, unless there is a good reason for it, because the information about these mappings can be readily extracted from the (non-simplified) definition and operand domains descriptions. For instance, the mappings from the iteration domains to the operand/definition domains indicate what array elements are accessed by what operations and vice versa. The (simplified) domain descriptions alone do not contain the information about these relations.

These mathematical models allow description of all practical programs that are manifest, i.e. non-recursive programs that contain for-loops with manifest boundaries, manifest conditions and array accesses with manifest index expressions, even if these are not affine. Note that in the worst case one may have to rely on a complete enumeration of the points in the domains, but even an enumeration fits within the models.

For modeling a special class of non-affine manifest index expressions, namely piece-wise linear indexing caused by modulo operations in index expressions. In "Modeling piece-wise linear and data dependent signal indexing for multi-dimensional signal processing", F. Franssen, M. van Swaaij, F. Catthoor, and H. De Man, Proceedings of the 6th ACM/IEEE International Workshop on high-level synthesis, pp. 245–255, Dana Point, Calif., November 1992 it is indicated how a loop (nest) can be rewritten to get rid of the modulo operation. A better alternative is to introduce auxiliary dimensions in the descriptions of the definition and/or operand domains. This method has the advantage that the loops can be left in their original form, and that it can be applied to each operand or definition domain separately. A potential disadvantage of this technique is that the resulting domain descriptions are no longer "dense". They can be converted to dense descriptions using the techniques presented in the above article or in "Transformation of nested loops with modulo indexing to affine recurrences", F. Balasa, F. Franssen, F. Catthoor, and Hugo De Man. Parallel Processing Letters, 4(3), pp. 271–280, December 1994.

The main problem left is the modeling of non-manifest programming constructs. The behavior of many algorithms depends on data values that are not known until the algorithm is executed (e.g. input data). Consequently, the programs implementing these algorithms are not manifest, i.e. the data and/or control flow may be different each time the program is executed. The models presented above are not capable of describing this kind of programs (or at least not very accurately) and therefore require further extensions.

One of the best known extensions is the use of symbolic constants. In scientific computing the problem of optimizing programs for which some of the structure parameters are not yet known occurs frequently. It is for instance possible to do data flow analysis in the presence of unknown structure parameters by treating them as symbolic constants. This concept of symbolic constants and the corresponding analysis techniques can be extended to include any value that is not known at compile time. These unknowns are sometimes called dynamically defined symbolic constants, or hidden variables or placeholder variables. The main difference between the traditional symbolic constants and the more general hidden variables is that hidden variables need not have a constant value during the execution of the program. But even though the actual values are not known at compile time, the rate at which these values changes, is usually known. Since the information about this rate can be crucial in order to perform optimizations, programs containing hidden variables may still be described as accurately as possible, i.e. the rate at which they change may be described. Techniques for dealing with symbolic constants can also be used for dealing with data dependent variables, provided that they remain constant during the execution of the program. In general, it is not required that these values are integral (e.g. input may be a floating point variable). Of course, some constraints may be imposed by the context of the program, and in that case we can add them to the domain descriptions, but this is not required by the model. In the following we assume that dimensions that have not been constrained can take any real value.

In cases with data dependent variables that vary with each execution of a loop, we cannot represent the variable by means of an unknown variable that remains constant during the execution of the program. Therefore, we must explicitly indicate that the value of this unknown variable may be different for each value of the iteration. In other words, the value of the unknown variable is a function of the number of the iteration, although the function is not known at compile time. The functions used to model these unknown variables are also known as uninterpreted function symbols.

The unknowns which are constant during the execution of a program can be seen as a degenerate case of varying unknowns, i.e. varying unknowns that do not vary. In other words, they can be modeled by means of unknown functions without input arguments. In this way, we can unify the modeling techniques for symbolic constants, constant unknowns, and varying unknowns. So we can rewrite the expressions in a uniform way as follows:

$$D_1^{iter} = \{i \mid \exists N \text{ s.t. } 0 \leq i < N \wedge N = F_1^{iter}() \wedge i \in \mathbb{Z}\}$$
$$D_2^{iter} = \{i \mid \exists p \text{ s.t. } 0 \leq i < p \wedge p = F_2^{iter}() \wedge i \in \mathbb{Z}\}$$
$$D_3^{iter} = \{i \mid \exists q \text{ s.t. } 0 \leq i < q \wedge q = F_3^{iter}(i) \wedge i \in \mathbb{Z}\}$$

Note that $F_{1/2}^{iter}(\ )$ are functions without input arguments, i.e. constant functions.

In general, we can describe the geometrical domains associated with programming constructs by means of three kinds of dimensions:

1. Main dimensions: these are the real dimensions of the domains. All other dimensions should be eliminated in order to obtain the real domain consisting of points with integer coordinates (although this may be possible only at runtime). Each of these points then corresponds to exactly one program entity (e.g. an operation, a variable, ... ). Each main dimension generally corresponds to an iterator in the program (although this iterator may not be explicitly present) or a dimension of a (multi-dimensional) variable. For a given semantical interpretation and a given programming construct, the main dimensions of a domain are unique, i.e. all domain descriptions corresponding to a certain programming construct should be mathematically equivalent. The shape of the iteration domain of a statement for instance, is unique for a given loop structure surrounding the statement and a given semantical interpretation of the dimensions. However, through transformations the shapes of domains can be modified, but then the corresponding programming constructs are assumed to be transformed also. In the following, vectors of main dimensions in formal equations are represented by bold letters, e.g. i.

2. Auxiliary dimensions (also called wildcard dimensions): these dimensions are not really part of the domains, but are used to be able to express more complex constraints on the domains. In general, auxiliary dimensions cannot be associated with any variables present in the program. An exception are the auxiliary dimensions that correspond to main dimensions of other domains (e.g. the dimensions of the iteration domains also appear in the descriptions of the definition and operand domains, unless they have been eliminated). Auxiliary dimensions are nothing but a mathematical aid, and are existentially quantified and therefore not unique. Only the result obtained after their elimination matters. In the following, vectors of auxiliary dimensions in formal equations are represented by Greek letters, e.g. $\alpha$ (except when they correspond to the main dimensions of other domains, in that case we leave them in bold to highlight this correspondence).

3. Hidden dimensions: these dimensions are also not really part of the domains, but are used to model non-manifest behavior. Just like auxiliary dimensions, hidden dimensions are not unique either, and have to be eliminated in order to obtain the real domains. The difference is that in general this elimination cannot be done at compile time. Generally, hidden dimensions correspond to symbolic constants or data-dependent variables in the program. Hidden dimensions are always expressed as functions of main dimensions and are also existentially quantified. In the following, vectors of hidden dimensions in formal equations are represented by italic letters, e.g. r.

So in general we can represent the iteration, variable, definition and operand domains as follows:

$$D_i^{iter} = \{i \mid \exists \alpha \in Z^{n_{i2}}, p \text{ s.t.} \quad (2.1)$$
$$C_i^{iter}(i, \alpha, p) \geq 0 \wedge p = F_i^{iter}(i) \wedge i \in Z^{n_{i1}}\}$$

$$D_m^{var} = \{s \mid \exists \epsilon \in Z^{n_{m2}}, r \text{ s.t.} \quad (2.2)$$
$$C_m^{var}(s, \epsilon, r) \geq 0 \wedge r = F_m^{var}(\phi) \wedge s \in Z^{n_{m1}}\}$$

$$M_{ikm}^{def} = \{i \to d \mid \exists \gamma \in Z^{nd_{ikm}}, u \text{ s.t.} \quad (2.3)$$
$$C_{ikm}^{def}(d, i, \gamma, u) \geq 0 \wedge u = F_{ikm}^{def}(d) \wedge d \in Z^{n_{m1}}\}$$

$$D_{ikm}^{def} = \{d \mid \exists i \in D_i^{iter}, \gamma \in Z^{nd_{ikm}}, u \text{ s.t.} \quad (2.4)$$
$$C_{ikm}^{def}(d, i, \gamma, u) \geq 0 \wedge u = F_{ikm}^{def}(d) \wedge d \in Z^{n_{m1}}\}$$

$$M_{jlm}^{oper} = \{j \to o \mid \exists \delta \in Z^{no_{jlm}}, v \text{ s.t.} \quad (2.5)$$
$$C_{jlm}^{oper}(o, j, \delta, v) \geq 0 \wedge v = F_{jlm}^{oper}(o) \wedge o \in Z^{n_{m1}}\}$$

$$D_{jlm}^{oper} = \{o \mid \exists j \in D_j^{iter}, \delta \in Z^{no_{jlm}}, v \text{ s.t.} \quad (2.6)$$
$$C_{jlm}^{oper}(o, j, \delta, v) \geq 0 \wedge v = F_{jlm}^{oper}(o) \wedge o \in Z^{n_{m1}}\}$$

The dimensions corresponding to the components of vectors d and o of $D_{ikm}^{def}$ and $D_{jlm}^{oper}$ are the same as the dimensions of vector s of $D_m^{var}$, since $D_{ikm}^{def}$ and $D_{jlm}^{oper}$ are always sub-domains of $D_m^{var}$ (at least for programs where no arrays are ever accessed outside their boundaries, which is an obvious constraint for practical realizations).

Some of the domain descriptions share names of mathematical variables representing the dimensions. This sharing only suggests that the descriptions can be constructed in a certain way (e.g. a definition domain description can be constructed by combining and iteration domain description and a definition mapping description). From a mathematical point of view, identically named mathematical variables in independent domain/mapping descriptions are unrelated.

Unlike the main and auxiliary dimensions, we do not require the hidden dimensions to be integral. As hidden dimensions may correspond to data variables of the program, hidden dimensions may take any value the corresponding data variables can take, even non-integral ones. Depending on the context, an integrality condition may be added (e.g. when the corresponding data variables have an integral type).

In practice, strict inequalities (<and>) originating from program statements such as A[i]>0 can always be converted to non-strict inequalities because the precision of data types in a program is always limited, even for pseudo-real data types. For instance, if A[i]>0 would result in an inequality p>0, then this inequality be rewritten as p–$\epsilon \geq 0$ in which $\epsilon$ is a small enough positive value (depending on the precision of the data type of A). For integral types, $\epsilon$=1. Therefore, we can avoid all strict inequalities, which results in a simpler notation.

From a mathematical point of view, the distinction between constraint functions and functions for hidden dimensions is somewhat artificial. For instance, $C_i^{iter}(i,\alpha,p) \geq 0^\wedge p = F_i^{iter}(i)$ can be rewritten as $C_i^{iter}(I,\alpha, p) \geq 0^\wedge p - F_i^{iter}(i) \geq 0^\wedge F_i^{iter}(i) - p \geq 0$ or $C_i^{iter}(i,\alpha,p)^* \geq 0$ in which $C_i^{iter}( )^*$ is a combination of the three (vector) functions. Therefore, in the following, we assume that these functions have been combined into $C_i^{iter}( )^*$ but the * will be dropped. This results in the following general model:

$$D_i^{iter} = \{i \mid \exists \alpha \in Z^{n_{i2}}, p \text{ s.t.} \quad (3.1)$$
$$C_i^{iter}(i, \alpha, p) \geq 0 \wedge i \in Z^{n_{i1}}\}$$

$$D_m^{var} = \{s \mid \exists \epsilon \in Z^{n_{m2}}, r \text{ s.t.} \quad (3.2)$$
$$C_m^{var}(s, \epsilon, r) \geq 0 \wedge s \in Z^{n_{m1}}\}$$

$$M_{ikm}^{def} = \{i \to d \mid \exists \gamma \in Z^{nd_{ikm}}, u \text{ s.t.} \quad (3.3)$$
$$C_{ikm}^{def}(d, i, \gamma, u) \geq 0 \wedge d \in Z^{n_{m1}}\}$$

$$D_{ikm}^{def} = \{d \mid \exists i \in D_i^{iter}, \gamma \in Z^{nd_{ikm}}, u \text{ s.t.} \quad (3.4)$$
$$C_{ikm}^{def}(d, i, \gamma, u) \geq 0 \wedge d \in Z^{n_{m1}}\}$$

$$M_{jlm}^{oper} = \{j \to o \mid \exists \delta \in Z^{no_{jlm}}, v \text{ s.t.} \quad (3.5)$$
$$C_{jlm}^{oper}(o, j, \delta, v) \geq 0 \wedge o \in Z^{n_{m1}}\}$$

-continued $$D^{oper}_{jlm} = \{o \mid \exists j \in D^{iter}_j, \delta \in \mathbb{Z}^{no_jlm}, v \text{ s.t.} \quad (3.6)$$
$$C^{oper}_{jlm}(o, j, \delta, v) \geq 0 \wedge o \in \mathbb{Z}^{n_{ml}}\}$$

The primary models described above (iteration, variable, definition, and operand domains) are only used to mathematically describe a given program and they do not contain any information about design decisions such as execution order and/or storage order. These models are not even complete, i.e. without additional information, one cannot restore the original program or sometimes not even an equivalent program from the mathematical description. Given only domains description, one cannot reconstruct the original program, since the notion of execution order is not present in these domains. Moreover, from the domain descriptions, one cannot even derive in what direction the loops have to be executed, since the domain descriptions are independent of the execution order of the loops.

For manifest single-assignment programs, the domain descriptions are sufficient to reconstruct an equivalent program, because in that case one can (at least in theory) find all data-dependencies between the operations, and consequently a valid order. However, if we want to perform optimizations, one of the things we have to do is to decide on an execution order of the statements. Another important decision we have to make is the decision on the storage order, i.e. the layout of the arrays in the memory/memories. We can express these orders by assigning an "execution date" to every operation and a "storage address" to every variable, The meaning of the terms "execution date" and "storage address" is context dependent. Sometimes they are defined in terms of some absolute unit such as a clock cycle or a memory location, but in many cases, the absolute numbers are not relevant, i.e. only the relative order of operations or storage locations is important. For instance, an execution date can be expressed in terms of a number of operations that have been executed before that date, even though the operations may have different time durations in the final implementation of the program. Also, a storage location may not correspond to one physical memory location, but possibly to several ones. We can make use of these observations to simplify certain optimization problems. Nevertheless, when comparing execution dates or storage addresses, we should make sure that their respective scales and offsets are taken into account.

As we are dealing with large sets of operations and large sets of variables, it would be infeasible to assign an execution date to each individual operation and a storage address to each individual variable. Not only would the memory optimization problem become intractable for large applications, but also the implementation cost (controller and address generation overhead) would be prohibitive. Therefore, we have to assign execution dates and storage addresses to groups of operations and variables respectively in order to maintain some regularity.

One of the basic requirements that the storage order and the execution order have to fulfill, is that each variable can have only one storage address and each operation can be executed at only one execution date (provided that variables and operations can be seen as atomic units, which is true in this context). This requirement is compatible with one of the properties of a mathematical function: a function evaluates to only one value for each distinct set of input arguments (although different argument sets may result in the same value). Therefore, it is a straightforward choice to use (deterministic) functions to describe execution and storage order. As arguments of these functions, we can use the coordinates of the operations/variables in the corresponding domains, since these coordinates are unique with respect to all other operations/variables in the same set. So we can describe an execution or storage order with exactly one function per set of operations/variables.

Although execution order and storage order have been treated in a very similar way, there are some differences that have to be taken into account during memory optimizations. First of all, for the purpose of memory related optimizations, it is usually sufficient to know the relative execution order of operations and/or memory accesses (except when dealing with timing constraints for instance, when absolute timing functions should be used). This may allow us (under certain conditions) to use simpler functions for describing the relative execution order than the ones describing the absolute execution order. By doing so, the mathematical complexity of the optimization problems may be drastically reduced.

For storage addresses, the situation is somewhat different as one is usually interested in the memory size required for a set of variables. In order to accurately relate memory sizes to distances between storage addresses, it is important to keep the relation between storage addresses and memory addresses as simple as possible, i.e. in practice this relation should be linear (or piece-wise linear, e.g. because one logical storage address range may be divided over several physical memories or because modulo addressing is being used). Therefore, one has less freedom to choose an appropriate ordering function than in the case of the execution order. Using an ordering function with a non-linear relation to the physical memory addresses could result in serious estimation errors.

Another important difference between execution order and storage order is the fact that, in practice, a storage location can be treated as an atomical unit for many purposes (even though it may correspond to several memory locations), while on the other hand operations may be decomposed into several "sub-operations" with different (but related) execution dates and durations. For instance, on a programmable processor, the execution of a statement may take several clock cycles. Moreover, depending on the memory type, the fetching of operands and storing of results may occur in different clock cycles than the actual datapath operation, e.g. operands may be fetched in one cycle, the datapath operation may be executed in the next cycle and the results may be stored during yet another clock cycle. It may even be possible that the memory accesses of different operations are interleaved in time, e.g. due to bandwidth considerations.

So, a simple time order model associating an execution date with every operation may not be sufficient to model practical applications accurately. However:

In practice, if the memory accesses corresponding to an operation do not coincide with the actual execution of the operation, the time offset for the accesses with respect to the operations is always the same for operations corresponding to the same statement. For instance, operands may always be fetched one clock cycle before the operation and the results may always be stored one clock cycle after the operation. Moreover, it makes no sense to fully decouple the memory accesses from the corresponding operations, i.e. memory accesses always have to be "synchronized" with their corresponding data operations. For instance, for a statement being executed in a loop, it generally makes no sense to perform all read accesses first, all data operations after that, and finally all write accesses. Doing so would implicitly require a (potentially large) extra buffer for storing the operands and/or the definition. In case one really wants to model such a buffering strategy, it should be done explicitly, i.e. by explicitly modeling the transfers to and from the buffers (by means of extra iteration, operand, and/or definition domains).

Note that this does not mean that every storage location always should be modeled explicitly. It is for instance possible that an operand is fetched a few cycles before it is actually needed by an operation, such that it has to be stored temporarily in a register. But as long as the memory accesses are not decoupled from the corresponding data operations, the required number of extra storage locations remains limited (usually at most a few locations, such that they can reside in foreground memory). In that case these (few) extra storage locations usually can be neglected (compared to the large background storage), certainly for memory-intensive applications, and need not to be modeled explicitly (in most contexts).

Based on this reasoning, it seems natural to express the time order of the accesses as a function of the time order of the corresponding operations. For instance, if a set of operations is executed at time 2*(i+j*10), then the corresponding write accesses could occur at time (2*(i+j*10))+1, i.e. one time unit later than the actual operations. In practice, the time offset between the accesses and the data operations is constant, or can at least assumed to be constant. On modern processors it is possible that this time offset is not always constant or is even unpredictable (e.g. because of run-time operation scheduling and out-of-order execution), but at least the processor has to make sure that the relative order is a valid one. So, if we specify a valid relative order in the program (based on constant offsets), the processor is allowed to change this order as long as the I/O behavior of the program is not altered.

This timing model is fully compatible with a model where the time offsets for read and write accesses are measured from the start of the body of loops. In such a model, it is implicitly assumed that the corresponding data operations are executed at fixed time offsets from the start of the loop bodies, such that the read and write accesses remain synchronized with the data operations.

For the domain models presented above, it would be difficult to define timing functions on stand-alone definition or operand domains (which correspond to memory accesses), since in general the mappings between the iteration domains and definition or operand domains can be non-injective, such that one point in a definition or operand domain may correspond to several memory accesses. It would then be very difficult to distinguish between accesses represented by the same point. Therefore, it is easier to use indirect timing functions, such that the timing functions of the memory accesses are defined in terms of the timing functions of the corresponding operations. For operations there is no such ambiguity problem, since each point in an iteration domain corresponds to one operation and vice versa, and consequently we can associate a unique execution date with each memory access.

In case one is only interested in the relative execution order of operations and/or memory accesses, one can assume that each operation and/or access takes exactly one time unit to complete, which is very often even true in practice. By doing so, two operations or accesses either completely overlap in time or don't overlap at all, i.e. operations or accesses cannot partially overlap in time. This can make the mathematical modeling and optimization somewhat simpler. In case it is not possible to use such a simplified model, one has to rely on a more detailed one. In this text we assume that we can make this simplification though. Based on the reasoning given above, we can define the following ordering functions: $O_i^{time}(\ )$: the time order function of $D_i^{iter}$. Evaluating this function for a point in $D_i^{iter}$ results in the "execution date" of the corresponding operation. The meaning of the term "execution date" is context dependent, as stated before, i.e. it may refer to an absolute execution date (e.g. in terms of a number of clock cycles) or to a relative execution date (e.g. in terms of a number of executions).

$O_{ikm}^{wtime}(\ )$: the time offset function of $D_{ikm}^{def}$. The resulting offset is an offset relative to $O_i^{time}(\ )$. A write access corresponding to a point in $D_{ikm}^{def}$ occurs at this offset in time relative to the execution of the corresponding operation. In practice, this offset is always constant (or can at least assumed to be constant). Again, the same remarks apply with respect to the time unit used.

$O_{jlm}^{rtime}(\ )$: the time offset function of $D_{jlm}^{oper}$. The resulting offset is an offset relative to $O_j^{time}(\ )$. A read access corresponding to a point in $D_{jlm}^{oper}$ occurs at this offset in time relative to the execution of the corresponding operation. Again, in practice, this offset is always constant (or can assumed to be constant).

$O_m^{addr}(\ )$: the storage order function of $D_m^{var}$. Evaluating this function for a point in $D_m^{var}$ results in the storage address at which the corresponding variable is stored. In general, there is a (piece-wise) linear relation between storage addresses and absolute memory addresses (although the storage order function may be non-linear).

In general, each of these functions may have (extra) hidden or auxiliary dimensions as arguments and may be accompanied by extra constraints on these extra dimensions (e.g. a symbolic constant), represented by $C_m^{addr}(\ ) \geq 0$, $C_{jlm}^{rtime}(\ ) \geq 0$, $C_{ikm}^{wtime}(\ ) \geq 0$. In practice, $C_{jlm}^{rtime}(\ )$ and $C_{ikm}^{wtime}(\ )$ are generally not present, and therefore we do not mention them explicitly any more in the following in order to keep our notations a bit simpler. We could extend these simple models to take into account operations with non-unit durations for example but, for practical purposes, these simple models are usually more than sufficient.

The domain and order models presented above are sufficient to be able to perform data-flow analysis of the program. An important concept in data-flow analysis is that of a data dependency. In general a data dependency denotes a kind of precedence constraint between operations. The basic type of dependency is the value-based flow dependency. A value-based flow dependency between two operations denotes that the first one produces a data value that is being consumed by the second one, so the first one has to be executed before the second one.

Other types of dependencies (e.g. memory-based flow dependencies, output dependencies, anti-dependencies, etc.) also correspond to precedence constraints, but these are purely storage related, i.e. they are due to the sharing of storage locations between different data values. This kind of dependencies is only important for the analysis of procedural non-single-assignment code. Eventually, the goal of dependency analysis is to find all the value-based flow dependencies, as they are the only "real" dependencies. Given the value-based flow dependencies, it is (in theory) possible to convert any procedural non-single-assignment code to single-assignment form, where the only precedence constraints left are the value-based flow-dependencies.

For reasons of simplicity, we assume from now on that the code that we are analyzing or optimizing has been converted to single-assignment form. The theory and techniques presented in the following are however also applicable and extendible to non-single-assignment code, provided that the value-based flow dependencies are known. We also use the term flow dependency or simply dependency to refer to a value-based flow dependency in the following.

Just like we do not describe individual operations or individual variables, we also do not describe individual dependencies between operations either. Instead we describe groups of dependencies between groups of operations. A simple example is shown next.

```
int A[5][15];
for (i = 0; i < 5; ++i)
{
    for (j = 0; j < 10; ++j)
S1: A[i][j] = f1(...);
    ...
    for (k = 5; k < 15; ++k)
S2: ... = f2(A[i][k]);
```

The domain descriptions for this example are the following:

$$D_A^{var} = \{[a_1, a_2] \mid 0 \le a_1 \le 4 \wedge 0 \le a_2 \le 14 \wedge [a_1, a_2] \in \mathbb{Z}^2\}$$

$$D_1^{iter} = \{[i, j] \mid 0 \le i \le 4 \wedge 0 \le j \le 9 \wedge [i, j] \in \mathbb{Z}^2\}$$

$$D_{11A}^{def} = \{[a_1, a_2] \mid \exists [i, j] \in D_1^{iter} \text{ s.t.}$$
$$a_1 = i \wedge a_2 = j \wedge [a_1, a_2] \in \mathbb{Z}^2\}$$

$$D_2^{iter} = \{[i, k] \mid 0 \le i \le 4 \wedge 5 \le k \le 14 \wedge [i, k] \in \mathbb{Z}^2\}$$

$$D_{21A}^{oper} = \{[a_1, a_2] \mid \exists [i, k] \in D_2^{iter} \text{ s.t.}$$
$$a_1 = i \wedge a_2 = k \wedge [a_1, a_2] \in \mathbb{Z}^2\}$$

Figure 3:
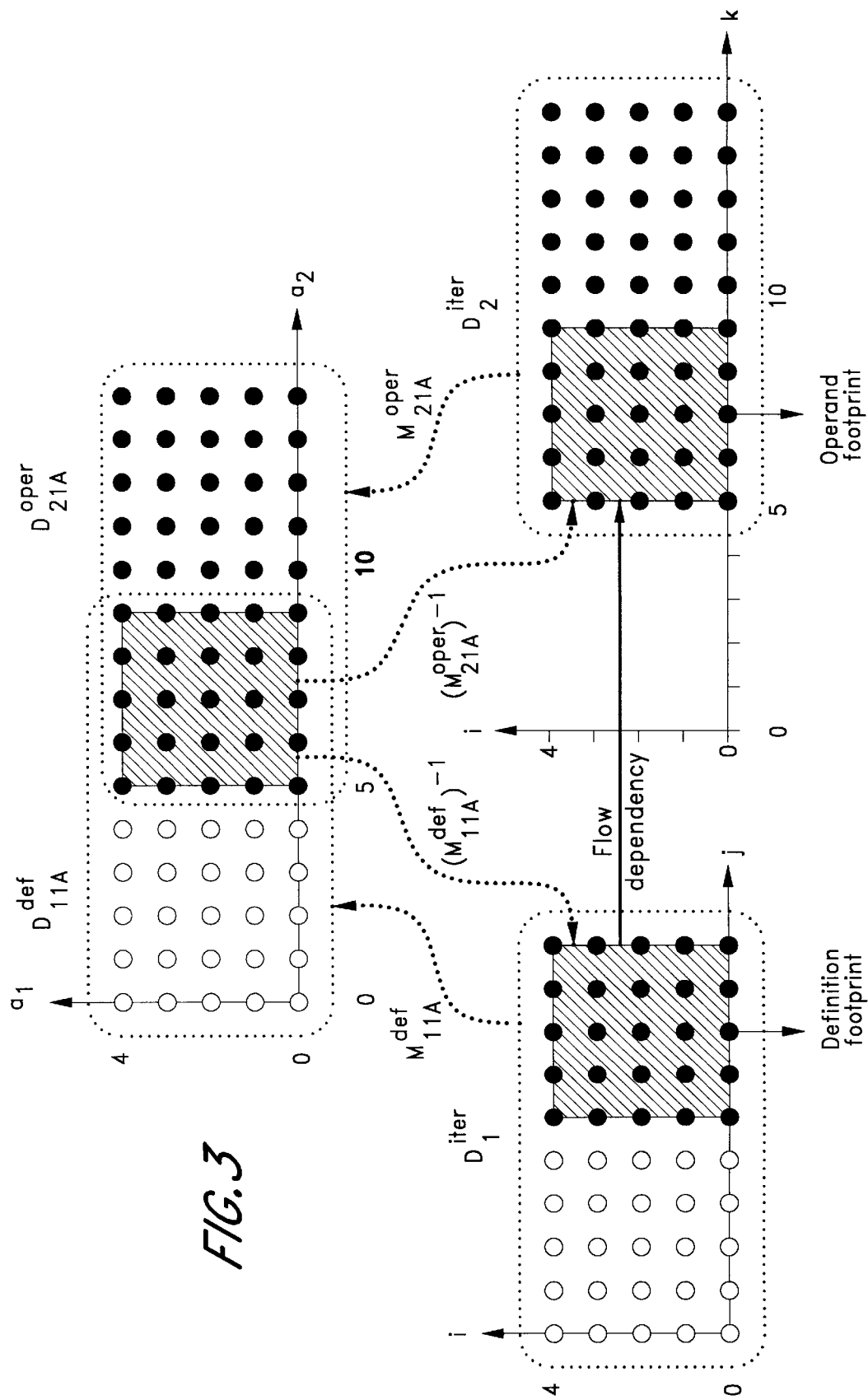
FIG. 3 is an example of domains and corresponding flow dependency according to the present invention.

A graphical representation of these domains is shown in FIG. 3. One can see that some of the elements of array A that are being produced during the executions of statement S1 are also being consumed during the executions of statement S2. Consequently there exists a flow dependency between these two statements. First we can find the elements of the array that contribute to the dependency by simply intersecting the definition and operand domain. The points in the intersection correspond to the array elements that are being produced by S1 and consumed by S2. Given these elements, we can find out which operations (i.e. executions of the statements) correspond to them by applying the inverse definition or operand mapping.

We refer to the result of the inverse mappings as the definition footprint and operand footprint respectively. Note that in general the definition and operand mappings may be non-injective, but this poses no problems in this general model as we impose no restriction on the nature of mappings. Non-injectivity may complicate the analysis of these dependencies though.

The most general way to describe value-based dependencies is by means of dependency relations, which are mappings from one iteration domain to another one. For our example we obtain the following dependency relation, denoted by $M_{1211A}^{flow}$:

$$M_{1211A}^{flow} = \{[i, j] \to [i', k] \mid \exists [a_1, a_2] \in D_A^{var} \text{ s.t.}$$
$$M_{11A}^{def}(i, j) = [a_1, a_2] = M_{21A}^{oper}(i', k) \wedge$$
$$[i, j] \in D_1^{iter} \wedge [i', k] \in D_2^{iter}\}$$

$$= \{[i, j] \to [i', k] \mid i = i' \wedge j = k \wedge$$
$$0 \le i \le 4 \wedge 0 \le j \le 9 \wedge 0 \le i' \le 4 \wedge 5 \le k \le 14 \wedge$$
$$[i, j] \in \mathbb{Z}^2 \wedge [i', k] \in \mathbb{Z}^2\}$$

$$= \{[i, j] \to [i, k] \mid 0 \le i \le 4 \wedge 5 \le j = k \le 9 \wedge [i, j, k] \in \mathbb{Z}^3\}$$

When we apply this mapping to $D_1^{iter}$, we obtain the operand footprint. Similarly, when we apply the inverse mapping to $D_2^{iter}$, we obtain the definition footprint. Based on this example, we can extend our general model to include value-based flow dependency relations. A dependency due to an overlap between a definition domain $D_{ikm}^{def}$, belonging to an iteration domain $D_i^{iter}$, and an operand domain $D_{jlm}^{oper}$, belonging to an iteration domain $D_j^{iter}$, is represented by the following dependency relation:

$$M_{ijklm}^{flow} = \{\mathbf{i} \to \mathbf{j} \mid \exists \mathbf{s} \in D_m^{var} \text{ s.t. } \mathbf{i} \in D_i^{iter} \wedge \mathbf{j} \in D_j^{iter} \wedge \quad (3.7)$$
$$M_{ikm}^{def}(\mathbf{i}) = \mathbf{s} = M_{jlm}^{oper}(\mathbf{j})\}$$

Of course the definition and operand domains causing a dependency always belong to the same array. In general there may be several dependencies present between two statements, if there are multiple overlapping definition and operand domains.

As stated before, the primary domain models do not contain all information about the programs being modeled. Especially the execution and storage order are missing in these models. If one wants to perform storage optimization, this information about order is crucial. However, the execution and storage order are exactly the subject of optimization, i.e. the result of an optimization is a(n) (new) execution and/or storage order. Hence we must be able to decide whether such orders are valid or not, before we can try to optimize them.

Therefore, we have to derive some necessary and sufficient conditions that the execution and storage order must satisfy. For reasons mentioned earlier, we restrict ourselves to single-assignment programs. The result can be extended to non-single-assignment programs (provided that accurate data-flow analysis is possible), but this would not give extra insights and it would only obscure things. If a less accurate (conservative) data-flow analysis would be used for non-single-assignment programs, the memory occupation models described in the following would still be usable in the sense that they would be conservative too, i.e. they would describe a worst-case memory occupation.

We can say that a memory location is occupied as long as it contains a data value that may still be needed by the program being executed or by its environment. During the execution of a program, a certain memory location may contain several distinct values during disjoint time intervals. It must be clear that an execution and storage order are invalid if they result in two distinct values occupying the same memory location at the same time. But before we can check this, we must first know when a memory location is occupied. The following example shows how we can find this out:

```
int A[15];
    for (i = 0; i < 10; ++i)
S1: A[i] =...;
    ...
    for (j = 5; j < 15; ++j)
S2: ... = f(A[j]);
```

Figure 4:
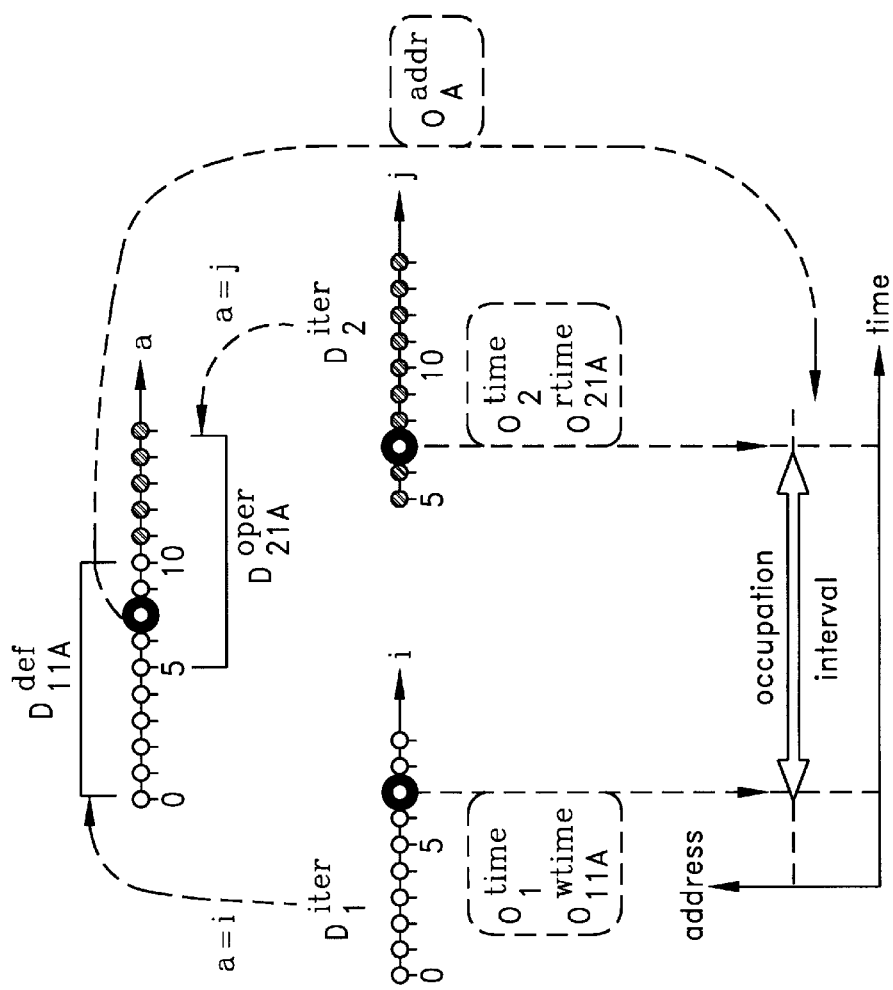
FIG. 4 is an example of memory occupation interval according to the present invention.

The corresponding iteration, definition and operand domains have been graphically represented at the top of FIG. 4. For this simple example, one can easily see that there are some elements of A being produced during the executions of statement S1 and also being consumed during the executions of statement S2. This results in partially overlapping definition and operand domains, as indicated at the top of FIG. 4. Consequently, there exists a (value-based) flow-dependency between these two statements.

For each array element that is written during the execution of the first statement and read during the execution of the second one, we can easily find out when it is written, when it is read and where it is stored, provided that we know the execution order of both statements and the storage order of the array. This is indicated for one of the common array elements in FIG. 4. So, in an address/time diagram, shown at the bottom of the figure, we can see which is the location being occupied and when it is occupied. Note that in practice, some values may be read multiple times, so the corresponding memory location is occupied until it is read for the last time.

From the above example we can see that in principle, given the primary domain descriptions and ordering functions, we can derive the occupation intervals for each memory location. However, just as we don't want to describe individual operations and individual variables, but groups of operations and groups of variables instead, we also don't want to describe the memory occupation for each individual location either. If possible, we should be able to come up with closed mathematical expressions describing the memory occupation of groups of memory locations.

As indicated above, it is possible to derive the memory occupation interval and address for each variable that is being written during the execution of one statement and that is being read during the execution of another statement, i.e. each variable that contributes to a (value-based) flow-dependency between two statements. Not surprisingly, given two statements, one of which writes elements of an array and one of which reads elements of the same array, it is possible to come up with a closed expression describing the memory occupation for all values being written by the first statement and being read by the second one.

First of all, given two such statements, we can easily find the mathematical description for the commonly accessed array elements and the addresses they occupy, provided that we know the storage order for that array, by taking the intersection of the corresponding definition and operand domains, and applying the storage order to the intersection:

$$D^{addr}_{ijklm} = \{a \mid \exists s \in D^{var}_m, w \text{ s.t. } a = O^{addr}_m(s, w) \land \quad (3.8)$$
$$C^{addr}_m(w) \geq 0 \land s \in D^{def}_{ikm} \cap D^{oper}_{jlm}\}$$

This expression describes all of the addresses that are (potentially) being occupied during some time due to a flow-dependency between two statements. Note that in theory, the constraint $s \in D_m^{var}$ should be redundant, at least for valid programs, since the definition and operand domains should always be subsets of the variable domains (otherwise an array is being read or written outside its boundaries). In practice however, this extra constraint may contain some extra information. For instance, if the reads or sprites are non-manifest, and no other information is known except that they should not access the array outside its boundaries, then it is not necessary to add this information explicitly to all the definition or operand domains. Instead, it can be added only to the variable domain. In order to be complete, we also need to know when these addresses are occupied. From the execution order, we can derive when the addresses are written and when they are read:

$$D^{wtime}_{ikm} = \{w \mid \exists i \in D^{iter}_i, x \text{ s.t.} \quad (3.9)$$
$$w = O^{wtime}_{ikm}(O^{time}_i(i, x)) \land C^{time}_{ikm}(x) \geq 0\}$$

$$D^{rtime}_{jlm} = \{r \mid \exists j \in D^{iter}_j, y \text{ s.t.} \quad (3.10)$$
$$r = O^{rtime}_{jlm}(O^{time}_j(j, y)) \land C^{time}_{jlm}(y) \geq 0\}$$

We are now ready to combine these 3 expressions, as we know that each address in equation 3.8 is possibly (as it may not be manifest) occupied from the corresponding time in equation 3.9 till at least the corresponding time in equation 3.10. This results in the following expression:

$$D^{BOAT}_{ijklm} = \{[a, t] \mid \exists s \in D^{var}_m, i \in D^{iter}_i, j \in D^{iter}_j, x, y, w \text{ s.t.} \quad (3.11)$$
$$a = O^{addr}_m(s, w) \land C^{addr}_m(w) \geq 0 \land$$
$$M^{def}_{ikm}(i) = s = M^{oper}_{jlm}(j) \land$$
$$t \geq O^{wtime}_{ikm}(O^{time}_i(i, x)) \land C^{time}_{ikm}(x) \geq 0 \land$$
$$t \leq O^{rtime}_{jlm}(O^{time}_j(j, y)) \land C^{time}_{jlm}(y) \geq 0\}$$

This expression is the description of a two-dimensional geometrical domain, which we call a binary occupied address/time domain (BOAT-domain, binary, because it is always associated with a (value-based) flow-dependency between two statements (possibly identical)). Each point with integer coordinates in this domain represents an occupied address/time tuple, i.e. an address that is (possibly) being occupied at that time. For a given execution and storage order, this equation contains all information available at compile time about the (potential) memory occupation due to a flow dependency between two statements. Comparison with equation 3.7 reveals that the mathematical constraints present in a dependency relation are also present in equation 3.11. In fact a BOAT-domain is nothing more than a mapping of a dependency on an address/time space. Note that the addresses contained in the BOAT-domain are discrete, whereas time is continuous (e.g. when an address is occupied from time t=1 till t=2, it is also occupied at time t=1.3763, but an address with a non-integral value is meaningless in practice). For practical purposes, time can also be considered to be discrete, as we assume that nothing interesting can happen at non-integral points in time. Note that in the special case, where all constraints and ordering functions are manifest and affine, and all constraints are convex, the resulting BOAT-domain is a linearly bounded lattice (LBL).

An example shows how non-manifest behavior can be incorporated in the BOAT-domain descriptions:

```
int A[5][5], B[5];
for (i = 0; i < 5; ++i)
    for (j = 0; j < 5; ++j)
S1:     A[i][j] = f(...);
        for (k = 0; k < 5; ++k)
            for (l = 0; l < 5; ++l)
                if (B[k] >= 0)       /*non-manifest*/
S2:                 ... = g(A[k][l]);
```

We can extract the domain descriptions in a straightforward way:

$$\mathbf{D}_A^{var} = \{[s_1, s_2] \mid 0 \le s_1 \le 4 \wedge 0 \le s_2 \le 4 \wedge [s_1, s_2] \in \mathbb{Z}^2\}$$

$$\mathbf{D}_1^{iter} = \{[i, j] \mid 0 \le i \le 4 \wedge 0 \le j \le 4 \wedge [i, j] \in \mathbb{Z}^2\}$$

$$\mathbf{D}_{11A}^{def} = \{[d_1, d_2] \mid \exists [i, j] \in \mathbf{D}_1^{iter} \text{ s.t. } d_1 = i \wedge d_2 = j\}$$

$$\mathbf{D}_2^{iter} = \{[k, l] \mid \exists p \text{ s.t. } 0 \le k \le 4 \wedge 0 \le l \le 4 \wedge p \ge 0 \wedge p = \mathbf{F}_2^{iter}(k) \wedge [k, l] \in \mathbb{Z}^2\}$$

$$\mathbf{D}_{21A}^{oper} = \{[o_1, o_2] \mid \exists [k, l] \in \mathbf{D}_2^{iter} \text{ s.t. } o_1 = k \wedge o_2 = l\}$$

Figure 5:
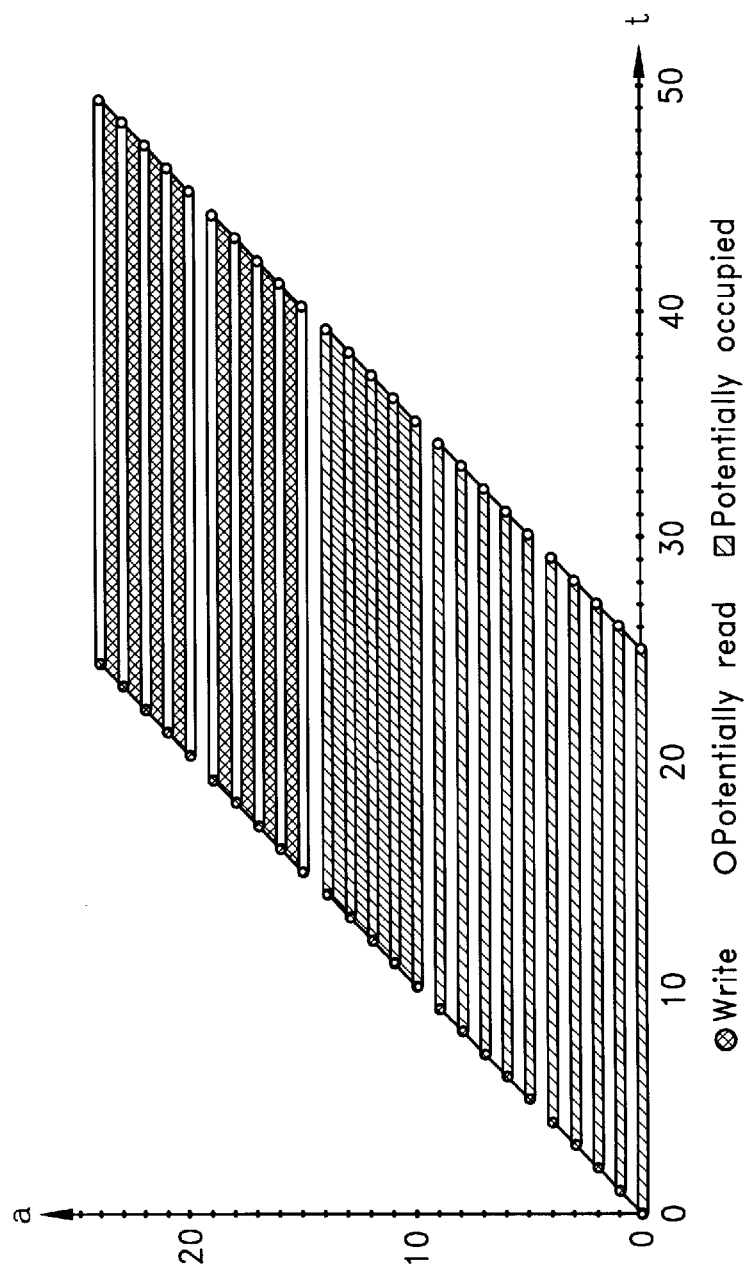
FIG. 5 is an example of a BOAT-domain according to the present invention.

Note that $F_2^{iter}(\ )$ is an unknown function, which is used to model the non-manifest behavior of the program: we are not sure whether any of the elements of A is ever read. If we assume that this program is executed sequentially and that each of the statements S1 and S2 can be executed in one clock cycle and we assume a row major storage order for the array A, the graphical representation of the BOAT-domain is shown in FIG. 5. Due to the condition in the program, it is not known until run-time whether any of the elements of A is ever read and whether the corresponding memory locations are therefore ever occupied. We do know however that there are some relations between some of the occupied address/time tuples: if for a given execution of the k-loop, the condition B[k]>=0 evaluates to true, then all of the corresponding executions of statement S2 are executed. Consequently, if one of the corresponding addresses is read, all of them are read. In other words, the addresses can be divided into groups of addresses whose run-time occupation is related. These groups are indicated by the differently shaded regions in the figure. This information is explicitly present in the description of the BOAT-domain due to the presence of $F_2^{iter}(\ )$. This can be very valuable in a memory optimization context. Ignoring it and taking worst-case assumptions can prohibit certain optimizations.

We have shown that it is possible to accurately model the memory occupation for a set of variables being written by one statement and being read by another one, in other words, for each variable contributing to a value-based flow-dependency. However, we are not only interested in the memory occupation due to flow-dependencies, but rather in the memory occupation of a complete set of variables, i.e. a complete array. It is assumed that the storage order is common for the complete array. If required, an array can always be divided first into sub-arrays (e.g. basic sets) each having their own storage order.

We can easily find the complete memory occupation of an array if we know the memory occupation due to each value-based flow dependency related to that array. The memory occupation of the array is then simply the union of the memory occupation due to each of the flow dependencies. Consequently, we can also model the memory occupation of an array by a geometrical domain, which we call the occupied address/time domain (OAT-domain) of that array. This domain is simply the union of the BOAT-domains of all value-based flow-dependencies related to that array:

$$\mathbf{D}_m^{OAT} = \bigcup_{ijkl} \mathbf{D}_{ijklm}^{BOAT} \quad (3.12)$$

In general, the different BOAT-domains of an array are not disjoint. For instance, if an array element is written by one statement and read by two other statements, then this element contributes to two flow-dependencies and the corresponding BOAT-domains have certain address/time tuples in common. An example of the memory occupation for a complete array is given next.

```
int A[4][4];
for (i = 0; i < 4; ++i)
    for (j = 0; j < 4; ++j)
S1:     if(j <=i) A[i][j] = f1(...);
        for (k = 0; k < 4; ++k)
            for (l = 0; l < 4; ++l)
S2:             if(l > k) A[k][l] = f2(...);
        for (m = 0; m < 4; ++m)
            for (n = 0; n < 4; ++n)
S3:             if(j >=m)... = g1(A[3-m][n]);
        for (o = 0; o < 4; ++o)
            for (p = 0; p < 4; ++p)
S4:             if(p <=o)... = g2(A[3-o][p]);
```

This program contains two statements in which elements of A are written and two statements in which elements are read. Consequently, four value-based flow-dependencies can be present (one from each writing statement to each reading statement), and in fact they are present here. This means that we can describe four BOAT-domains.

The variable, iteration, definition and operand domains are the following:

$$\mathbf{D}_A^{var} = \{[s_1, s_2] \mid 0 \le s_1 \le 3 \wedge 0 \le s_2 \le 3 \wedge [s_1, s_2] \in \mathbb{Z}^2\}$$

$$\mathbf{D}_1^{iter} = \{[i, j] \mid 0 \le i \le 3 \wedge 0 \le j \le 3 \wedge j \le i \wedge [i, j] \in \mathbb{Z}^2\}$$

$$\mathbf{D}_{11A}^{def} = \{[s_1, s_2] \mid \exists [i, j] \in \mathbf{D}_1^{iter} \text{ s.t.}$$
$$s_1 = i \wedge s_2 = j \wedge [s_1, s_2] \in \mathbb{Z}^2\}$$

$$\mathbf{D}_2^{iter} = \{[k, l] \mid 0 \le k \le 3 \wedge 0 \le l \le 3 \wedge l > k \wedge [k, l] \in \mathbb{Z}^2\}$$

$$\mathbf{D}_{21A}^{def} = \{[s_1, s_2] \mid \exists [k, l] \in \mathbf{D}_2^{iter} \text{ s.t.}$$
$$s_1 = k \wedge s_2 = l \wedge [s_1, s_2] \in \mathbb{Z}^2\}$$

$$\mathbf{D}_3^{iter} = \{[m, n] \mid 0 \le m \le 3 \wedge 0 \le n \le 3 \wedge n \ge m \wedge [n, m] \in \mathbb{Z}^2\}$$

$$\mathbf{D}_{31A}^{oper} = \{[s_1, s_2] \mid \exists [n, m] \in \mathbf{D}_3^{iter} \text{ s.t.}$$
$$s_1 = 3 - m \wedge s_2 = n \wedge [s_1, s_2] \in \mathbb{Z}^2\}$$

$$\mathbf{D}_4^{iter} = \{[o, p] \mid 0 \le o \le 3 \wedge 0 \le p \le 3 \wedge p \le o \wedge [o, p] \in \mathbb{Z}^2\}$$

$$\mathbf{D}_{41A}^{oper} = \{[s_1, s_2] \mid \exists [o, p] \in \mathbf{D}_4^{iter} \text{ s.t.}$$
$$s_1 = 3 - o \wedge s_2 = p \wedge [s_1, s_2] \in \mathbb{Z}^2\}$$

Again, we assume a procedural execution order in which each statement takes 1 time unit to execute, and a column-major storage order for A:

$$O_1^{time}(i, j) = 4i + j \qquad O_{11A}^{wtime}(x) = x$$

-continued $$O_2^{time}(k, l) = 16 + 4k + l \quad O_{21A}^{wtime}(x) = x$$
$$O_3^{time}(n, m) = 32 + 4m + n \quad O_{31A}^{time}(x) = x \quad O_A^{addr}(s_1, s_2) = s_1 + 4s_2$$
$$O_4^{time}(o, p) = 48 + 4o + p \quad O_{41A}^{time}(x) = x$$

This leads us to the following BOAT-domain descriptions, after simplification:

$$\mathbf{D}_{1311A}^{BOAT} = \{[a, t] \mid \exists [s_1, s_2] \in \mathbb{Z}^2 \text{ s.t.}$$
$$a = s_1 + 4s_2 \wedge t \geq 4s_1 + s_2 \wedge t \leq 44 - 4s_1 + s_2 \wedge$$
$$0 \leq s_1 \leq 3 \wedge 0 \leq s_2 \leq 3 \wedge s_2 \leq s_1 \wedge s_2 \geq 3 - s_1\}$$

$$\mathbf{D}_{1411A}^{BOAT} = \{[a, t] \mid \exists [s_1, s_2] \in \mathbb{Z}^2 \text{ s.t.}$$
$$a = s_1 + 4s_2 \wedge t \geq 4s_1 + s_2 \wedge t \leq 60 - 4s_1 + s_2 \wedge$$
$$0 \leq s_1 \leq 3 \wedge 0 \leq s_2 \leq 3 \wedge s_2 \leq s_1 \wedge s_2 \leq 3 - s_1\}$$

$$\mathbf{D}_{2311A}^{BOAT} = \{[a, t] \mid \exists [s_1, s_2] \in \mathbb{Z}^2 \text{ s.t.}$$
$$a = s_1 + 4s_2 \wedge t \geq 16 + 4s_1 + s_2 \wedge t \leq 44 - 4s_1 + s_2 \wedge$$
$$0 \leq s_1 \leq 3 \wedge 0 \leq s_2 \leq 3 \wedge s_2 > s_1 \wedge s_2 \geq 3 - s_1\}$$

$$\mathbf{D}_{2411A}^{BOAT} = \{[a, t] \mid \exists [s_1, s_2] \in \mathbb{Z}^2 \text{ s.t.}$$
$$a = s_1 + 4s_2 \wedge t \geq 16 + 4s_1 + s_2 \wedge t \leq 60 - 4s_1 + s_2 \wedge$$
$$0 \leq s_1 \leq 3 \wedge 0 \leq s_2 \leq 3 \wedge s_2 > s_1 \wedge s_2 \leq 3 - s_1\}$$

A graphical representation of these BOAT- and OAT-domains is shown in FIG. 6. Note that there is an overlap between $D_{1311A}^{BOAT}$ and $D_{1411A}^{BOAT}$ at addresses 3 and 6, and an overlap between $D_{2311A}^{BOAT}$ and $D_{2411A}^{BOAT}$ at addresses 9 and 12. This is because these addresses are being read more than once. The dotted triangles represent the read and write accesses during the different loops. Note that write (or read) operations of the same statement may contribute to different BOAT-domains in different ways (e.g. not all writes of the same statement must contribute to the same BOAT-domain).

Now that we know how to model the memory occupation for be complete array, we can easily derive an expression for the occupation of a memory itself. It is again simply the union of the memory occupation of all arrays assigned to that memory. The result is again a geometrical domain, which we call the collective occupied address/time domain (COAT-domain) for that memory:

$$\mathbf{D}^{COAT} = \bigcup_m \mathbf{D}_m^{OAT} \quad (3.13)$$

One of the preconditions for an execution and storage order to be valid, is that none of the OAT-domains of different arrays assigned to the same memory overlap, because this would mean that 2 arrays are using the same memory location at the same time, which is incorrect.

An example of a COAT-domain for a non-manifest program and a memory containing three arrays is given next.

```
int A[10], B[5], C[10];
    for (i = 0; i < 10; ++i)
S1: C[i] = f1(...);
    for (j = 0; j < 5; ++j)
S2: A[j] = f2(...);
    for (k = 5; k < 10; ++k)
S3: if (C[k-5]> 0)
```

-continued

```
S4:     A[k] = f3(...);
        else
S5:     B[k-5] ' f4(...);
        for (l = 0; l < 10; ++l)
S6:     if (1 >= 5 && C[l]<= 0)
S7:         ... = f5(B[l-5]);
        else
S8:         ... = f6(A[l]);
```

The variable, iteration, definition and operand domains for this example are the following:

$$\mathbf{D}_A^{var} = \{s_a \mid 0 \leq s_a \leq 9 \wedge s_a \in \mathbb{Z}\}$$

$$\mathbf{D}_B^{var} = \{s_b \mid 0 \leq s_b \leq 4 \wedge s_b \in \mathbb{Z}\}$$

$$\mathbf{D}_C^{var} = \{s_c \mid 0 \leq s_c \leq 9 \wedge s_c \in \mathbb{Z}\}$$

$$\mathbf{D}_1^{iter} = \{i \mid 0 \leq i \leq 9 \wedge i \in \mathbb{Z}\}$$

$$\mathbf{D}_2^{iter} = \{j \mid 0 \leq j \leq 4 \wedge j \in \mathbb{Z}\}$$

$$\mathbf{D}_3^{iter} = \{k \mid 5 \leq k \leq 9 \wedge k \in \mathbb{Z}\}$$

$$\mathbf{D}_4^{iter} = \{k \mid 5 \leq k \leq 9 \wedge p = F(k) \wedge p > 0 \wedge k \in \mathbb{Z}\}$$

$$\mathbf{D}_5^{iter} = \{k \mid 5 \leq k \leq 9 \wedge p = F(k) \wedge p \leq 0 \wedge k \in \mathbb{Z}\}$$

$$\mathbf{D}_6^{iter} = \{l \mid 0 \leq l \leq 9 \wedge l \in \mathbb{Z}\}$$

$$\mathbf{D}_7^{iter} = \{l \mid 0 \leq l \leq 9 \wedge q = F(l) \wedge l \geq 5 \wedge q \leq 0 \wedge l \in \mathbb{Z}\}$$

$$\mathbf{D}_8^{iter} = \{l \mid 0 \leq l \leq 9 \wedge q = F(l) \wedge (l < 5 \vee q > 0) \wedge l \in \mathbb{Z}\}$$

$$\mathbf{D}_{11C}^{def} = \{s_c \mid \exists i \in \mathbf{D}_1^{iter} \text{ s.t. } s_c = i\}$$

$$\mathbf{D}_{21A}^{def} = \{s_a \mid \exists j \in \mathbf{D}_2^{iter} \text{ s.t. } s_a = j\}$$

$$\mathbf{D}_{31C}^{oper} = \{s_c \mid \exists k \in \mathbf{D}_3^{iter} \text{ s.t. } s_c = k - 5\}$$

$$\mathbf{D}_{41A}^{def} = \{s_a \mid \exists k \in \mathbf{D}_4^{iter} \text{ s.t. } s_a = k\}$$

$$\mathbf{D}_{51B}^{def} = \{s_b \mid \exists k \in \mathbf{D}_5^{iter} \text{ s.t. } s_b = k - 5\}$$

$$\mathbf{D}_{61C}^{oper} = \{s_c \mid \exists l \in \mathbf{D}_6^{iter} \text{ s.t. } s_c = l\}$$

$$\mathbf{D}_{71B}^{oper} = \{s_b \mid \exists l \in \mathbf{D}_7^{iter} \text{ s.t. } s_b = l - 5\}$$

$$\mathbf{D}_{81A}^{oper} = \{s_a \mid \exists l \in \mathbf{D}_8^{iter} \text{ s.t. } s_a = l\}$$

We assume the following execution and storage orders (assuming that arrays A, B and C all have the same element size):

$$O_1^{time}(i) = i \quad O_{11C}^{wtime}(x) = x$$
$$O_2^{time}(j) = j + 10 \quad O_{21A}^{wtime}(x) = x$$
$$O_3^{time}(i) = 2(k - 5) + 15 \quad O_{31C}^{time}(x) = x \quad O_A^{addr}(s_a) = s_a$$
$$O_4^{time}(i) = 2(k - 5) + 16 \quad O_{41A}^{wtime}(x) = x \quad O_B^{addr}(s_b) = s_b + 5$$
$$O_5^{time}(i) = 2(k - 5) + 16 \quad O_{51B}^{wtime}(x) = x \quad O_C^{addr}(s_b) = s_c + 10$$
$$O_6^{time}(i) = 2l + 25 \quad O_{61C}^{time}(x) = x$$
$$O_7^{time}(i) = 2l + 26 \quad O_{71B}^{time}(x) = x$$
$$O_8^{time}(i) = 2l + 26 \quad O_{81A}^{time}(x) = x$$

From this, we can derive the following BOAT-domains (after simplification):

$$\mathbf{D}_{1311C}^{BOAT} = \{[a, t] \mid 10 \leq a \leq 14 \wedge a - 10 \leq t \leq 2a - 5 \wedge a \in \mathbb{Z}\}$$

-continued $$D_{1611C}^{BOAT} = \{[a, t] \mid 10 \le a \le 19 \wedge a - 10 \le t \le 2a + 5 \wedge a \in \mathbb{Z}\}$$

$$D_{2811A}^{BOAT} = \{[a, t] \mid 0 \le a \le 4 \wedge a + 10 \le t \le 2a + 26 \wedge F(a) > 0 \wedge a \in \mathbb{Z}\}$$

$$D_{4811A}^{BOAT} = \{[a, t] \mid 5 \le a \le 9 \wedge 2a + 6 \le t \le 2a + 26 \wedge F(a) > 0 \wedge a \in \mathbb{Z}\}$$

$$D_{5711B}^{BOAT} = \{[a, t] \mid 5 \le a \le 9 \wedge 2a + 6 \le t \le 2a + 26 \wedge F(a) \le 0 \wedge a \in \mathbb{Z}\}$$

Figure 7:
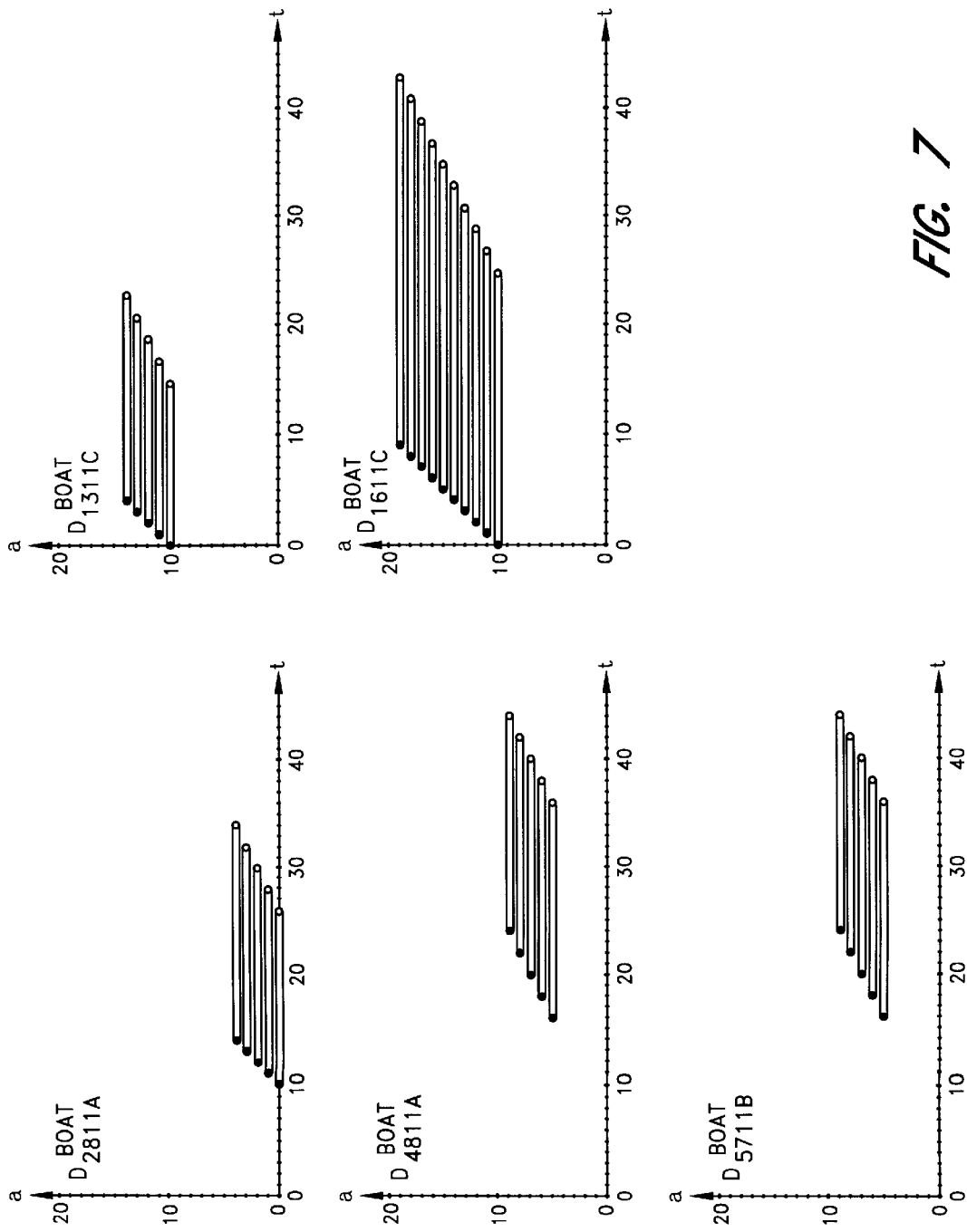
FIG. 7 shows further examples of BOAT-domains according to the present invention.
Figure 8:
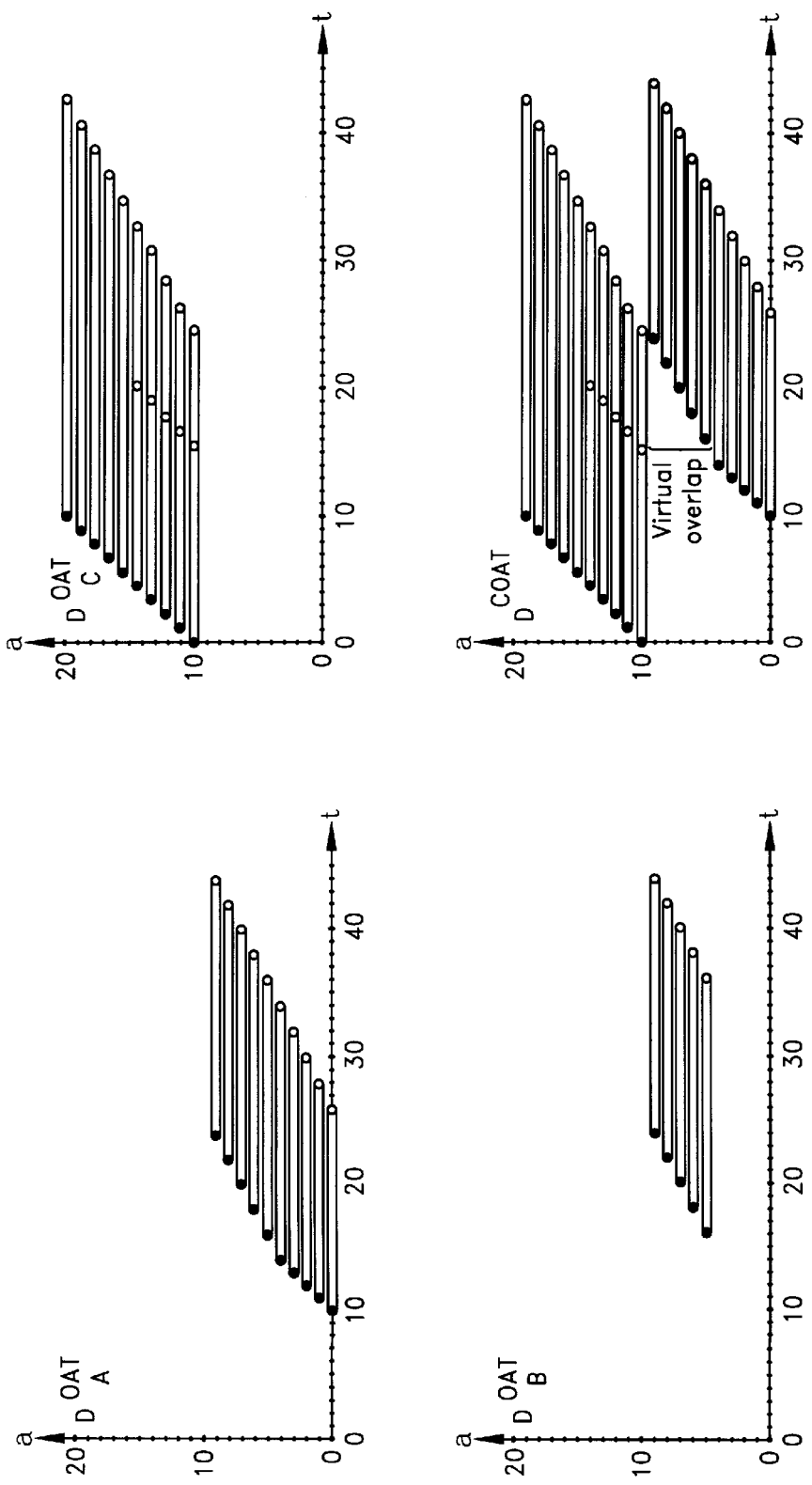
FIG. 8 shows OAT- and COAT-domains relating to FIG. 7.

The corresponding graphical representations can be found in FIG. 7. The resulting OAT-domains and COAT-domain can be found in FIG. 8. Note that the OAT-domains of arrays A and B seem to overlap graphically. This is caused by a virtual overlap between $D_{4811A}^{BOAT}$ and $D_{5711B}^{BOAT}$. One can verify that this overlap is non-existent in reality:

$$D_{4811A}^{BOAT} \cap D_{5711B}^{BOAT} = \{[a, t] \mid 5 \le a \le 9 \wedge 2a + 6 \le t \le 2a + 26 \wedge$$

$$F(a) > 0 \wedge F(a) \le 0 \wedge a \in \mathbb{Z}\}$$

$$= \phi$$

So, the memory occupation of arrays A and B is partly conditional, and the conditions for A and B are complementary. In practice, this means that some of the elements of arrays A and B can share storage locations, simply because they can never occupy those locations at the same time. If we would not have modeled this exclusive condition accurately, we could not have been sure that this storage order was valid, and we would have to make sure that the address ranges of arrays A and B were disjoint. This would require extra storage locations. So this example already clearly illustrates how a more accurate modeling of non-manifest programs may result in better solutions, compared to the ones obtained through traditional worst-case modeling techniques.

As stated before, the execution and storage order are the subject of optimization. We therefore have to be able to decide whether a given order is valid. We say that a combination of storage and execution order for a program is valid if it satisfies the following constraints:

1. No value of any variable (e.g. array element) is ever read from a memory location before it has been written to that location.
2. No memory location might (could be non-manifest) ever be overwritten when it might till contain a data value of a variable that might still have to be read.

In the following we derive a set of necessary mathematical conditions that the storage and/or execution order have to satisfy. Together, these conditions form a sufficient set for having a valid storage and execution order. Again we limit ourselves to the single-assignment case. Extensions for the non-single-assignment case are possible but require an extended data-flow analysis.

The first validity constraint only affects the execution order. Given the primary domain models, we can easily express this constraint mathematically:

$$\forall i, j, k, l, m: \quad (3.14)$$

$$\text{if } \exists \; \mathbf{i} \in \mathbf{D}_i^{\text{iter}}, \mathbf{j} \in \mathbf{D}_j^{\text{iter}}, \mathbf{s} \in \mathbf{D}_m^{\text{var}}, x, y$$

$$\text{s.t. } \mathbf{M}_{ikm}^{\text{def}}(\mathbf{i}) = \mathbf{s} = \mathbf{M}_{jlm}^{\text{oper}}(\mathbf{j}) \wedge \mathbf{C}_{ikm}^{\text{time}}(x) \ge 0 \wedge \mathbf{C}_{jlm}^{\text{time}}(y) \ge 0$$

$$\text{then } O_{ikm}^{\text{wtime}}(O_i^{\text{time}}(\mathbf{i}, x)) < O_{jlm}^{\text{rtime}}(O_j^{\text{time}}(\mathbf{j}, y))$$

This can be read as: "If a data value is written to memory during the execution of one statement and it is read during the execution of another statement, then the write access corresponding to the first operation should be executed before the read access corresponding to the second operation."

A closer look at this equation reveals that it corresponds to the precedence constraint due to a flow dependency, which is described by the dependency relation in equation 3.7. In fact equation 3.14 states that an operation that is the source of a flow dependency should be executed before the operation that is the sink.

Alternatively, equation 3.14 can be written as:

$$\forall i, j, k, l, m: \quad (3.15)$$

$$\{t \mid \exists \; \mathbf{i} \in \mathbf{D}_i^{\text{iter}}, j \in D_j^{\text{iter}}, s \in D_m^{\text{var}}, x, y \text{ s.t.}$$

$$\mathbf{M}_{ikm}^{\text{def}}(\mathbf{i}) = s = M_{jlm}^{\text{oper}}(\mathbf{j}) \wedge \mathbf{C}_{ikm}^{\text{time}}(x) \ge 0 \wedge \mathbf{C}_{jlm}^{\text{time}}(y) \ge 0 \wedge$$

$$O_{ikm}^{\text{wtime}}(O_i^{\text{time}}(\mathbf{i}, x)) \ge t \ge O_{jlm}^{\text{rtime}}(O_j^{\text{time}}(\mathbf{j}, y))\} = \phi$$

i.e. for a valid execution order, each of these sets should be empty.

Note that $O_{ikm}^{wtime}(\;)$, $O_i^{time}(\;)$, $O_{jlm}^{rtime}(\;)$, and $O_j^{time}(\;)$ are in general unknown functions, i.e. they are the result of the optimization process. Also note that it does not matter whether we use absolute or relative timing functions, as the condition only states something about the relative order. This condition is necessary to obtain a valid execution order, but it is not sufficient. In order to have a sufficient set of conditions, we must also take into account the storage order. The second validity constraint can be expressed as follows:

$$\forall i_1, j_1, k_1, l_1, m_1, i_2, k_2, m_2: \quad (3.16)$$

$$\text{if } \exists \; \mathbf{s}_1 \in \mathbf{D}_{m_1}^{\text{var}}, \mathbf{i}_1 \in \mathbf{D}_{i_1}^{\text{iter}}, \mathbf{j}_1 \in \mathbf{D}_{j_1}^{\text{iter}}, x_1, y_1, w_1,$$

$$\mathbf{s}_2 \in \mathbf{D}_{m_2}^{\text{var}}, \mathbf{i}_2 \in \mathbf{D}_{i_2}^{\text{iter}}, x_2, w_2 \text{ s.t.}$$

$$\mathbf{M}_{i_1 k_1 m_1}^{\text{def}}(\mathbf{i}_1) = \mathbf{s}_1 = \mathbf{M}_{j_1 l_1 m_1}^{\text{oper}}(\mathbf{j}_1) \wedge$$

$$\mathbf{C}_{i_1 k_1 m_1}^{\text{time}}(x_1) \ge 0 \wedge \mathbf{C}_{j_1 l_1 m_1}^{\text{time}}(y_1) \ge 0 \wedge \mathbf{C}_{m_1}^{\text{addr}}(w_1) \ge 0 \wedge$$

$$\mathbf{M}_{i_2 k_2 m_2}^{\text{def}}(\mathbf{i}_2) = \mathbf{s}_2 \wedge$$

$$\mathbf{C}_{i_2 k_2 m_2}^{\text{time}}(x_2) \ge 0 \wedge \mathbf{C}_{m_2}^{\text{addr}}(w_2) \ge 0 \wedge$$

$$O_{m_1}^{\text{addr}}(\mathbf{s}_1, w_1) = O_{m_2}^{\text{addr}}(\mathbf{s}_2, w_2) \wedge (\mathbf{s}_1 \ne \mathbf{s}_2 \vee m_1 \ne m_2)$$

$$\text{then } O_{i_2 k_2 m_2}^{\text{wtime}}(O_{i_2}^{\text{time}}(\mathbf{i}_2, x_2)) < O_{i_1 k_1 m_1}^{\text{wtime}}(O_{i_1}^{\text{time}}(\mathbf{i}_1, x_1)) \vee$$

$$O_{i_2 k_2 m_2}^{\text{wtime}}(O_{i_2}^{\text{time}}(\mathbf{i}_2, x_2)) > O_{j_1 l_1 m_1}^{\text{rtime}}(O_{j_1}^{\text{time}}(\mathbf{j}_1, y_1))$$

This expression can be read as: "If a first (program) variable is written by a statement $S_{i1}$ and read by a statement $S_{j1}$, and a second variable is written by a statement $S_{i2}$, and these variables are stored at the same memory address, and they either have different indices in the same array or belong to different arrays, then the write access corresponding to $S_{i2}$ should occur before the write access corresponding to $S_{i1}$ or after the read access corresponding to $S_{j1}$."

Together with the conditions imposed by equation 3.14, these conditions make sure that both validity constraints are satisfied and therefore form a sufficient set. Note that due to the presence of the logical or in the last line of the if part of equation 3.16, we can distinguish 2 slightly different sets of conditions: conditions that are related to the intra-array order (i.e. between elements of the same arrays) and conditions that are related to the inter-array order (i.e. between elements of different arrays).

Nevertheless, it must be clear that this expression is potentially hard to evaluate, due to the possibly large number of (mathematical) variables, and especially due to the presence of inequalities and logical or's, which can easily lead to an explosion of the number of scalar (in)equalities to be checked. In practice however, it is usually possible to simplify equation 3.16 by enforcing more stringent but simpler constraints, without sacrificing too much optimality. For instance, if one makes sure that the address ranges of two arrays are not overlapping, then these conditions are always satisfied for each pair of variables, one of which belongs to the first array and one of which belongs to the second array.

It is also important to note that equation 3.16 is again strongly related to the presence of value-based flow-dependencies, as we can recognize the constraints that are also present in equation 3.7. In other words, equation 3.16 only has to be evaluated in the presence of flow-dependencies. So, performing a dependency analysis first may already drastically reduce the number of conditions to be checked, although even then this number equals the number of flow-dependencies times the number of statements writing to array elements present in the program (assuming that each statement writes to only one array, but the extension to tuple writes is straightforward). This also indicates that the constraints can be reformulated for the non-single-assignment case, provided that an accurate data-flow analysis is available. We can again rewrite equation 3.16 as follows:

$$\forall i_1, j_1, k_1, l_1, m_1 i_2, k_2, m_2: \quad (3.17)$$

$$\{t \mid \exists s_1 \in \mathbf{D}_{m_1}^{var}, \mathbf{i}_1 \in \mathbf{D}_{i_1}^{iter}, \mathbf{j}_1 \in \mathbf{D}_{j_1}^{iter}, x_1, y_1, w_1, s_2 \in \mathbf{D}_{m_2}^{var},$$

$$\mathbf{i}_2 \in \mathbf{D}_{i_2}^{iter}, x_2, w_2 \text{ s.t. } \mathbf{M}_{i_1 k_1 m_1}^{def}(\mathbf{i}_1) = s_1 = \mathbf{M}_{j_1 l_1 m_1}^{oper}(\mathbf{j}_1) \wedge$$

$$\mathbf{C}_{i_1 k_1 m_1}^{time}(x_1) \geq 0 \wedge \mathbf{C}_{j_1 l_1 m_1}^{time}(y_1) \geq 0 \wedge \mathbf{C}_{m_1}^{addr}(w_1) \geq 0 \wedge$$

$$\mathbf{M}_{i_2 k_2 m_2}^{def}(\mathbf{i}_2) = s_2 \wedge \mathbf{C}_{i_2 k_2 m_2}^{time}(x_2) \geq 0 \wedge$$

$$\mathbf{C}_{m_2}^{addr}(w_2) \geq 0 \wedge O_{m_1}^{addr}(s_1, w_1) = O_{m_2}^{addr}(s_2, w_2) \wedge$$

$$(s_1 \neq s_2 \vee m_1 \neq m_2) \wedge t = O_{i_2 k_2 m_2}^{wtime}(O_{i_2}^{time}(\mathbf{i}_2, x_2)) \wedge$$

$$O_{i_1 k_1 m_1}^{wtime}(O_{i_1}^{time}(\mathbf{i}_1, x_1)) \leq t \leq O_{j_1, l_1, m_1}^{rtime}(O_{j_1}^{time}(\mathbf{j}_1, y_1))\} = \phi$$

In other words, for a valid execution and storage order, each of these sets should be empty. Let us again have a look at some examples.

```
        int A[10];
        for (i = 0; i < 5; ++i)
S1:       A[i] = f1(. . .);
        for (j = 0; j < 5; ++j)
S2:       . . . = f2(A[j]);
        for (k = 0; k < 5; ++k)
S3:       A[k+5] = f3(. . .);
        for (l = 0; l < 5; ++l)
S4:       . . . = f4(A[l+5]);
```

The corresponding domains are the following:

$$\mathbf{D}_A^{var} = \{s \mid 0 \leq s \leq 9 \wedge s \in \mathbb{Z}\}$$

$$\mathbf{D}_1^{iter} = \{i \mid 0 \leq i \leq 4 \wedge i \in \mathbb{Z}\}$$

$$\mathbf{D}_2^{iter} = \{j \mid 0 \leq j \leq 4 \wedge j \in \mathbb{Z}\}$$

$$\mathbf{D}_3^{iter} = \{k \mid 0 \leq k \leq 4 \wedge k \in \mathbb{Z}\}$$

$$\mathbf{D}_4^{iter} = \{l \mid 0 \leq l \leq 4 \wedge l \in \mathbb{Z}\}$$

$$\mathbf{D}_{11A}^{def} = \{s \mid \exists i \in \mathbf{D}_1^{iter} \text{ s.t. } s = i\}$$

-continued $$\mathbf{D}_{21A}^{oper} = \{s \mid \exists j \in \mathbf{D}_2^{iter} \text{ s.t. } s = j\}$$

$$\mathbf{D}_{31A}^{def} = \{s \mid \exists k \in \mathbf{D}_3^{iter} \text{ s.t. } s = k + 5\}$$

$$\mathbf{D}_{41A}^{oper} = \{s \mid \exists l \in \mathbf{D}_4^{iter} \text{ s.t. } s = l + 5\}$$

One can easily verify that the following execution order satisfies equation 3.14:

$$O_1^{time}(i) = i \qquad O_{11A}^{wtime}(x) = x$$

$$O_2^{time}(j) = j + 5 \qquad O_{21A}^{rtime}(x) = x$$

$$O_3^{time}(k) = k + 10 \qquad O_{31A}^{wtime}(x) = x$$

$$O_4^{time}(l) = l + 15 \qquad O_{41A}^{rtime}(x) = x$$

Let us assume the following storage order:

$$O_A^{addr}(s) = s \bmod 5$$

We can now check whether this order, combined with the execution order above, is valid. But first of all, we should do some dependency analysis in order to find the non-empty value-based flow-dependencies. This reduces the number of conditions to be checked. In this case, dependency analysis tells us that there are only two data dependencies: one from S1 to S2 and one from S3 to S4. Also, for this program fragment there are 2 statements writing elements to an array: S1 and S3. So, there are 4 possible combinations of flow dependencies and writing statements that have to be checked:

(S1→S2, S1), (S1→S2, S3), (S3→S4, S1) and (S3→S4, S3). Consequently, we have 4 sets that have to be checked for emptiness:

$$\{t \mid \exists [s_1, i_1, j, s_2, i_2] \in \mathbb{Z}^5 \text{ s.t. } s_1 = i_1 = j \wedge$$
$$0 \leq i_1 \leq 4 \wedge 0 \leq j \leq 4 \wedge s_2 = i_2 \wedge 0 \leq i_2 \leq 4 \wedge$$
$$s_1 \bmod 5 = s_2 \bmod 5 \wedge s_1 \neq s_2 \wedge t = i_2 \wedge i_1 \leq t \leq j + 5\} = \phi$$

$$\{t \mid \exists [s_1, i, j, s_2, k] \in \mathbb{Z}^5 \text{ s.t. } s_1 = i = j \wedge 0 \leq i \leq 4 \wedge 0 \leq j \leq 4 \wedge$$
$$s_2 = k + 5 \wedge 0 \leq k \leq 4 \wedge s_1 \bmod 5 = s_2 \bmod 5 \wedge$$
$$s_1 \neq s_2 \wedge t = k + 10 \wedge i \leq t \leq j + 5\} = \phi$$

$$\{t \mid \exists [s_1, k_1, l, s_2, k_2] \in \mathbb{Z}^5 \text{ s.t. } s_1 = k_1 + 5 = l + 5 \wedge$$
$$0 \leq k_1 \leq 4 \wedge 0 \leq l \leq 4 \wedge$$
$$s_2 = k_2 + 5 \wedge 0 \leq k_2 \leq 4 \wedge s_1 \bmod 5 = s_2 \bmod 5 \wedge$$
$$s_1 \neq s_2 \wedge t = k_2 + 10 \wedge k_1 + 10 \leq t \leq l + 15\} = \phi$$

$$\{t \mid \exists [s_1, k, l, s_2, i] \in \mathbb{Z}^5 \text{ s.t. } s_1 = k + 5 = l + 5 \wedge 0 \leq k \leq 4 \wedge$$
$$0 \leq l \leq 4 \wedge s_2 = i \wedge 0 \leq i \leq 4 \wedge s_1 \bmod 5 = s_2 \bmod 5 \wedge$$
$$s_1 \neq s_2 \wedge t = i \wedge k + 10 \leq t \leq l + 15\} = \phi$$

After simplification we get the following constraints:

$$\{t \mid \exists [i_1, i_2] \in \mathbb{Z}^2 \text{ s.t. } 0 \leq i_1 \leq 4 \wedge 0 \leq i_2 \leq 4 \wedge$$
$$i_1 \bmod 5 = i_2 \bmod 5 \wedge i_1 \neq i_2 \wedge t = i_2 \wedge i_1 \leq t \leq i_1 + 5\} = \phi$$

$$\{t \mid \exists [i, k] \in \mathbb{Z}^2 \text{ s.t. } 0 \leq i \leq 4 \wedge 0 \leq k \leq 4 \wedge i \bmod 5 = (k + 5) \bmod 5 \wedge$$

-continued $$\{t \mid i \neq k \wedge t = k + 10 \wedge i \leq t \leq i + 5\} = \phi$$

$$\{t \mid \exists [k_1, k_2] \in \mathbb{Z}^2 \text{ s.t. } 0 \leq k_1 \leq 4 \wedge 0 \leq k_2 \leq 4 \wedge k_1 \bmod 5 = k_2 \bmod 5 \wedge$$
$$k_1 \neq k_2 \wedge t = k_2 + 10 \wedge k_1 + 10 \leq t \leq k_1 + 15\} = \phi$$

$$\{t \mid \exists [k, i] \in \mathbb{Z}^2 \text{ s.t. } 0 \leq k \leq 4 \wedge 0 \leq i \leq 4 \wedge k \bmod 5 = i \bmod 5 \wedge$$
$$k \neq i \wedge t = i \wedge k + 10 \leq t \leq k + 15\} = \phi$$

One can easily verify that each of these sets is indeed empty: for the first one, the condition $i_1 \bmod 5 = i_2 \bmod 5 \wedge i_1 \neq i_2$ can never be satisfied within the given ranges of $i_1$ and $i_2$. This means that none of the variables contributing to the first flow-dependency is stored at the same location, such that there cannot be a conflict. For the second one, the condition $t = k + 10 \hat{} i \leq t \leq i + 5$ can never be satisfied for the given ranges of i and k, which means that the memory locations being occupied due to the presence of the first flow-dependency are no longer occupied when the memory writes due to statement S3 occur. For the third and fourth equations, similar reasonings hold.

A slightly different example, this time involving 2 different arrays, is given next.

```
        int A[10];
        for (i = 0; i < 5; ++i)
S1:     A[i] = f1(. . .);
        for (j = 0; j < 5; ++j)
S2:     B[j] = f2(A[j]);
        for (k = 0; k < 5; ++k)
S3:     . . . = f3(B[k]);
```

We can readily extract the domain descriptions:

$$\mathbf{D}_A^{var} = \{s_a \mid 0 \leq s_a \leq 4 \wedge s \in \mathbb{Z}\}$$

$$\mathbf{D}_B^{var} = \{s_b \mid 0 \leq s_b \leq 4 \wedge s \in \mathbb{Z}\}$$

$$\mathbf{D}_1^{iter} = \{i \mid 0 \leq i \leq 4 \wedge i \in \mathbb{Z}\}$$

$$\mathbf{D}_2^{iter} = \{j \mid 0 \leq j \leq 4 \wedge j \in \mathbb{Z}\}$$

$$\mathbf{D}_3^{iter} = \{k \mid 0 \leq k \leq 4 \wedge k \in \mathbb{Z}\}$$

$$\mathbf{D}_{11A}^{def} = \{s_a \mid \exists i \in \mathbf{D}_1^{iter} \text{ s.t. } s_a = i\}$$

$$\mathbf{D}_{21A}^{oper} = \{s_a \mid \exists j \in \mathbf{D}_2^{iter} \text{ s.t. } s_a = j\}$$

$$\mathbf{D}_{21B}^{def} = \{s_b \mid \exists j \in \mathbf{D}_2^{iter} \text{ s.t. } s_b = j\}$$

$$\mathbf{D}_{31B}^{oper} = \{s_b \mid \exists k \in \mathbf{D}_3^{iter} \text{ s.t. } s_b = k\}$$

and verify that the following execution order satisfies equation 3.14:

$$O_1^{time}(i) = i \qquad O_{11A}^{wtime}(x) = x$$

$$O_2^{time}(j) = 2j + 5 \quad O_{21A}^{rtime}(x) = x \quad O_{21B}^{wtime}(x) = x + 1$$

$$O_4^{time}(k) = k + 15 \quad O_{31B}^{rtime}(x) = x$$

Let us assume the following storage order:

$$O_A^{addr}(s_a) = s_a \text{ and } O_B^{addr}(s_b) = s_b$$

Again, we have to check for the emptiness of all sets of the kind of equation 3.17.
Dependency analysis reveals 2 non-empty value-based flow-dependencies, such that we have to check only 4 sets:

$$\{t \mid \exists [s_{a1}, i_1, j, s_{a2}, i_2] \in \mathbb{Z}^5 \text{ s.t. } s_{a1} = i_1 = j \wedge$$
$$0 \leq i_1 \leq 4 \wedge 0 \leq j \leq 4 \wedge s_{a2} = i_2 \wedge 0 \leq i_2 \leq 4 \wedge$$
$$s_{a1} = s_{a2} \wedge s_{a1} \neq s_{a2} \wedge t = i_2 \wedge i_1 \leq t \leq 2j + 5\} = \phi$$

$$\{t \mid \exists [s_a, i, j_1, s_b, j_2] \in \mathbb{Z}^5 \text{ s.t. } s_a = i = j_1 \wedge 0 \leq i \leq 4 \wedge$$
$$0 \leq j_1 \leq 4 \wedge s_b = j_2 \wedge 0 \leq j_2 \leq 4 \wedge$$
$$s_a = s_b \wedge t = 2j_2 + 6 \wedge i \leq t \leq 2j_1 + 5\} = \phi$$

$$\{t \mid \exists [s_{b1}, j_1, k, s_{b2}, j_2] \in \mathbb{Z}^5 \text{ s.t. } s_{b1} = j_1 = k \wedge 0 \leq j_1 \leq 4 \wedge$$
$$0 \leq k \leq 4 \wedge s_{b2} = j_2 \wedge 0 \leq j_2 \leq 4 \wedge s_{b1} = s_{b2} \wedge$$
$$s_{b1} \neq s_{b2} \wedge t = 2j_2 + 6 \wedge 2j_1 + 6 \leq t \leq k + 15\} = \phi$$

$$\{t \mid \exists [s_b, i, j, s_a, k] \in \mathbb{Z}^5 \text{ s.t. } s_b = j = k \wedge 0 \leq j \leq 4 \wedge 0 \leq k \leq 4 \wedge s_a = i \wedge$$
$$0 \leq i \leq 4 \wedge s_b = s_a \wedge t = i \wedge 2j + 6 \leq t \leq k + 15\} = \phi$$

Figure 9:
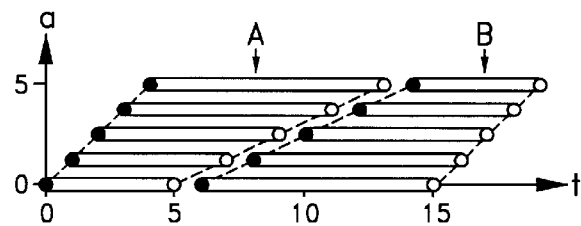
FIG. 9 is an example of memory occupation according to the present invention.

Note that this time, we have 2 slightly different kinds of conditions. The first one and the third one are again related to intra-array storage and execution order, while the second one and the fourth one are related to the order for two different arrays. We can immediately see that the first and the third set are empty due to the conditions $s_{a1} = s_{a2} \hat{} s_{a1} \neq s_{a2}$ and $s_{b1} = s_{b2} \hat{} s_{b1} \neq s_{b2}$ respectively. After simplification, the second equation becomes the following:

$$\{t \mid \exists s_a \in \mathbb{Z} \text{ s.t. } 0 \leq s_a \leq 4 \hat{} t = 2s_a 6 \hat{} s_a \leq t \leq 2s_a + 5\} = \phi$$

in which the condition $t = 2s_a + 6 \hat{} t \leq 2s_a + 5$ can never be satisfied, so this set is also empty, which means that there is no conflict in time between the memory occupation of the different arrays. A similar reasoning holds for the fourth set. A graphical representation can be found in FIG. 9.

Now we are ready to proceed with the development of a pragmatic optimization strategy in accordance with the present invention. The goal of this strategy is to reuse memory locations as much as possible and hence reduce the storage size requirements. This means that several data entities can be stored at the same locations (at different times). The problem is sometimes referred to as in-place mapping. In the broadest definition of the present invention, two of the main optimization parameters are the execution order of the operations and the storage order of the data variables. However, for practical applications it is infeasible to find the optimal execution date for every single operation and the optimal storage location for every single variable, because there are typically millions of operations and variables present in a multimedia application. Therefore we try to find the optimal execution and storage order for groups of operations and variables respectively. The geometrical modeling techniques for dealing with groups of operations and variables are described above. These models allow us to assign an execution order function to each statement (which corresponds to a group of operations) and a storage order function to each array variable (which corresponds to a group of variables).

Unfortunately, even when we group operations and variables, finding the optimal solution for a given cost function, satisfying all boundary constraints, is still infeasible for real-life applications. One of the main reasons is that the validity constraints expressed by equation 3.14 and equation 3.16 are very difficult to take into account during an optimization process.

The present invention prefers a more pragmatic approach, in which we introduce several simplifications, and which allows us to come up with a good solution, but not necessarily the best one. This is also the reason why the optimization of the execution order and the optimization of the storage order are separated as much as possible in accordance with the present invention: first the execution order is optimized, mainly through loop transformations and memory hierarchy exploitation, and afterwards, among other things, the storage order optimization problem is tackled (through the equivalent of data transformations). This execution and storage order have a direct impact on the main two cost factors, namely the area occupation by memories and power consumption by data transfers. The storage order has a much larger effect on the area requirements than on the power requirements. By choosing a good storage order, we can increase the reuse of storage locations for different variables, and hence reduce the storage size requirements, which results in a smaller area occupation by the memories. Indirectly, the power budget due to memory transfers may also be decreased because of the lower capacitive load of smaller memories. This is also why the decisions on memory hierarchy, memory allocation and array-to-memory assignment are taken during separate preceding steps in accordance with the present invention. For these reasons the storage order optimization phase focuses on storage size reduction.

The storage order optimization techniques in accordance with the present invention can be either used on a stand-alone base, or in combination with other optimization tasks, such as execution order optimization. In the latter case, it is important that the storage order optimization step is executed as the last step, for several reasons:

1. If the execution order has not been fixed, one has to make some worst case assumptions during the storage order optimization, which may lead to (highly) suboptimal results.
2. In contrast, as long as the storage order has not been fixed, then is a lot of freedom that can be exploited during the other optimization steps because the storage order can be virtually ignored. When the storage order has been fixed on the other hand, the constraints on the other tasks would become far too complex. For instance, checking whether a loop transformation is valid would be very difficult in that case (it would require taking into account equation 3.16).
3. The effect on loop and memory hierarchy transformations on the optimal storage order (and hence the required storage sizes) is quite large. For instance, loop transformations can enable more opportunities for storage location reuse by influencing the life-times of the data. The effect of the storage order on other cost factors, such as parallelism, performance, and/or power consumption, is much smaller. Therefore it is more natural to tackle the other problems first, before the storage order optimization. Still it is important to be able to make an estimate of the storage requirements during the early stages of global optimization. For this purpose, some of the techniques in accordance with the present invention can be used as a basis for quick estimators. Based on the above reasoning we can now present the assumptions that we start from:
1. The data-flow of the program has been completely fixed and cannot be changed anymore (e.g. data-flow transformations cannot be applied anymore).
2. The execution order of the program has been mostly fixed. For instance, the code may have been parallelized in advance. In case there is still some freedom left, we do not try to exploit it. In case the program is to be implemented on a parallel architecture with several processors, we assume that there is sufficient synchronization between the different processors. In that case we can accurately model the relative execution order of the memory accesses by different processors.
3. The memory architecture has been fixed already, except for the sizes of the memories. For instance, memory hierarchy decisions have been taken already.
4. The order of the memory accesses is deterministic for a given application code and a given set of input data. This rules out the presence of hardware-controlled caches, because we usually do not know the exact caching algorithm implemented in hardware and therefore we cannot accurately predict the order of the memory accesses in that case.
5. Each (part of a) data array in the program has already been assigned to one of those memories, i.e. we assume that data-distribution decisions have already been taken (array-to-memory assignment). In other words, we assume that we know what data are stored in what memory (but not how they are stored).
6. The storage order of the arrays in the memories has not been fixed yet and can be freely chosen.
7. Finally, an assumption of an entirely different nature, is that the program to be optimized is given in single-assignment form. In this way the freedom present in the program is maximally exposed and our analysis is simplified. This assumption should not be seen as a restriction because data-flow analysis allows us to convert non-single assignment programs to single-assignment ones.

An important consequence of the assumption that the execution order has been fixed is the fact that we can treat each memory separately. Because the required size of a memory depends only on the storage order of the arrays or parts of arrays stored in it on the one hand, and the storage orders of arrays stored in different memories are independent on the other hand, there is no interference between memories. This allows a significant complexity reduction for complex memory organizations such as employed in large multimedia applications.

The techniques in accordance with the present invention can be extended to take into account a partially unfixed execution order, although the opportunities for storage location reuse will decrease when the uncertainty on the execution order increases. In case the remaining freedom on the execution order would have to be exploited also during the storage optimization step, the problem would become much more complex because the execution order may affect the lifetimes of different arrays in different memories, and therefore the memories would no longer be independent.

The present invention is preferably limited to synchronous architectures, i.e. those for which the order of memory accesses is only determined by the application and the input data. This even includes architectures in which software-controlled data- caches are present. In the presence of hardware-controlled caches accessed by multiple processors however, the relative order of memory accesses may be unpredictable. Moreover, the organization of the data in the memories may then affect the caching effectiveness, so in that case it is possible that the storage order optimization techniques in accordance with the present invention interfere with other steps (such as cache performance optimization).

Without loss of generality, we concentrate on the size reduction of only one (shared) memory. In general, multiple memories can be present, but our techniques can be applied to each memory separately, as there is no interference between the optimizations for different memories for a given data distribution and execution order. The pragmatic solution strategy in accordance with the present invention is based on the fact that we can identify two independent components in the storage order of arrays:

the intra-array storage order, which refers to the internal organization of an array in memory (e.g. row-major or column-major layout);

the inter-array storage order, which refers to the relative position of different arrays in memory (e.g. the offsets, possible interleaving, . . . ).

In that sense we can see the mapping of array elements on memory locations as a two-phase mapping: first there is a mapping from the (multi-dimensional) variable domains to a one-dimensional abstract address space for each array, and then there is a mapping from the abstract address spaces onto a joint real address space for all arrays assigned to the same memory. This "real" address space can still be virtual. For instance, an extra offset may be added during a later mapping stage. Above we made a distinction between storage addresses and memory addresses. In practice, the relation between Ihese two is always linear, so we do not continue to make this distinction anymore.

In accordance with the present invention a two-phase optimization strategy may be applied whereby each phase may be applied independently of the other. In one, e.g. first phase, we try to find an optimal intra-array storage order for each array separately. This storage order then translates into a partially fixed address equation, which we refer to as the abstract address equation, denoted by the function $A^{abstr}(\ )$. In the other, e.g. second phase, we look for an optimal inter-array storage order, resulting in a fully fixed address equation for each array. This equation is referred to as the real address equation, denoted by the function $A^{real}(\ )$. In the following we outline a few strategies that can be used during the inter-array mapping phase, i.e. the phase that transforms the $A^{abstr}(\ )$ of each array into an $A^{real}(\ )$. Then we select the most promising strategy, and derive from this how we can steer the intra-array mapping phase.

Given the abstract address equations of each array, which represent a partial storage order, and the execution order of the program, we can already describe the occupation of the abstract addresses, i.e. we can describe (binary) occupied address/time domains (for the abstract addresses) by means of equations 3.11 and 3.12, in which we substitute the storage order function $O_x^{addr}(\ )$ by $A_x^{abstr}(\ )$. In general, the "shape" of these domains is not known, as we have only implicit descriptions. It is however possible to analyze these descriptions and to extract certain properties (such as the width or the height), which allow us to approximate the shapes.

Figure 10:
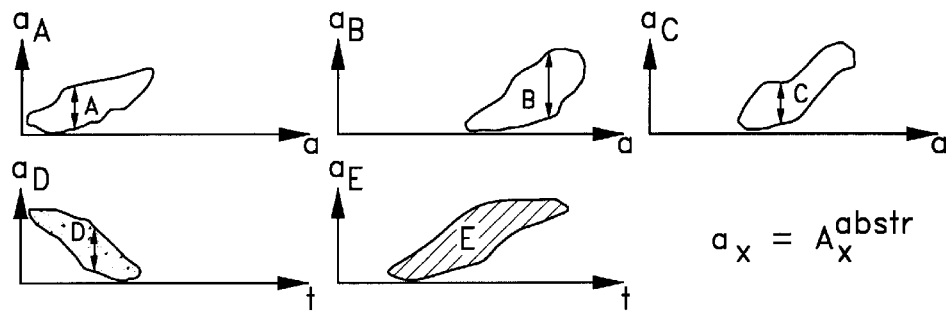
FIG. 10 shows examples of abstract OAT-domains of five arrays.
Figures 11A, 11B:
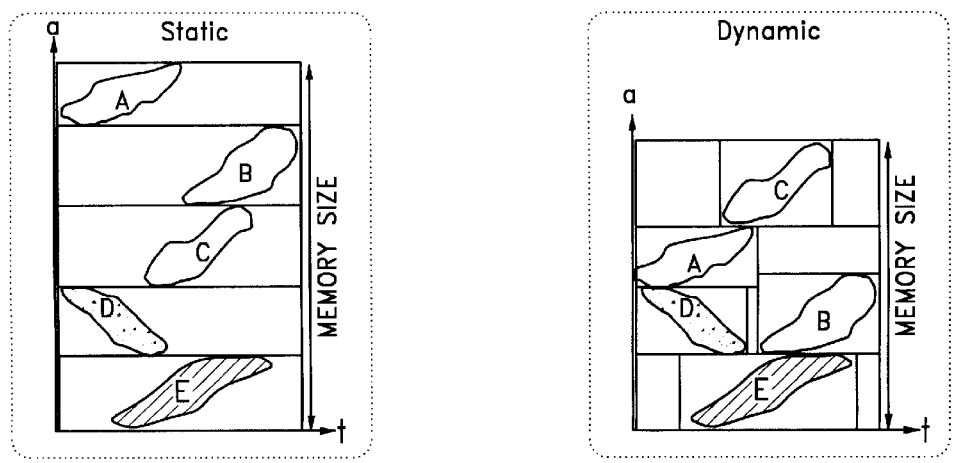
FIG. 11a shows static and FIG. 11b shows dynamic allocation strategies for the arrays shown in FIG. 10 according to the present invention.

We will now illustrate five alternative strategies for the inter-array mapping phase by means of an example. In FIG. 10 the occupied address/time domains are shown for five arrays of which the intra-array storage order (i.e. the abstract address function $A_x^{abstr}(\ )$) is assumed to be known. We can then obtain a real address function $A_x^{real}(\ )$ in the following strategies each of which is an embodiment of the invention:

1. The simplest way to allocate memory for these arrays is to assign. a certain address range to each of them in such a way that the different address ranges do not overlap. The size of the address range allocated for an array then corresponds to the "height" of its occupied address/time domain and this typically equals the size of the array. This is depicted in FIG. 11a. The difference between the abstract and the real address equation is then simply a constant offset $C_x$ as indicated at the bottom of the figure. The choice of the $C_x$ values is straightforward, i.e. the arrays are simply stacked in the memory and the address ranges are permanently assigned to the different arrays. This strategy is commonly referred to as static allocation. Note that this approach does not result in any memory refuse at all, but that it can be implemented very easily (one only needs to know the size of the arrays). Moreover, the intra-array storage order (which influences the shape of the occupied address/time domains) has no effect on the required memory size assuming that for each array a range equal to its size is allocated.

2. A potentially better strategy is illustrated in FIG. 11b. Here the address range assigned to an array is allocated only during the time that the array is in use. The shapes of the occupied address/time domains may be approximated by rectangular bounding boxes. This allows sharing of certain address ranges by more than one array. We refer to this strategy as dynamic allocation, but it is important to note that this allocation can be performed at compile time, in contrast to, for instance, heap-allocation in a programming language such as C. In general, a dynamic strategy requires less memory than a static one. Unfortunately, it requires life-time analysis of the arrays, and the placement of the arrays in memory is no longer straightforward, as the required memory size depends on it. The relation between the abstract and real address equations is similar to that of the first alternative, and also in this case the intra-array storage order has no effect on the required memory size (under the same assumptions as mentioned above).

3. The previous strategy enables memory reuse between different arrays, but we can also exploit memory reuse between elements of the same array. Many times this is possible because an array may not need its complete address range all the time. We define an address reference window as the maximum distance between two addresses being occupied by the array during its life-cycle. This address reference window $W_x$ is indicated for each of the arrays in FIG. 10 by means of a vertical double arrow. If we know the size of the window, we can "fold" the occupied address/time domains of one or more of the arrays by means of a modulo operation in the address equations. The result for a static windowed allocation strategy is depicted in FIG. 12a. The relation between the $A^{abstr}(\ )$ and the $A^{real}(\ )$ of an array is again relatively simple, as indicated at the bottom of the figure. Note that a folded occupied address/time domain may never overlap with itself, provided that the window equals at least the maximum "thickness" of the domain, so the folding can never introduce memory occupation conflicts.

4. We can also combine the windowing approach with dynamic allocation, as depicted in FIG. 12b. This results in memory reuse between elements of the same array and elements of different arrays, and in general leads to the smallest memory size requirements of these first four alternatives. An important difference between the last two alternatives and the first two is the fact that for the windowed approaches, the intra-array storage order is important, as it directly influences the shape of the occupied address/time domains and hence the size of the window. Moreover, the exact evaluation of the window size and especially the choice of the best intra-array storage order is far from trivial.

5. An even better strategy may be as depicted in FIG. 13. In a first step, the occupied address/time domains are shifted (and possibly even vertically scaled or flipped by a factor $S_x$) such that their common address reference window is minimal. After that, the complete address range is folded by the common window W. Note that for the example this last strategy may be the best one, but this is not true in general. The previous strategy with separate windows can sometimes yield better results (e.g. when the domains don't "fit" together very well). Moreover, since we do not have an explicit description of the exact shapes of the domains, it would be very difficult to find an optimal placement.

Note that for the first four alternatives we can completely avoid the evaluation of the complex correctness constraints represented by equation 3.16. In each case, the shape of the occupied address/time domains may be approximated by a rectangle. We only have to make sure that the rectangles do not overlap, which results in much simpler (sufficient) constraint at least if we assume that no "orphan" writes occur, i.e. writes of values that are never read. These do not show up in the (B)OAT-domains and consequently also not in the approximations (in contrast to the validity constraints), and may result in the overwriting of other data if we do not take them into account. Checking for the occurrence of these writes is relatively simple and we assume that they have been removed from the code as they have no purpose. Another possibility is to add a "dummy" read after each orphan write in the geometrical model. In that way the orphan writes are also taken into account in the (B)OAT-domain descriptions.

An efficient implementation of the fifth strategy on the other hand would require that we can calculate the distances between the different domains. Unfortunately these distance calculations are very costly and also turn out to be very difficult from a numerical point of view. Therefore, the fourth alternative (dynamic, with separate windows, as depicted in FIG. 12b) is the preferred embodiment for our placement strategy, as it offers the best compromise between optimization and complexity. The full placement embodiment of the present invention is in a sense a hybrid approach because it uses elements of the fifth strategy too (i.e. OAT-domains are not always approximated by rectangles).

Given the fact that we have chosen the fourth strategy as the basic strategy for the second mapping phase, the strategy for the first mapping phase becomes: we have to find the storage order for each array (or part of an array) that results in the smallest window size. Doing this results in the smallest rectangular bounding boxes for the OAT-domains, and most likely also in the smallest required memory size. The number of possible storage orders is huge, even if we restrict ourselves to the affine ones. Moreover, checking whether a storage order is valid generally requires the evaluation of the complex constraints represented by equation 3.16 and a practically feasible strategy for choosing the best order while taking into account these constraints may be difficult to find. Therefore, we prefer to restrict the search space drastically.

First of all, we may require that, generally with a few exceptions, each element of an array is mapped onto an abstract address that is unique w.r.t. the address of the other elements of the same array. This property is also called unambiguity. By requiring this we get an abstract address equation that is correct by construction, i.e. we can avoid expensive checks for intra-array memory occupation conflicts. Later on, during the second mapping stage, several array elements can be mapped on the same real addresses, provided that they have non-overlapping life-times. In case this unambiguity requirement for the abstract addresses is too restrictive, one can always split arrays at the specification level to provide more freedom (or merge/interleave them to limit the freedom).

A second constraint that we may impose, is that the storage order should be dense, i.e. the range of abstract addresses occupied by an array should be as small as possible (taking into account the limitations of an affine storage order). The reason for this is that it would in general be very difficult, if not impossible, to reuse the "holes" in a non-dense address range during the following mapping phase (unless they are periodical). A standard row-major order, as used in C, usually satisfies this requirement, but not always. For instance when only the even elements of an array are accessed, one can compress the address range by using the appropriate scaling factors in the address equation. Later we elaborate on this, but for now we assume that no such compression is possible or that his has been done in advance, so a row-major or column-major order is a valid solution. However, for multi-dimensional arrays, we consider all possible orders of the dimensions, and also both directions (i.e. forward and backward) for each dimension. Consequently the $A_x^{abstr}()$ functions of an array have the following format:

$$A_x^{abstr}(a_{1x}, a_{2x}, \ldots, a_{D_x x}) = \sum_{j=1}^{D_x} N_{jx} |a_{n_j x} - B_{n_j x}^{up/lo}| \quad (4.1)$$

$$\text{where } N_{jx} = \prod_{k=j+1}^{D_x} S_{n_k x}, N_{D_x x} = 1 \quad (4.2)$$

$$\text{and } S_{n_k x} = B_{n_k x}^{up} - B_{n_k x}^{lo} + 1 \quad (4.3)$$

Figure 14:
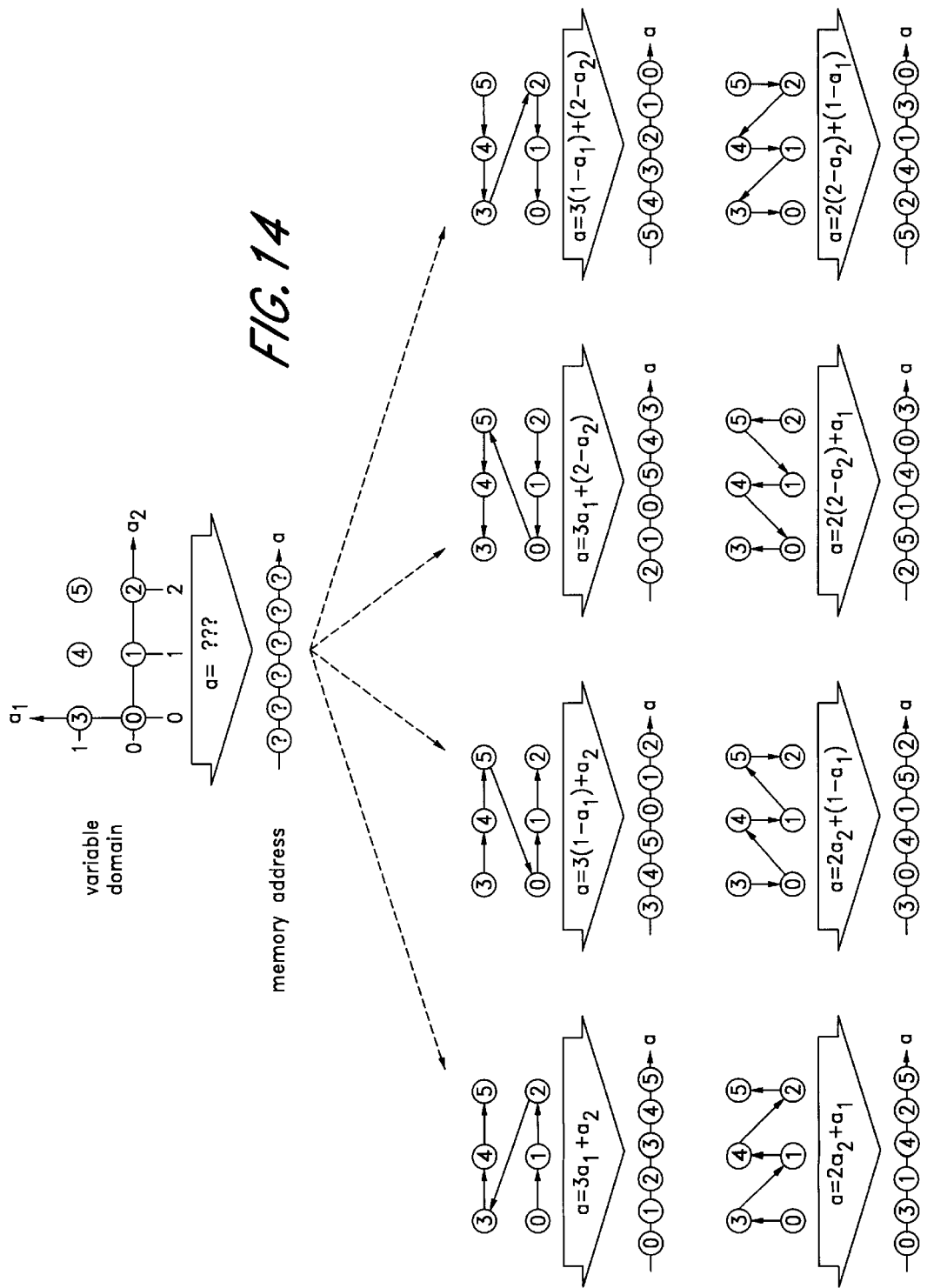
FIG. 14 shows the possible storage orders of a 2×3 array.

In these equations, the $a_{jx}$ correspond to the dimensions of an array x and $D_x$ is the number of dimensions. The order of the dimensions is determined by the values of the $n_{jx}$: $(n_{1x}, n_{2x}, \ldots, n_{Dxx})$ is a permutation of $(1, 2, \ldots, D_x)$. The constant $B_{njx}^{up/lo}$ coefficients are either the upper or the lower bounds of the corresponding dimensions, depending on the direction that is chosen for a dimension. By using an absolute value in equation 4.1, we guarantee that each of the terms in the sum is positive. In practice we do not need an absolute value once we know the direction of a dimension, because we can add appropriate signs in that case (see also FIG. 14).

The constant $N_{jx}$ coefficients represent scaling factors obtained as a product of the sizes of the dimensions $S_{njx}$. For a given dimension order we can easily calculate these coefficients, starting with the last one. An example of the possible orders we consider for a 2-dimensional array of 2×3 is given in FIG. 14. In general, for a D-dimensional array, we consider $2^D.D!$ possibilities. For a 6-dimensional array for instance, there are no less than 46080 possibilities. A brute-force search strategy for the optimum storage order over all these possibilities may be practically feasible because the vast majority of arrays do not have more than 3 dimensions. However, if we assume that we start from single-assignment code (which maximally exposes the available freedom), it is not unusual to encounter a 6-or-more-dimensional array. Even though this is only a very limited subset of all possible storage orders, evaluating each order in this set is very difficult or infeasible for arrays with many dimensions.

In accordance with the present invention, we extend the search space even further by also allowing orthogonal projections of dimensions of the array. The effect of these additional possibilities on the complexity of the optimization process is however limited. Therefore, we ignore these possibilities for now. Paradoxically, taking them into account may even help us to reduce the effective size of the search space.

Finally, we can remark that the complexity of the address equations obtained by each of the strategies of inter-array optimization presented above is relatively low, provided that the abstract address equation is not too complex (and this is usually the case, because we limit the search space). The only possible difficulty is the presence of the modulo operation in the equations (at least for the windowed approaches). In practice this poses no problems for the following reasons:

1. In many cases the modulo operation can be avoided completely, e.g. by substituting it by a projection.
2. In case the modulo operation cannot be avoided in this way, it is usually possible to generate the address sequences by means of incremental pointer updating, with a simple boundary check. This requires induction analysis of the instantiated address expressions, but as most address expressions in multimedia applications are linear or largely linear, this is usually relatively simple. Moreover, this type of pointer updating matches the addressing capabilities of DSP processors very well. DSP processors usually have one or more address generators which can implement this bounded incremental pointer updating in a very efficient way (e.g. one address per clock cycle).
3. In case the modulo operation cannot be avoided by one of the previous techniques, it may be worthwhile to increase the window size somewhat until the next power of two. By doing this, the modulo operation can be reduced to a simple bit masking operation (assuming a two's-complement number system). Of course this may result in a relatively large memory waste. For instance, if the window size would be 1025, we would (at least temporarily) waste 1023 locations by rounding it up to 2048. However, if the program is to be implemented on a general purpose processor, executing modulo operations may be very costly in terms of cycles. In that case a trade-off between performance and memory cost must be made. In case the program is mapped on a custom processor, the cost of a modulo operation is much lower. In that case it could even be better to use a plain modulo operation instead of incremental pointer updating. So, the optimal address generation strategy may be highly dependent on the target architecture, but in practice the address model in accordance with the present invention is well suited for most architectures.

There exists a strong relation between the intra-array storage orders we consider and data transformations. In fact, the intra-array storage orders described above can be seen as the result of a data transformation composed of a sequence of unimodular transformations of the variable domains, followed by a standard (singular) storage mapping such as row-major or column-major:

$$A_x^{abstr}(a_{1x}, a_{2x}, \ldots, a_{D_x x}) = \sum_{j=1}^{D_x} N_{jx}^* |a_{1x}^*| + C_x \quad (4.4)$$

$$\text{where } N_{jx}^* = \prod_{k=j+1}^{D_x} S_{kx}^*, N_{D_x x}^* = 1 \quad (4.5)$$

$$\text{and } S_{kx}^* = B_{kx}^{*up} - B_{kx}^{*lo} + 1 \quad (4.6)$$

$$\text{and } \begin{bmatrix} a_1^* \\ a_2^* \\ \ldots \\ a_{D_x}^* \end{bmatrix} = \underbrace{U_{m_x x} \times U_{(m_x-1)x} \times \ldots \times U_{1x}}_{\text{unimodular } (D_x \times D_x)} \times \begin{bmatrix} a_1 \\ a_2 \\ \ldots \\ a_{D_x} \end{bmatrix} \quad (4.7)$$

In these equations the $U_{ix}$ matrices represent unimodular transformations (mx in total) and the $a_{jx}$ and $a^*_{jx}$ coefficients represent the original and transformed dimensions respectively. The $B^*_{kx}{}^{up/lo}$ and $S^*_{kx}$ coefficients represent the upper and lower bounds and sizes of the transformed dimensions respectively. A constant value $C_x$, which is a combination of the $N^*_{kx}$ and $B^*_{kx}{}^{up/lo}$ coefficients, is added to equation 4.4 to make the address range start at zero.

The unimodular transformations that we currently consider are data-reverse and data-interchange transformations (which are similar to loop-reverse and loop-interchange transformations). Because these transformations are unimodular, we know that we satisfy the requirements that we have imposed on the storage order: the mapping onto abstract addresses should be unambiguous and dense. Data transformations are always legal, provided that they satisfy the unambiguity requirement. However, this is only a sufficient condition, not a necessary one. If we would impose this condition on the final storage order, we would not be able to reuse memory locations! Therefore, we only impose it during the intra-array mapping stage. Later on, during the inter-array mapping stage, we even explicitly rely on the fact that array elements can share memory locations, either through windowing (intra-array reuse), or through dynamic allocation (inter-array reuse). Unfortunately, if we drop the unambiguity requirement, the legality of the data transformations is no longer guaranteed as it also depends on the execution order. This leads to the (complex) constraints represented by equation 3.16, but we can also avoid having to evaluate them by relaxing them to simpler (sufficient) ones.

In theory we could allow any type of unimodular transformation, e.g. also dataskew transformations are valid. However, if we would also allow those, tile number of possible storage orders explodes (and even becomes infinitely large). Moreover, for practical applications the number of cases where a skewing transformation would result in lower storage size requirements is probably relatively low. This has been experimentally verified on several realistic applications, where the obtained solutions came very close to the theoretical optimum without using data-skewing.

It is even possible to allow other (unambiguous) data transformations such as data-tiling (or data-blocking). These transformations alter the number of dimensions of the variable domain before the mapping onto an abstract address space takes place. The number of possibilities is then exploding again, while the practical relevance is probably also limited in a context without memory hierarchy. However, when memory hierarchy is present we may perform this step prior to the storage order optimization mapping task. In this way the global optimum is of course not ensured, but it provides a very good practical approach. In a practical optimization framework, it is perfectly possible and even desirable to allow data-skewing and non-unimodular transformations to be imposed interactively by a designer.

Now we describe the first phase of our optimization strategy, namely the intra-array storage order optimization, in more detail. During this step we try to maximize the reuse of memory locations between elements of the same array. Before we can start thinking about optimizing the intra-array storage order of an array to obtain a minimal address reference window size, we should first be able to evaluate the window size for a given storage order.

Conceptually, the evaluation is relatively simple. We have to find the maximal distance between two addresses being occupied by the array at the same time. We cannot calculate this distance in one shot, but the binary occupied address/time domain descriptions of equation 3.11 (where we substitute the $O_m^{addr}(\ )$ functions by $A_m^{abstr}(\ ))$ allow us to calculate the window as follows:

$$W_m = \max_{i_1 j_1 k_1 l_1 i_2 j_2 k_2 l_2} |a_1 - a_2| + 1 \text{ for which} \quad (5.1)$$

$$\exists t \text{ s.t. } (a_1, t) \in \mathbf{D}_{i_1 j_1 k_1 l_1 m}^{BOAT} \bigwedge (a_2, t) \in \mathbf{D}_{i_2 j_2 k_2 l_2 m}^{BOAT}$$

Figure 15:
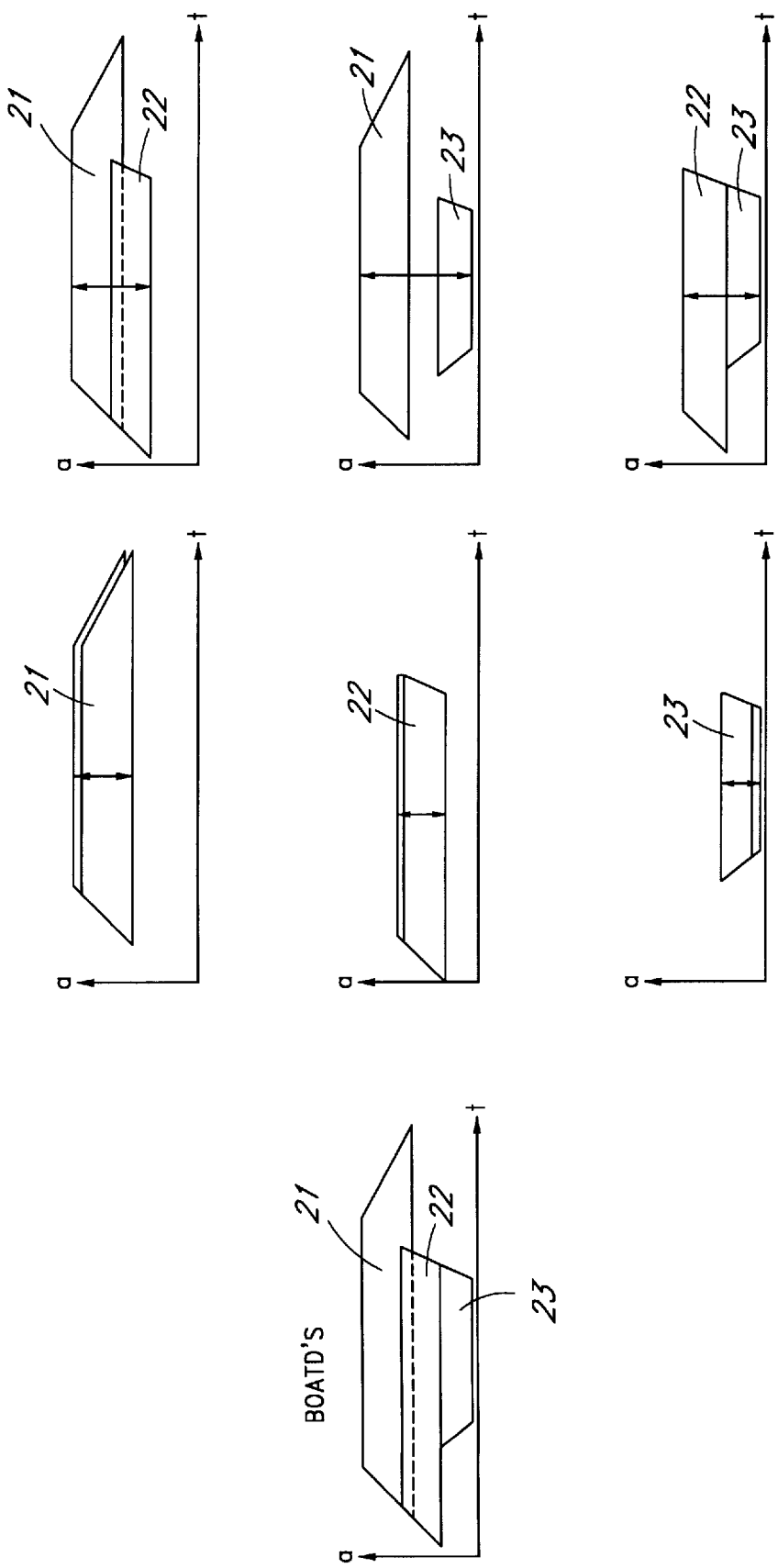
FIG. 15 shows the address reference window size calculation according to the present invention for three dependencies.

In other words, if we evaluate for each pair of binary occupied address/time domains of an array m the maximum absolute distance between two occupied address/time tuples (with a common time t, one tuple in each domain), and then take the overall maximum incremented by one, we get the window size of the array. This is shown schematically in FIG. 15. The window sizes of each of the BOATD's 21–23 is determined individually and also the window sizes between each pair, 21, 22; 21,23; 22,23 and the maximum size selected as the overall window size.

In general, the calculation of these maximum distances is a very difficult problem on its own, especially when the program is non-manifest. In practice however, in many multimedia applications most array accesses use affine indices, resulting in BOAT-domain descriptions consisting only of affine expressions. As a result, the BOAT-domains are linearly bounded lattices (LBL's), in case only conjunctions are present, or unions of LBL's, in case also disjunctions are present. In case these BOAT-domains are LBL's, the distance for each pair of domains can be found by solving two integer linear programming (ILP) problems. The number of variables and constraints in the ILP problems depends on the number of dimensions of the array and the depth of the loop nests around the array accesses.

In practice, there are usually at most a few dozen variables and constraints. In case a BOAT-domain consists of a union of LBL's (which is usually not the case), we can decompose it into its composing LBL's, and proceed in the same way for each component.

The following example demonstrates the window calculation process (for BOAT-domains consisting of one LBL).

```
int B[10];
for (i = 0; i < 10; ++i)
{
S1: B[i] = ...;
    if(i < 7)
    {
S2: ... = B[i];
    }
}
for (j = 5; j < 10; ++j)
{
S3: ... = B[j];
}
```

The iteration, definition, operand and variable domains for this example are the following:

$$\mathbf{D}_B^{var} = \{b \mid 0 \le b \le 9 \wedge b \in \mathbb{Z}\}$$

$$\mathbf{D}_1^{iter} = \{i \mid 0 \le i \le 9 \wedge i \in \mathbb{Z}\}$$

$$\mathbf{D}_{11B}^{def} = \{b \mid \exists i \in \mathbf{D}_1^{iter} \wedge b = i \wedge b \in \mathbb{Z}\}$$

$$\mathbf{D}_2^{iter} = \{i \mid 0 \le i \le 6 \wedge i \in \mathbb{Z}\}$$

$$\mathbf{D}_{21B}^{oper} = \{b \mid \exists i \in \mathbf{D}_2^{iter} \wedge b = i \wedge b \in \mathbb{Z}\}$$

$$\mathbf{D}_3^{iter} = \{j \mid 5 \le j \le 9 \wedge j \in \mathbb{Z}\}$$

$$\mathbf{D}_{31B}^{oper} = \{b \mid \exists i \in \mathbf{D}_3^{iter} \wedge b = i \wedge b \in \mathbb{Z}\}$$

Let us assume a purely sequential execution order and a linear storage order:

$$O_1^{time}(i) = 2i \quad O_1^{wtime}(x) = x$$

$$O_2^{time}(i) = 2i + 1 \quad O_2^{rtime}(x) = x \quad O_B^{addr}(b) = b$$

$$O_3^{time}(j) = j + 20 \quad O_3^{rtime}(x) = x$$

Since there are 2 flow dependencies present, we also have two BOAT-domains:

$$\mathbf{D}_{1211B}^{BOAT} = \{a, t \mid \exists i \in \mathbf{D}_1^{iter}, i' \in \mathbf{D}_2^{iter}, b \in \mathbf{D}_B^{var} \text{ s.t.}$$

$$b = i = i' \wedge a = b \wedge t \ge 2i \wedge t \le 2i' + 1\}$$

$$= \{a, t \mid 0 \le a \le 6 \wedge 2a \le t \le 2a + 1 \wedge a \in \mathbb{Z}\}$$

$$\mathbf{D}_{1311B}^{BOAT} = \{a, t \mid \exists i \in \mathbf{D}_1^{iter}, j \in \mathbf{D}_3^{iter}, b \in \mathbf{D}_B^{var} \text{ s.t.}$$

$$b = i = j \wedge a = b \wedge t \ge 2i \wedge t \le j + 20\}$$

$$= \{a, t \mid 5 \le a \le 9 \wedge 2a \le t \le a + 20 \wedge a \in \mathbb{Z}\}$$

Now we have can calculate the maximal distance between each pair of BOAT-domains including self-pairs, i.e. pairs consisting of twice the same BOAT-domain:

$$\max|a_1 - a_2| + 1 \text{ for which } [a_1, t] \in \mathbf{D}_{1211B}^{BOAT} \bigwedge [a_2, t] \in \mathbf{D}_{1211B}^{BOAT}$$

$$\max|a_1 - a_2| + 1 \text{ for which } [a_1, t] \in \mathbf{D}_{1311B}^{BOAT} \bigwedge [a_2, t] \in \mathbf{D}_{1311B}^{BOAT}$$

$$\max|a_1 - a_2| + 1 \text{ for which } [a_1, t] \in \mathbf{D}_{1211B}^{BOAT} \bigwedge [a_2, t] \in D_{1311B}^{BOAT}$$

Figure 16:
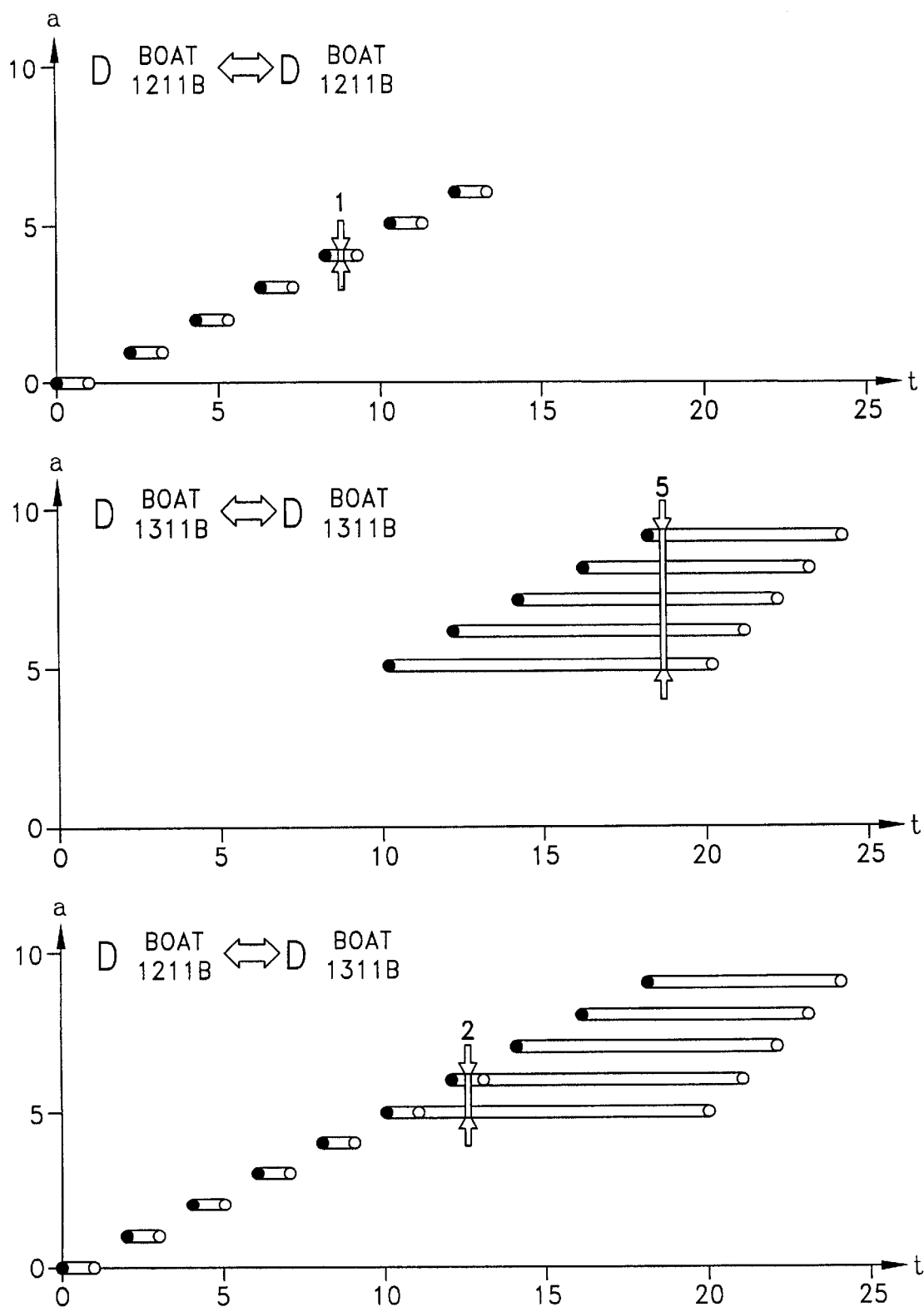
FIG. 16 shows a further address reference window calculation according to the present invention.
Figure 17:
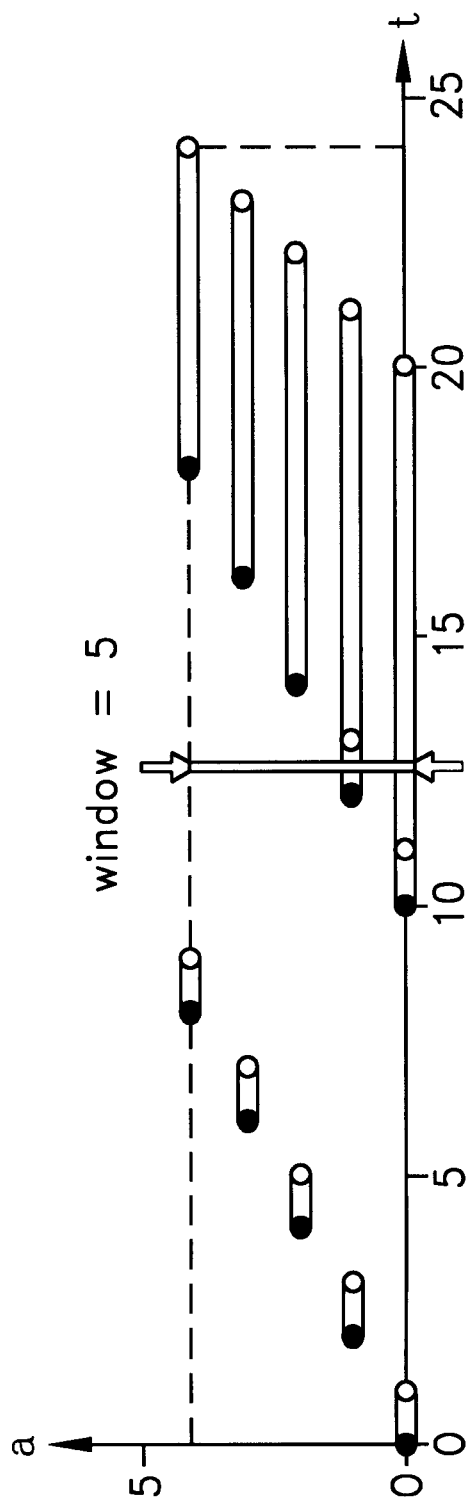
FIG. 17 shows folding of an OAT-domain by means of a modulo operation according to the present invention.

We could find these distances by solving the corresponding ILP problems, but for this simple example we can read the solution from the graphical representation of the BOAT-domains in FIG. 16. We can see that the distances are 1, 5, and 2 respectively. The overall maximum is 5, so the window size of B is 5, and we can fold the OAT-domain by means of a modulo operation, as depicted in FIG. 17.

So equation 5.1 offers us a way to calculate the exact window size of an array with F flow dependencies by calculating at most F×(F+1)=2 distances, or solving at most F×(F+1) ILP problems (assuming LBL's). In practice, a (large) number of ILP problems can be avoided or simplified by applying several heuristics that are commonly used during dependency analysis. These techniques are discussed later.

In case the BOAT-domain descriptions are not LBL's (or unions of LBL's), e.g. because of non-manifest or non-linear expressions, specific solution techniques must be used. An advantage that we can exploit in these cases, is the fact that we do not need the exact value of the window to obtain a valid solution. If we can find an upper bound on the window size, we are sure that the folding of an OAT-domain does not result in occupation conflicts. Of course, working with an upper bound can potentially result in a waste of memory locations.

The following example illustrates how we can deal with non-manifest behavior.

```
                int A[10], B[10];
                for (i = 0; i < 10; ++i)
                {
                        A[i] =    ...;
        S1:     B[i] =    ...;
                        if(i > 0 && A[i] > 0)
                        {
        S2:     ... = f(B[i-1]);
                        }
                }
```

In this program the read accesses to B are non-manifest. We will therefore only look at domains related to B:

$$D_B^{var} = \{b \mid 0 \le b \le 9 \land b \in \mathbb{Z}\}$$

$$D_1^{iter} = \{i \mid 0 \le i \le 9 \land i \in \mathbb{Z}\}$$

$$D_{11B}^{def} = \{d \mid \exists i \in D_1^{iter} \text{ s.t. } d = i \land d \in \mathbb{Z}\}$$

$$D_2^{iter} = \{i \mid \exists p \text{ s.t. } 0 \le i \le 9 \land i \ge 1 \land p = F(i) \land p > 0 \land i \in \mathbb{Z}\}$$

$$D_{21B}^{oper} = \{o \mid \exists i \in D_2^{iter} \text{ s.t. } o = i - 1 \land o \in \mathbb{Z}\}$$

For the following order functions:

$$O_1^{time}(i) = 2i \qquad O_1^{wtime}(x) = x \qquad O_B^{addr}(b) = b$$

$$O_2^{time}(i) = 2i + 1 \qquad O_2^{rtime}(x) = x$$

we obtain the following BOAT-domain description:

$$D_{1211B}^{BOAT} = \{a, t \mid \exists i \in D_1^{iter}, i' \in D_2^{iter}, b \in D_B^{var},$$
$$b = i = i' - 1 \land a = b \land t \ge 2i \land t \le 2i' + 1\}$$
$$= \{a, t \mid 0 \le a \le 8 \land 2a \le t \le 2a + 3 \land F(a+1) > 0 \land a \in \mathbb{Z}\}$$

The window size is given by the following formula in this case:

$$\max|a_1 - a_2| + 1 \text{ for which } [a_1, t] \in D_{1211B}^{BOAT} \land [a_2, t] \in D_{1211B}^{BOAT}$$

Figure 18:
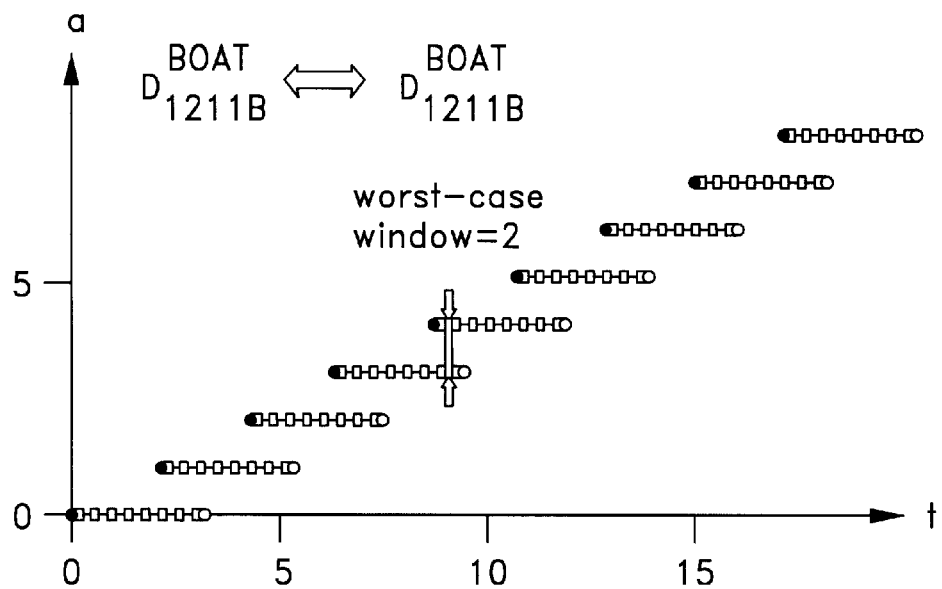
FIG. 18 shows the address reference window calculation for a non-manifest BOAT-domain according to the present invention.

Due to the non-manifest read accesses, the BOAT-domain is also non-manifest, and consequently we cannot evaluate this formula until run-time. However, we can take worst-case assumptions. The condition F(a+1)>0 in the description of $D_{1211B}^{BOAT}$ indicates that each of the addresses may or may not be occupied. In the worst case they are all occupied. Hence we can calculate the window with the assumption that F(a+1) is always larger than zero. This results in a worst-case window size of 2, as indicated in FIG. 18.

During our search for the optimal intra-array storage order for an array, it would be useful if we could already estimate the size of the window when we have not yet completely fixed the storage order. This would allow us to traverse the search space in a more efficient way. Because of the special properties of the abstract address equation 4.1 we can calculate an upper and a lower bound on the window size when we have fixed the order and direction of only some of the dimensions, no matter what the order and direction of the remaining dimensions is. This can be understood as follows. First, let us define the following set of partial abstract address equations for an array, since we are concentrating on only one array, we drop the indices referring to the array in the following to simplify the notation:

$$\tilde{A}_i^{abstr}(a_1, a_2, \ldots, a_D) = \sum_{j=1}^{i} \tilde{N}_j^i |a_{n_j} - B_{n_j}^{up/lo}| \quad (5.2)$$

where $\tilde{N}_j^i = \prod_{k=j+1}^{i} S_{n_k}$ and $S_{n_k} = B_{n_j}^{up} - B_{n_j}^{lo} + 1$ \quad (5.3)

As in equation 4.1, the nj coefficients determine the order of the dimensions chosen, and the choices between the upper and lower boundaries $B_{nj}^{up/lo}$ determine the directions of the dimensions. Note that the values of the nj coefficients in equation 5.2 are not depending on i. In other words, these are the abstract address equations that would be obtained when only the dimensions $a_{n1}, a_{n2}, \ldots, a_{ni}$ of the array would be present, and when we would take the same dimension order and directions as for the full-dimensional array. When we take into account all the dimensions, we end up with the full abstract address equation for a given dimension order and given dimension directions:

$$\tilde{A}_D^{abstr}(a_1, a_2, \ldots, a_D) = A^{abstr}(a_1, a_2, \ldots, a_D) \quad (5.4)$$

We can then define the following partial windows $\tilde{W}^i$:

$$\tilde{W}^i = \text{window}(\tilde{A}_i^{abstr}(a_1, a_2, \ldots, a_D)) - 1 \text{ for } i \in [1 \ldots D] \quad (5.5)$$

where the exact definition of this partial window can be obtained from equation 5.1 through substitution of the flull abstract address equation in the binary occupied address/time domains by equation 5.2. Note that we have added a term equal to "−1" to compensate for the "+1" term in the definition of the window. This allows us to simplify our calculations in the following. The different partial windows are strongly related because they share the same dimension order and dimension directions (at least for those dimensions that are taken into account), i.e. if $\tilde{W}^i$ is the partial window for the case where i dimensions are taken into account, then $\tilde{W}^{i+k}$ is the partial window for the case where k additional dimensions are taken into account.

Figure 19:
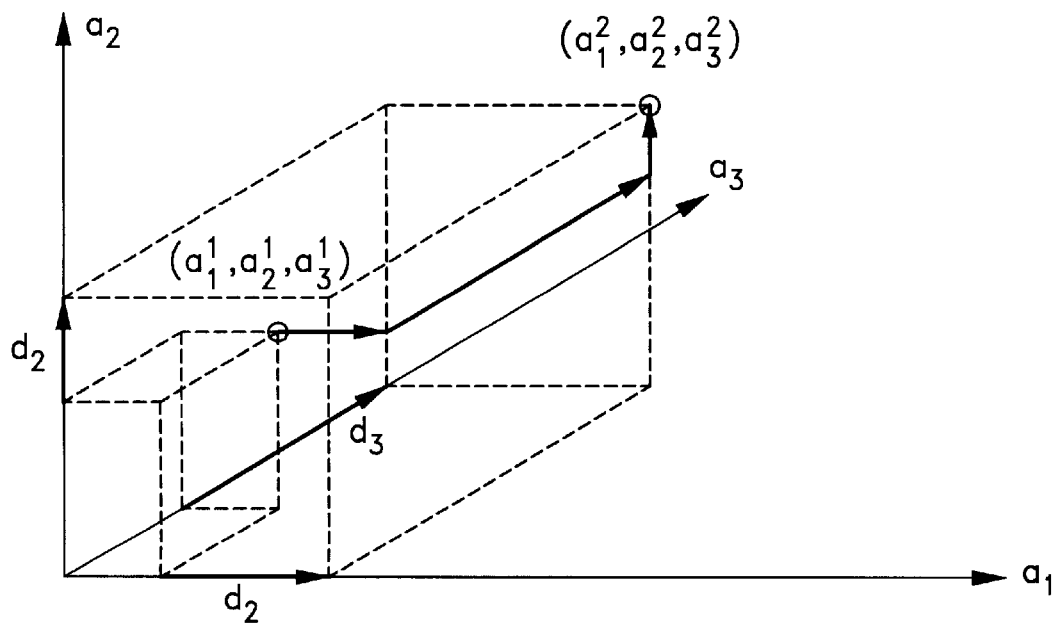
FIG. 19 shows the calculation of distance components for two arrays according to the present invention.

These (partial) window sizes can also be seen as the maximal absolute value of the weighted sum of distances between the indices of two elements of the array that are simultaneously alive (the weights correspond to the $\tilde{N}_j^i$ coefficients in the partial abstract address equations). These distances are indicated in FIG. 19 for an example with a 3-dimensional array. So let us assume that the distance vector between these two elements that maximizes the absolute weighted distance $\tilde{W}^i$ is represented by $(d_{n1}, d_{n2}, \ldots, d_{nD})$.

$$\tilde{W}^i = \left| \sum_{j=1}^{i} \tilde{N}_j^i d_{n_j} \right| \quad (5.6)$$

Note that only the first i components contribute to $\tilde{W}^i$. Since the components $d_{nj}$ of this vector represent distances in the different dimensions of the array, we know that $|d_{nj}| \le S_{nj} - 1$, where $S_{nj}$ is the size of the $n_j$'th dimension.

$\tilde{W}^D$ must equal the window size W for the full abstract address equation, minus 1 (due to the "−1" in equation 5.5). Our intention is now to find a relation between $\tilde{W}^i$ and $\tilde{W}^D = W - 1$. We can proceed as follows:

$$\tilde{W}^D = \left| \sum_{j=1}^{D} \tilde{N}_j^D d_{n_j}^D \right| \quad (5.7)$$

$$\Downarrow (d_{n_1}^D, d_{n_2}^D, \ldots, d_{n_j}^D) \text{ maximizes } \tilde{W}^D$$

$$\tilde{W}^D \geq \left| \sum_{j=1}^{D} \tilde{N}_j^D d_{n_j}^i \right|$$

$$\Downarrow |a+b| \geq |a| - |b|$$

$$\tilde{W}^D \geq \left| \sum_{j=1}^{i} \tilde{N}_j^D d_{n_j}^i \right| - \left| \sum_{j=i+1}^{D} \tilde{N}_j^D d_{n_j}^i \right|$$

$$\Downarrow \tilde{N}_j^D = \prod_{k=j+1}^{D} S_{n_k} = \tilde{N}_j^i \tilde{N}_i^D \text{ for } i \in [j, D]$$

$$\tilde{W}^D \geq \tilde{N}_i^D \left| \sum_{j=1}^{i} \tilde{N}_j^i d_{n_j}^i \right| - \left| \sum_{j=i+1}^{D} \tilde{N}_j^D d_{n_j}^i \right|$$

$$\Downarrow \left| \sum_{j=1}^{i} \tilde{N}_j^i d_{n_j}^i \right| = \tilde{W}^i \text{ and } |d_{n_j}^i| \leq S_{n_j} - 1$$

$$\tilde{W}^D \geq \tilde{N}_i^D \tilde{W}^i - \sum_{j=i+1}^{D} \tilde{N}_j^D (S_{n_j} - 1)$$

$$\Downarrow \sum_{j=i+1}^{D} \tilde{N}_j^D (S_{n_j} - 1) = \sum_{j=i+1}^{D} (\tilde{N}_{j-1}^D - \tilde{N}_j^D) = \tilde{N}_i^D - 1$$

$$\tilde{W}^D \geq \tilde{N}_i^D \tilde{W}^i - \tilde{N}_i^D + 1$$

So, now we can calculate a lower bound for $\tilde{W}^D$, provided that we know the value of $\tilde{W}^i$. In a similar way, we can find an upper bound:

$$\tilde{W}^D = \left| \sum_{j=1}^{D} \tilde{N}_j^D d_{n_j}^D \right| \quad (5.8)$$

$$\Downarrow |a+b| \leq |a| + |b|$$

$$\tilde{W}^D \leq \left| \sum_{j=1}^{i} \tilde{N}_j^D d_{n_j}^D \right| + \left| \sum_{j=i+1}^{D} \tilde{N}_j^D d_{n_j}^D \right|$$

$$\Downarrow \tilde{N}_j^D = \prod_{k=j+1}^{D} S_{n_k} = \tilde{N}_j^i \tilde{N}_i^D \text{ for } i \in [j, D]$$

$$\tilde{W}^D \leq \tilde{N}_i^D \left| \sum_{j=1}^{i} \tilde{N}_j^i d_{n_j}^D \right| + \left| \sum_{j=i+1}^{D} \tilde{N}_j^D d_{n_j}^D \right|$$

$$\Downarrow (d_{n_1}^i, d_{n_2}^i, \ldots, d_{n_D}^i) \text{ maximizes } \tilde{W}^i = \left| \sum_{j=1}^{i} \tilde{N}_j^i d_{n_j}^i \right|$$

$$\tilde{W}^D \leq \tilde{N}_i^D \tilde{W}^i + \left| \sum_{j=i+1}^{D} \tilde{N}_j^D d_{n_j}^D \right|$$

$$\Downarrow \left| \sum_{j=i+1}^{D} \tilde{N}_j^D d_{n_j}^D \right| \leq \tilde{N}_i^D - 1 \text{ (see derivation of equation 5.7)}$$

$$\tilde{W}^D \leq \tilde{N}_i^D \tilde{W}^i + \tilde{N}_i^D - 1$$

If we combine equation 5.7 and equation 5.8, we get the following:

$$\left| \tilde{W}^D - \tilde{N}_i^D \tilde{W}^i \right| \leq \tilde{N}_i^D - 1 \quad (5.9)$$

or equivalently:

$$\left| \tilde{W}^D - \left( \prod_{j=i+1}^{D} S_{n_j} \right) \tilde{W}^i \right| \leq \prod_{j=i+1}^{D} S_{n_j} - 1 \quad (5.10)$$

So these equations provide us with a relation between the partial window $\tilde{W}^i$ and the full window $W = \tilde{W}^D + 1$. Now let us suppose that we have chosen the order and directions of the first i dimensions of an array. If we then calculate the partial window for the corresponding partial abstract address equation, we can also calculate an upper and lower bound on the full window, even though we do not know the order and directions of the remaining dimensions yet. The only thing we need are the sizes of the remaining dimensions, and those are known. The more dimensions we fix, the tighter the upper and lower bounds become, as the product $$\prod_{j=i+1}^{D} S_{nj}$$

of the sizes of the remaining dimensions decreases. When all dimensions are fixed (i.e. i=D), the right-hand side of equation 5.10 evaluates to zero $$\left( \text{assuming that } \prod_{j=D+1}^{D} S_{nj} = 1 \right).$$

We now describe how one can calculate the exact window size for a given intra-array storage order of an array. A straightforward way of selecting the best storage order is to evaluate the window size for each of them and to select the one with the smallest window size, i.e. we could perform a full search. However, the number of possible storage orders that we consider even after our earlier simplifications, can be huge, especially for arrays with many dimensions. For an array with D dimensions, there are no less than $2^D D!$ possibilities. Moreover, the number of distances that we have to calculate for one window evaluation is proportional to the square of the number of dependencies of an array. In particular, in case the BOAT-domains are LBL's, the number of ILP problems to solve to evaluate the window of an array with F dependencies equals F(F+1). Therefore, a full search is out of the question for arrays with many (e.g. 6 or more) dimensions. For instance, for an array with 6 dimensions and (only) 10 dependencies, this would result in about 5 million ILP problems to be solved (for only one array!), which is clearly unacceptable. In accordance with the present invention we use a more intelligent way to traverse the search space in case there are many possibilities. We can do this by making use of the property that we have derived above for the partial windows: given that we have fixed the order and direction of some of the dimensions, we can already calculate an upper and a lower bound on the window, no matter what the order and direction of the remaining dimensions is.

Figure 20:
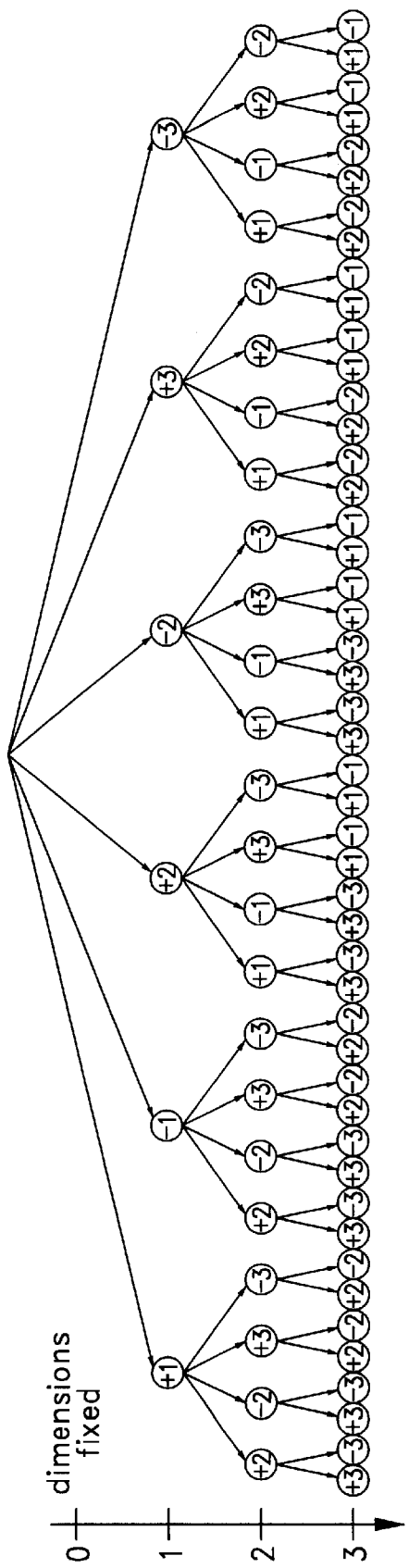
FIG. 20 shows an intra-array storage search tree for a three-dimensional array according to the present invention.

This property is ideally suited for the implementation of a branch-and-bound (B&B) search strategy. The search space can be seen as a "tree" in which we have to find the optimal "leaf". An example of the search tree for a 3-dimensional array is shown in FIG. 20. The numbers in the circles correspond to the dimension that is fixed, and the signs correspond to the direction that was chosen for that dimension.

We can start by evaluating the partial windows for the cases where we fix only one dimension and its direction. We can then calculate the corresponding upper and lower bounds and prune the cases that can not lead to an optimal solution. Next, for the remaining cases, we fix an additional dimension, calculate new bounds, and prune again. This process is then repeated until all dimensions have been fixed, and we end up with the optimal solution (within the boundaries of our search space). The worst-case complexity of a full B&B strategy $$\left( D! \sum_{i=1}^{D} \frac{2^i}{(D-i)!} \text{ partial window calculations} \right)$$

is worse than that of a full search in which we only evaluate the leaf-nodes of the tree ($2^D D!$ window calculations), but in practice it is highly unlikely that the complete B&B tree has to be searched as there are usually some dominant dimensions. Moreover, we present later some additional techniques to prune the search space even further. In our experiments, the number of evaluated nodes in the search tree always was relatively small. The reason for this is that the (partial) window difference between a good and a bad choice is usually relatively large, especially at the higher levels of the search tree.

A third possible search strategy could be called greedy tree descent. Just like the B&B strategy it is based on a gradual fixing of dimensions and partial window evaluations. However, unlike for the B&B strategy, at each level of the search tree only the most promising branch is explored further (even though other branches might lead to better solutions). This strategy requires only $D(D+1)$ window evaluations. Of course, it is not guaranteed that this strategy leads to the optimal leaf node. Nevertheless, during our experiments this strategy always turned out to lead to very good and most of the time even optimal results.

Although the search techniques presented above allow us to traverse the sometimes huge search space in a reasonably efficient way, it would still be worthwhile if we could prune the search space in advance, i.e. if we could rule out certain possibilities without having to evaluate the corresponding window sizes. In this way several (expensive) window evaluations could be avoided. We will now illustrate how we can prune the search space by means of the following example:

```
        int A[5][5];
        for (i = 0; i < 5; ++i)
        {
            for (j = 0; j <8 8; ++j)
            {
                if(j < 5)
    S1:             A[i][j] = ...
                ...
                if (j >= 3)
    S2:             ... = A[i][j-3];
            }
        }
```

Figures 21A, 21B:
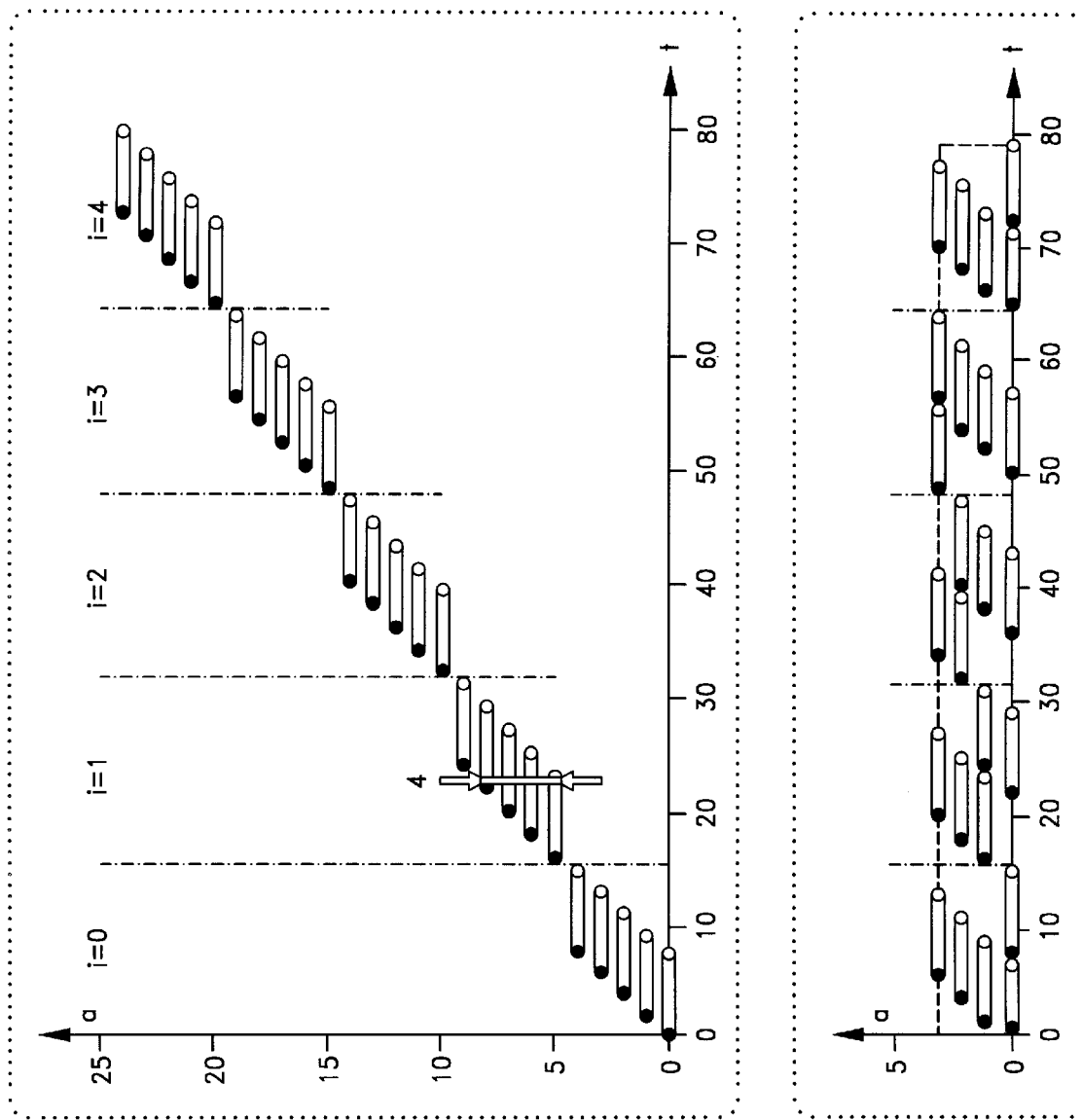
FIG. 21 shows a folded OAT-domain according to the present invention.

If we assume a sequential execution order and a storage order $O_A^{addr}(a_1, a_2)=5a_1+a_2$ for A, we obtain the OAT-domain (which equals the only BOAT-domain in this case) depicted in FIG. 21a. The window size equals 4, so we can fold the domain as shown in FIG. 21b. However, if we look at the OAT-domain in more detail, we can recognize several parts that are not overlapping in time (indicated by the vertical striped lines). These parts correspond to the different executions of the i-loop. The reason why these parts do not overlap is that the dependency between S1 and S2 is not carried by any loop, i.e. the elements of A that are produced during a certain execution of the i-loop are consumed only during the same execution of this loop, and not during any other execution. Therefore we call this loop an invariant loop.

Figure 22A:
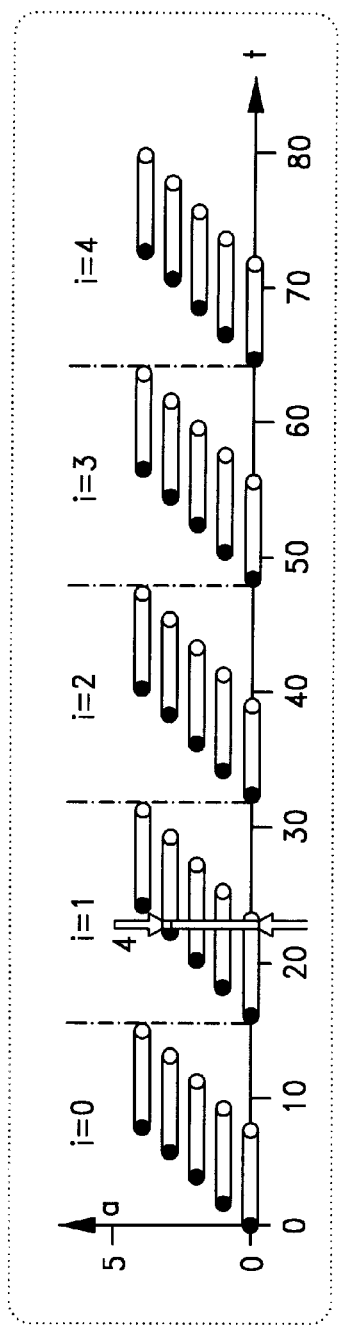
FIG. 22 shows the folded OAT-domain of FIG. 21 after a projection of a dimension according to the present invention.

This also means that the memory locations being occupied by elements of A during one execution of the i-loop can be reused during another execution of this loop. If we then also look at the index expressions used in the accesses of A, we can see that one of the indices, namely the first one, is only depending on the i-loop. Since we never need elements of A produced during different executions of this loop simultaneously, we can simply "ignore" the first dimension of A during our optimizations. This is equivalent to an orthogonal projection of the variable domain of A along the axis of its first dimension. In this way the number of dimensions of A is effectively reduced by one. We refer to this type of dimension as an invariant dimension. The effect of this projection on the OAT-domain is depicted in FIG. 22a.

Figure 22B:
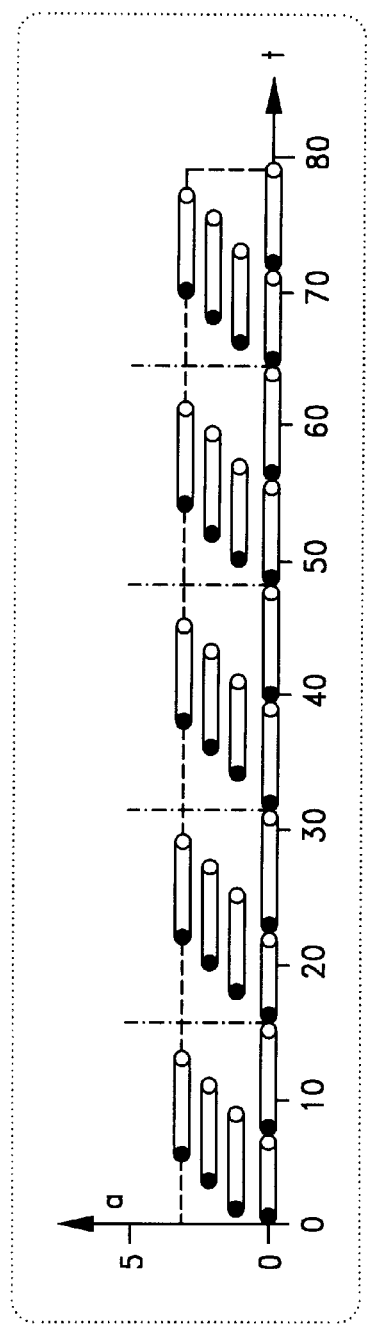

Now we can see that the window size still equals 4, and consequently we can fold the OAT-domain as depicted in FIG. 22b. If we compare this solution with the one shown in FIG. 21b, we can see that the organization of the array elements in the memory is somewhat different, but the window size is the same. So if we apply the optimization strategy that we approximate the folded OAT-domains by rectangles, the resulting memory size is the same in both cases.

On the one hand one can easily verify that in case of invariant dimensions, no matter what the storage order is, the window size of the projected and non-projected case are always the same because the parts of the OAT-domain that are not overlapping in time can never overlap as long as the execution order remains fixed. The maximum distance of equation 5.1 therefore cannot occur at a transition between different executions of invariant loops. So the relative position of the different parts of the OAT-domain (which is the only difference between the projected and non-projected cases) cannot influence the size of the window.

Figure 23:
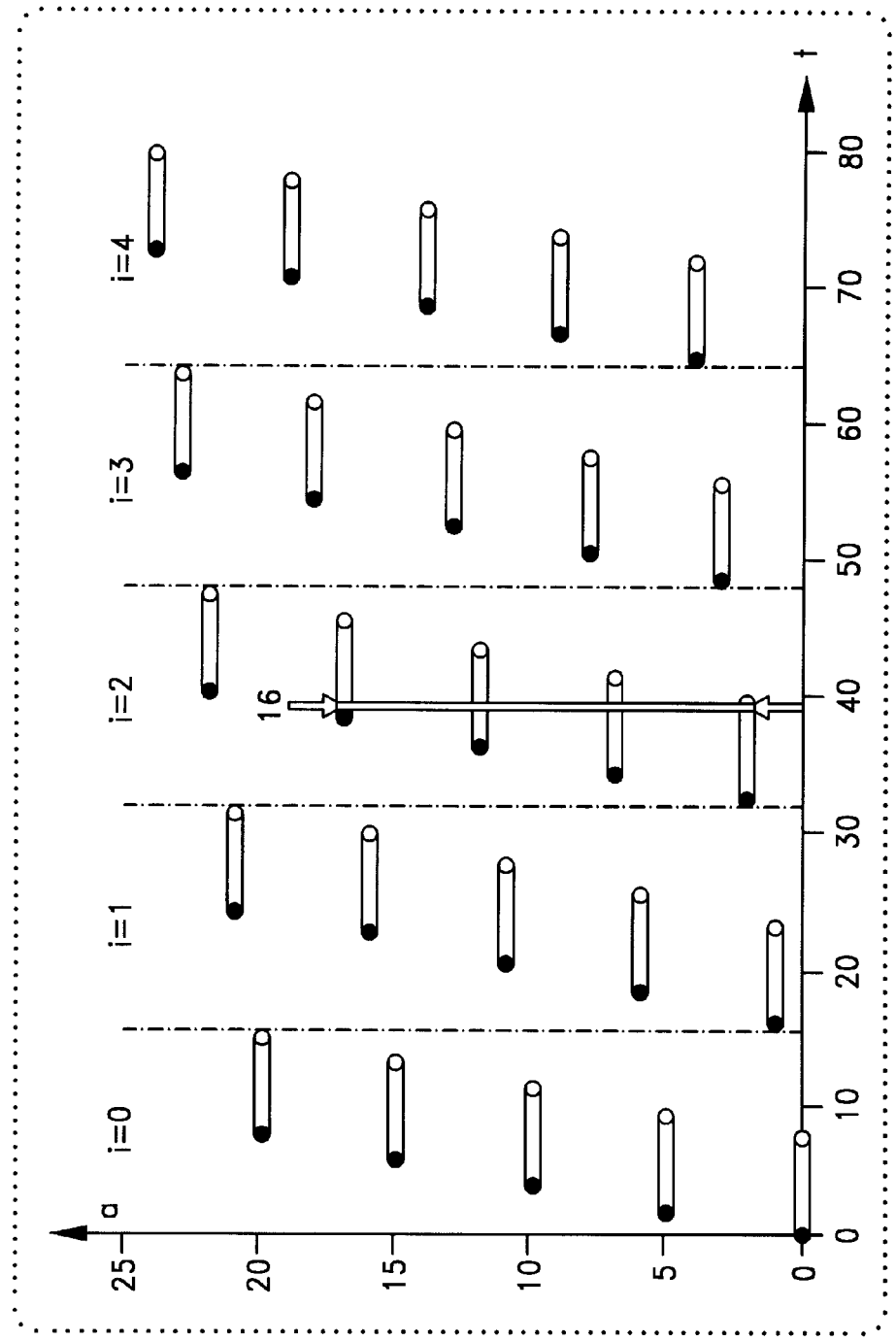
FIG. 23 shows the OAT-domain of FIG. 21 for a suboptimal storage order.
Figure 24A:
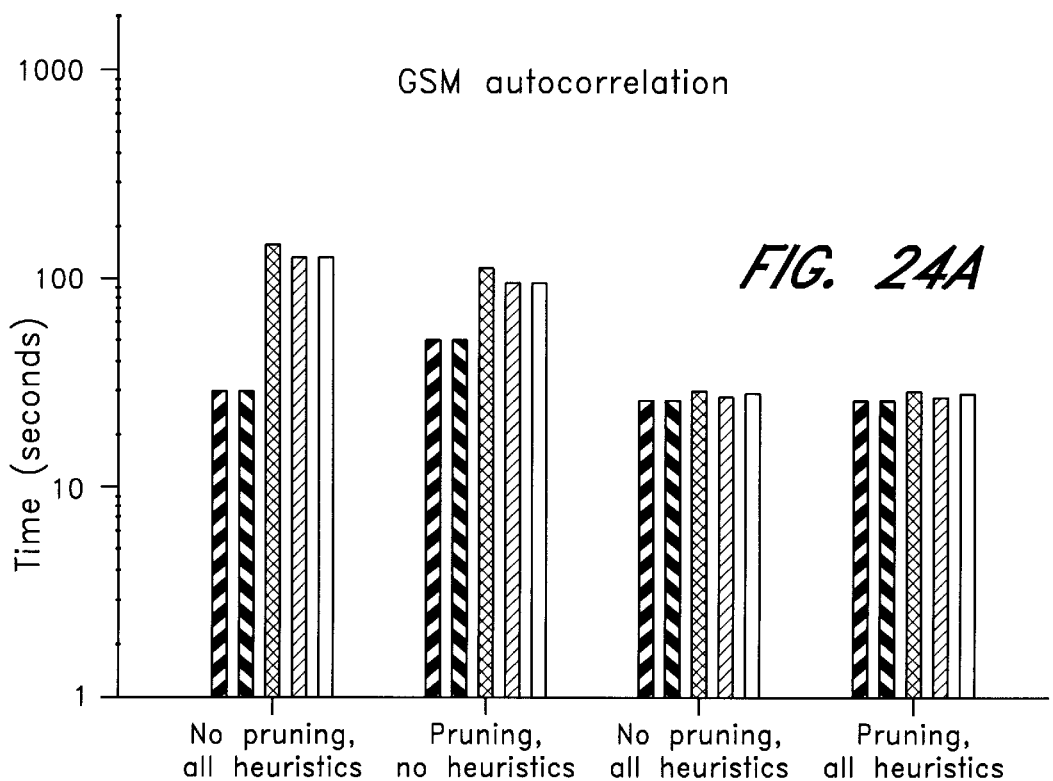
FIG. 24 shows optimization run-times in accordance with search strategies of the present invention.
Figure 24B:
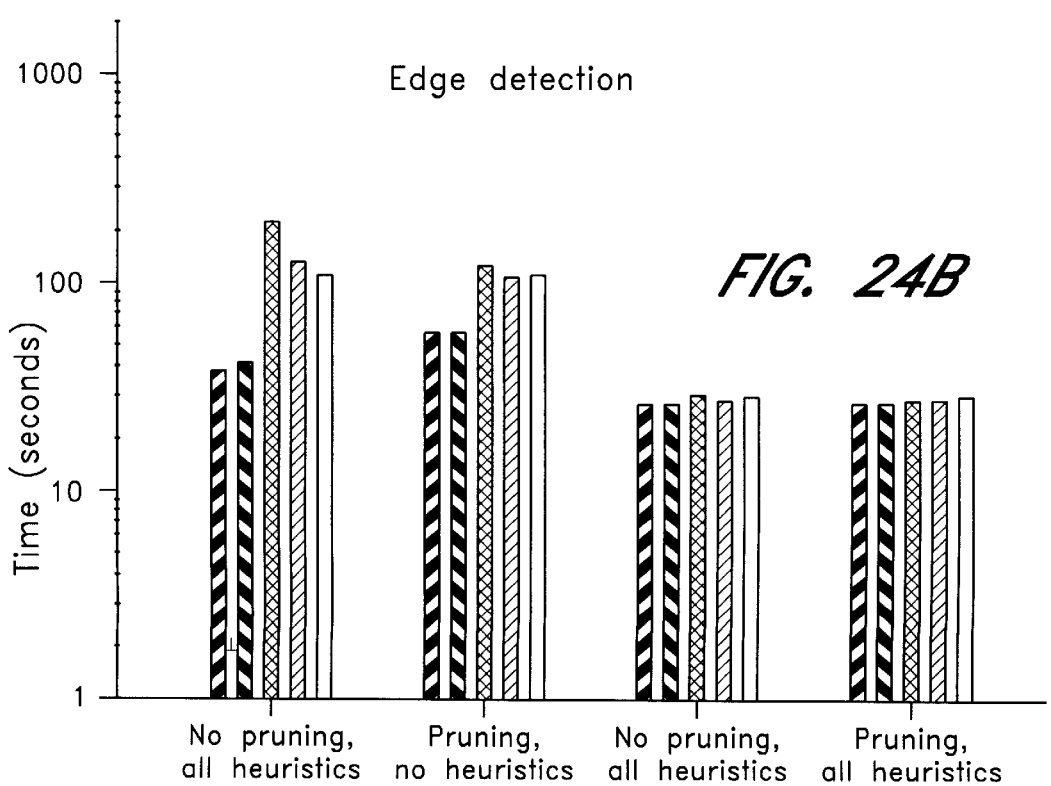
Figure 24C:
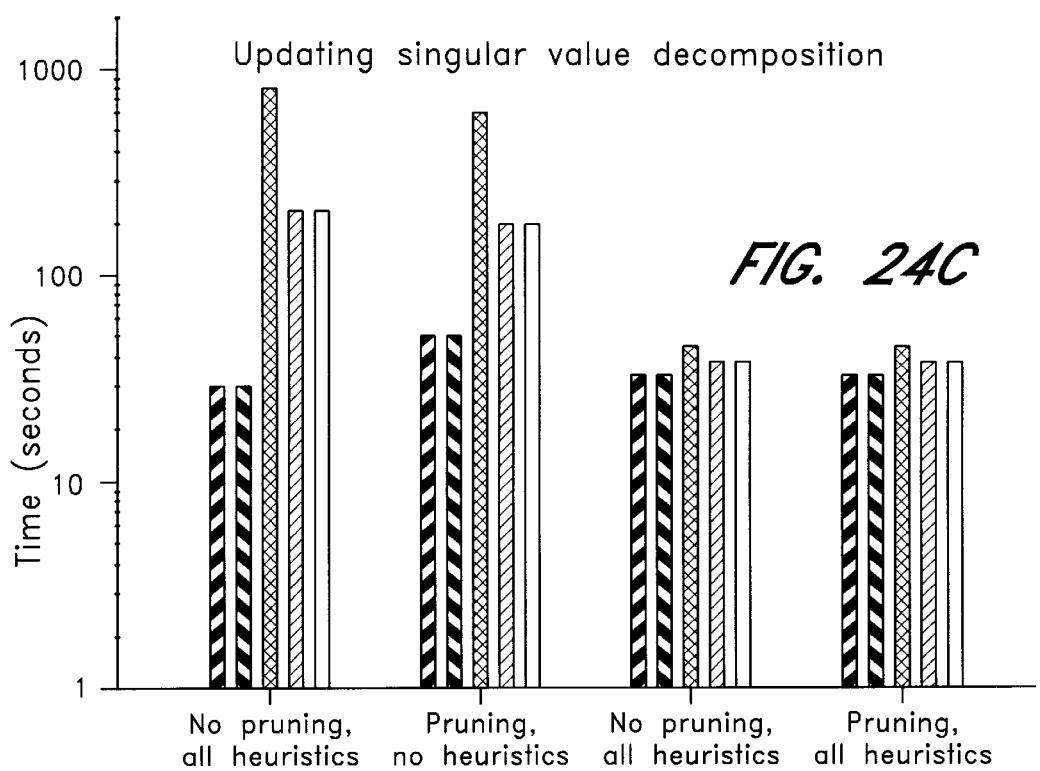
Figure 24D:
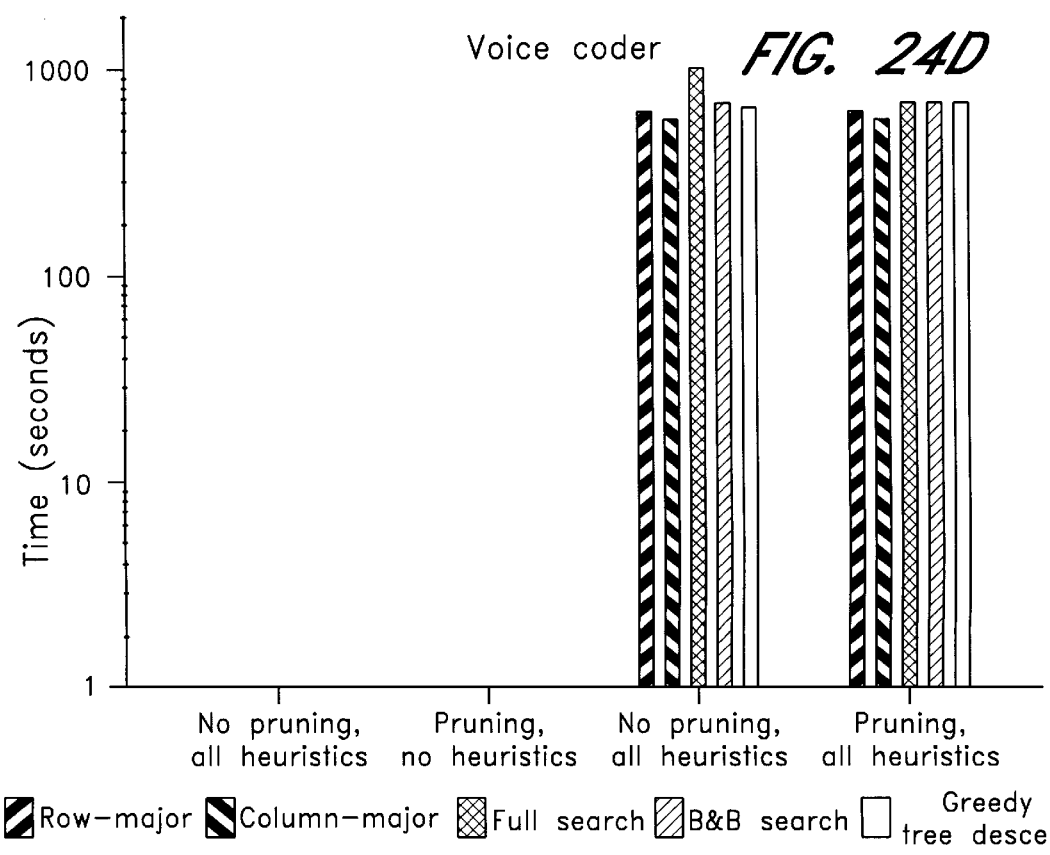
Figure 24E:
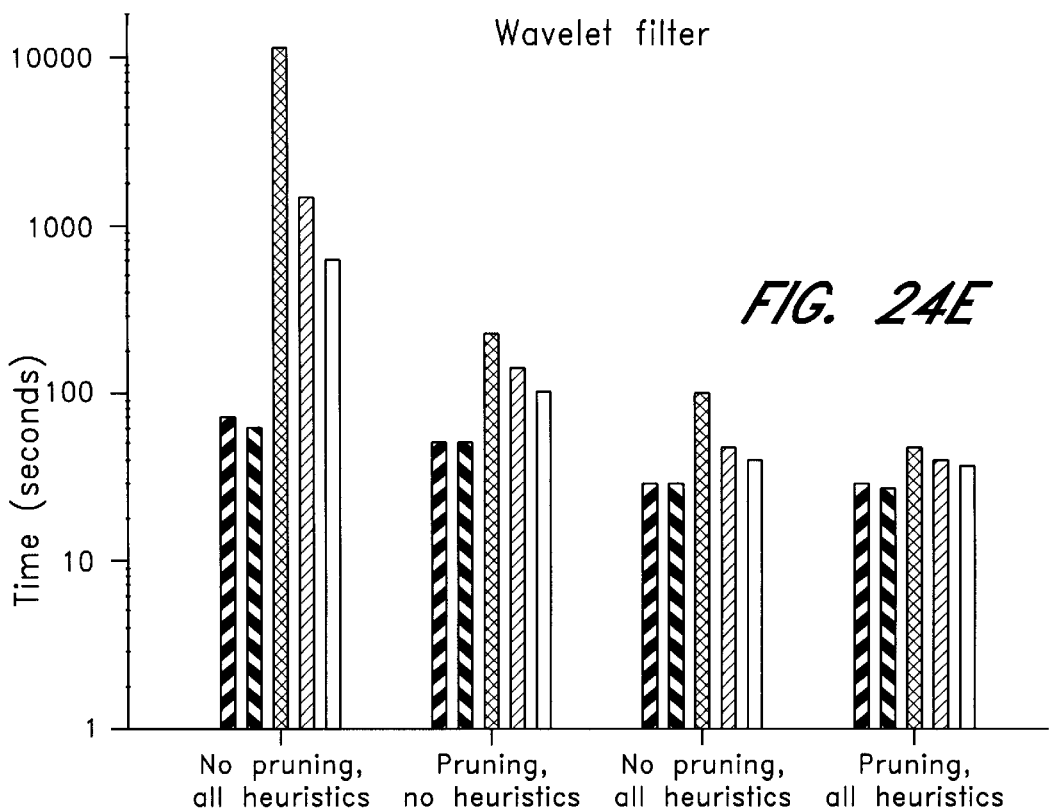
Figure 24F:
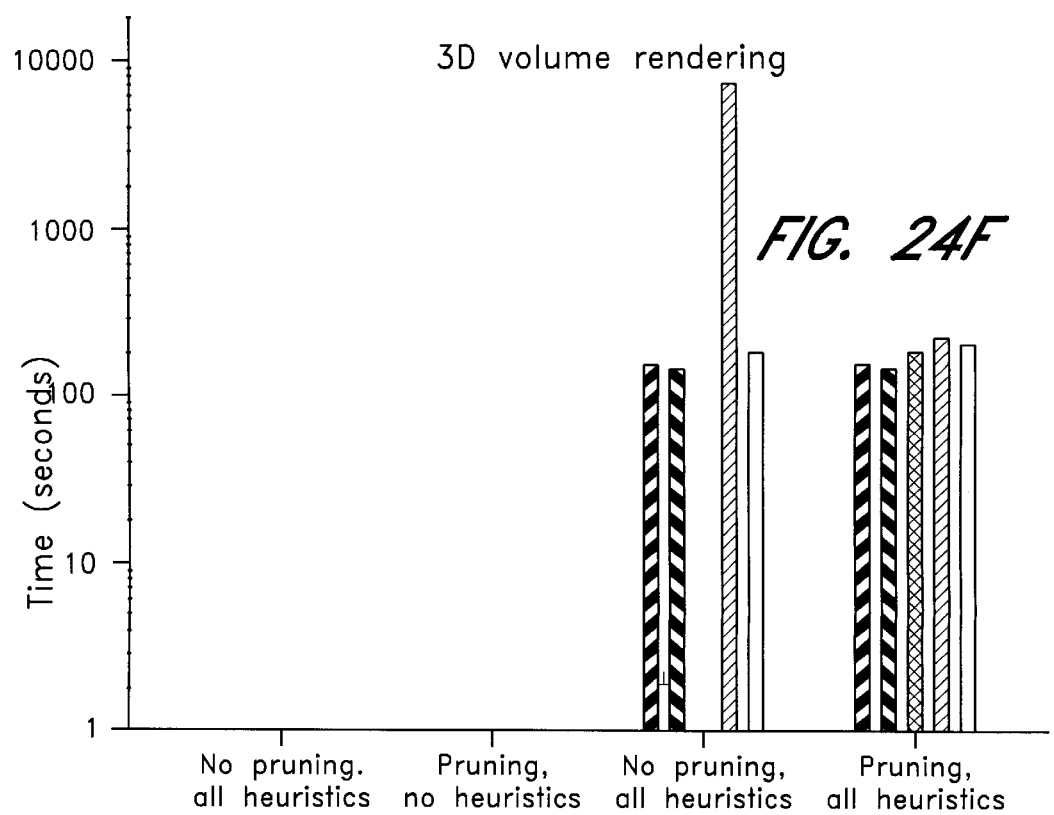

On the other hand, one can verify that an exact search strategy, such as a full search or a B&B search, always puts the invariant dimensions "at the outside", i.e. assigns them the largest coefficients in the storage order function (if the storage order influences the window size). In that way the non-invariant dimensions, which are the only ones that matter for the window size, are packed more densely, resulting in the smallest window size. Failing to do so would result in a "spreading" of these dimensions and therefore a suboptimal solution. This is depicted for the above example in FIG. 23 for a storage order $O_A^{addr}(a_1, a_2)=a_1+5a_2$.

So, given these facts, if we can detect an invariant dimension, we can safely ignore it during our search for the optimal intra-array storage order, and effectively reduce the height of the search tree, because the resulting window size is the same as when we would take it into account. An additional advantage of using projections is the fact the invariant dimensions no longer appear in the address expression (for example 5.6.1 we would obtain $O_A^{addr}(a_1, a_2)=a_2$), and therefore the generation of the address sequences is cheaper (either in terms of hardware cost, or cycle count, or both). Moreover, the modulo operation may even become superfluous if the window size equals the product of the sizes of the remaining dimensions, which is often the case. In that case, the values generated by the abstract address equation can never exceed the window size, so there is no need for folding.

The additional effort needed for the detection of invariant loops and invariant dimensions is virtually zero. The reason for this is that the speed-up heuristics discussed later, require an even more detailed analysis of the dependencies. We can therefore use these results to prune the search space with almost no additional effort, while the effect on the size of the search space can be very large. It is important to note that in case we apply a projection, we violate the unambiguity constraint that we imposed previously. After the projection, several array elements may be mapped onto the same abstract addresses, but as indicated above, in this context this poses no problems as it cannot lead to memory occupation conflicts.

Finally, we should also mention that a pure address reference window approach has an important shortcoming. In some cases one can obtain a better solution by applying a projection or a projection combined with a window instead of a window only. Moreover, a simple analysis of the dependencies as described above may not be sufficient to detect the possibility of this projection. A combination with projections (or sometimes even a pure projection approach, as in the example) is included within the present invention as an alternative. The detection of the projection opportunities for which no equivalent window approach exists, requires some extra analysis effort. In "Memory reuse analysis in the polyhedral model", D. Wilde and S. Rajopadhye, Proceedings of Euro-Par '96, Lyon, France, August 1996 the constraints to be satisfied by a valid projection are described for the general case. However, checking these constraints for every dimension of every array may slow down the optimization process considerably, while it is to be questioned whether these additional opportunities occur frequently in practice. In case we could not use the dependency analysis results of other steps, which allow us to perform the simple test virtually for free, the situation would be different. In that case the difference in complexity between the "simple" test and the extended test might almost vanish.

During our experiments with several multimedia applications, we have observed that the vast majority of valid projections can be detected with the simple dependency test based on invariant loops (with almost no effort). For only two arrays in one application it was observed that the simple test could not detect the possibility of a projection. Our experiments also revealed that in practice many dimensions can be pruned in single-assignment code, such that effective number of remaining dimensions is usually quite small (e.g. 3 or less). Therefore, the difference between the different search strategies is not that large in practice. Full search might still explode in rare cases, whereas this is highly unlikely for B&B and even impossible for greedy tree descent. These last two are therefore preferable in accordance with the present invention.

In the following we present some of the results that we obtained with our storage requirements reduction strategy for a few (multimedia) applications by means of a prototype tool. Our strategy is intended to be applied to each memory separately as one of the last steps in an optimization methodology, i.e. when the execution order, the memory architecture and the array-to-memory assignment are known. The actual nature of the execution order (i.e. parallel or sequential) is not relevant for our techniques, as we are only interested in the relative memory access order. We therefore have assumed in each of our experiments that all of the arrays had to be stored in one (shared) memory, and that the applications had to be executed sequentially, but the techniques would work equally well in case of a parallel execution order and multiple memories.

In Table 1 we present the most relevant properties of the (multimedia) applications and application kernels that we used as test vehicles. The first one is an updating singular value decomposition algorithm that can for instance be used in radar applications. The second one is the kernel of a 2-dimensional wavelet compression algorithm that can be used for image compression, just like the third one, which is an advanced edge detection algorithm. The next one is a 3-dimensional volume rendering algorithm. For this application we also looked at a version with (heavily) reduced size parameters. Finally we have looked at a voice coder algorithm and a public domain GSM autocorrelation algorithm. Several of these applications consist of many pages of code. The applications are mostly manifest and even linear. In cases where this was not true, we have manually "linearized" them using worst-case assumptions, such that a valid solution could be obtained.

The table contains the array memory sizes required for the original multipleassignment versions and the single-assignment versions of the algorithms (with the same assumptions: one memory and a sequential execution order). The last column also indicates the maximal number of scalars that is simultaneously alive during the execution of the algorithms. These numbers are obtained by symbolic simulation and represent lower bounds on the required memory sizes, since these are the sizes that would be required if all the arrays would be split into scalars. Doing this is however unacceptable for realistic multimedia applications, as the control and address generation overhead would be prohibitively large, but we can use these numbers to assess the quality of our optimization strategy in accordance with the present invention. The closer we come to them, the better our solutions are.

TABLE 1

| Application | Array | Max. Dep. Per array | Max. Dim. per array | Multiple assign. size (words) | Single assign. size (words) | Scalar min. size (words) |
| --- | --- | --- | --- | --- | --- | --- |
| Updating SVD | 6 | 27 | 4 | 6013 | 6038 | 211 |
| 2D Wavelet | 11 | 18 | 5 | 1186 | 8704 | 514 |
| Edge detection | 18 | 17 | 4 | 724 | 5647 | 116 |
| 3D volume rendering | 22 | 11 | 8 | 26581 | 216M | Infeas. |
| Reduced 3D volume rendering | 22 | 11 | 8 | 166 | 6976 | 134 |
| Voice coder | 201 | 41 | 6 | 2963 | 314K | 905 |
| GSM autocorrelation | 17 | 35 | 3 | 532 | 1279 | 209 |

During our experiments we let our prototype tool decide on an optimal intra-array storage order for each array, using different search strategies (full search, B&B, and greedy tree descent). We also looked at the cases were we just selected a row- or column-major storage order and calculated the windows. In each case we assumed a static windowed allocation approach (as depicted in FIG. 12a). The resulting memory sizes (in terms of the number of words) are indicated in Table 2 (the sizes correspond to the sum of the windows of all the arrays). From this table we can see that the savings in memory size for the static windowed strategies can be considerable. The results also indicate that an arbitrary choice of the storage order (i.e. row-major or column-major) can easily lead to suboptimal results. The row-major storage order apparently performs quite well for most of the experiments, but this can be explained by the fact that most of these examples have been written manually, and programmers tend to use the dimensions of an array in a left-to-right manner, for which a row-major order is ideally suited. However, the storage, size reduction step may follow several other execution order optimization steps that make extensive use of loop transformations, which heavily increase the temporal locality of the data accesses compared to the original specification to reduce the storage size requirements after in-place mapping. After such loop transformations, the array access order is usually changed drastically and consequently the row-major storage order is in general no longer likely to be near-optimal. The SVD algorithm is such an example that has been subject to loop transformations before our storage order optimizations, and in that case the difference between the optimal storage order and a row-major or column-major one is very large.

TABLE 2

| Application | Row major size (words) | Column major size (words) | Full search size (words) | B&B size (words) | Greedy tree descent size (words) |
|---|---|---|---|---|---|
| Updating SVD | 3067 | 484 | 314 | 314 | 314 |
| 2D Wavelet | 3500 | 8348 | 3038 (1024) | 3038 (1024) | 3038 (1024) |
| Edge detection | 580 | 1021 | 576 | 576 | 576 |
| 3D volume rendering | 26576 | 216M | 26576 | 26576 | 26576 |
| Reduced 3D volume rendering | 166 | 4756 | 166 | 166 | 168 |
| Voice coder | 2417 | 38537 | 2403 | 2403 | 2403 |
| GSM autocorrelation | 667 | 1096 | 529 | 529 | 529 |

Note that in most cases we were able to effectively remove the single-assignment overhead, and that for several cases we already obtain results that are substantially better than what would be obtained by a standard compiler (i.e. the multiple assignment column in Table 1), even though we only applied a static allocation. Only for one example, namely the 2-D wavelet algorithm, we could not completely remove the overhead. Detailed inspection of the example revealed this was a case where the simple projection test, and a window-only strategy leads to a suboptimal result. As mentioned above, by extending our techniques with a more extended test as described in "Memory reuse analysis in the polyhedral Model", D. Wilde and S. Rajopadhye, Proceedings of Euro-Par '96, Lyon, France, August 1996 this overhead can be removed too. A similar result could be obtained by applying a loop transformation instead. The result in both cases would be in a memory size of 1024 words (indicated between brackets in Table 2).

Apart from the single-assignment overhead removal, the additional size reductions are definitely worthwhile. For the updating SVD example for instance, no orthogonal projection could be performed, while the reduction by means of a window is quite large. The optimization run-times of our prototype tool are shown in FIG. 24. All of our experiments were run on a Hewlett-Packard K260/4 workstation with 1.6 GB of physical RAM and 4 PA-8000 CPUs with a clock speed of 180 MHz. As an ILP solver we used the public domain package LP_SOLVE, M. Berkelaar, Lp_solve MILP solver 2.0, 1995. Available at ftp://ftp.es.ele.tue.nl/pub/lp_solve/.

The run-times were measured for the five different (search) strategies, using four different configurations:

1. no search space pruning and no speed-up heuristics applied;
2. search space pruning applied but no speed-up heuristics;
3. no search space pruning but speed-up heuristics applied;
4. search space pruning and speed-up heuristics applied.

The run-times are certainly acceptable in an embedded application design context, especially when both the search space pruning and the speed-up heuristics are applied. From these figures we can also conclude that the effect of the speed-up heuristics is usually larger than the effect of the search space pruning (typically a factor for the heuristics, and about 20% for the pruning). Moreover, for two test vehicles, namely the voice coder and the 3D volume rendering, no solution could be found without applying the speed-up heuristics. Nevertheless, both techniques are necessary to reduce the chance of getting stuck to a negligible level. When we applied them both, we have always been able to obtain a solution in an acceptable time for each of the strategies.

We can also see that, in contrast to what might be expected, the full search, B&B, and greedy tree descent techniques have comparable run-times, even for applications with arrays having a large number of dimensions, especially when both the pruning and the speed-up heuristics are applied. The reason why the full search strategy run-times do not explode even in these cases, is that both the pruning technique and the speed-up heuristics result in a considerable reduction of the number of ILP problems to be solved. Nevertheless, the B&B and greedy tree descent techniques tend to be faster and they are probably the best choice. The B&B version is probably most preferable as it guarantees the optimal solution (within the search space), in contrast to the greedy tree descent. Finally, the figures also illustrate that the time penalty for searching the complete search space is relatively small. When both the pruning and the speed-up heuristics are applied, the optimization run-times for the full search, B&B and greedy tree descent strategies are only slightly larger than for the row-major or column-major cases, where only one storage order is evaluated.

The present invention is based on the geometrical modeling techniques presented above. These models allow us to describe groups of operations and variables in a compact way that is independent of the program size parameters such as the values of loop boundaries. Also the techniques themselves are independent of these parameters. The optimization run-times are likely to be affected by the size parameters, as these parameters also appear in (some of) the ILP problems that we have to solve, and the run-times of ILP solvers tend to be dependent on the size of the coefficients in the ILP problems. It can be expected that our optimization run-times are far less sensitive to the size parameters than the ones obtained by simulation-based and scalar optimization techniques.

Now we describe the second major task in our optimization strategy, namely the inter-array storage order optimization. During this step we try to find an optimal placement in memory of the arrays as a whole. During this task we can also decide to split some of the arrays if the split is likely to result in a better solution. Given that we have found the optimal intra-array storage order for each array, for most of the placement strategies presented in FIGS. 11, 12 and 13 there is only one remaining parameter to fix in each of the address equations, namely the base address or offset of the array in memory. However, especially for the dynamic approaches, making a good choice for these offsets is not trivial.

In the scalar context, (binary) ILP formulations, (iterative) line packing, graph coloring, or clique partitioning techniques have proven to be valuable in a register and register-file allocation and signal-to-register assignment context. Unfortunately, these techniques are not feasible when the number of scalars becomes too large, which is the case for data-dominated multimedia applications. Extensions of these scalar techniques towards periodical stream-based applications also have only a limited scope. Due to the very different nature of arrays and scalars, there is also little hope that my of the scalar techniques would obtain near-optimal results when extended in a straightforward way to treat arrays as scalars. Array storage management requires taking into account several aspects that are not even present in a scalar context. For instance, in contrast to scalars, different arrays may have different sizes and internal structures and exhibit even "holes". Moreover, life-times of arrays can partially overlap with those of other arrays.

Before we can start placing the arrays, we have to be able to decide what (relative) placements are allowed. We therefore define two properties that can be defined for each pair of arrays: compatibility and mergability, which are explained next. Moreover, we can also calculate the minimal distance between two arrays in memory.

If two arrays have totally disjoint global life-times, i.e. if there is no moment in time at which elements of both arrays are alive, we say that they are compatible. This means that there is no chance of a memory occupation conflict between them and consequently, we can freely choose their relative offsets.

Checking for compatibility between two arrays comes down to checking whether the orthogonal projections of their OAT-domains on the (relative) time axis overlap or not. Mathematically we can express this condition as follows for a pair of arrays $m_1$ and $m_2$:

$$\{t \mid \exists a_1, a_2 \text{ s.t. } [a_1, t] \in \mathbf{D}^{OAT}_{m_1} \wedge [a_2, t] \in \mathbf{D}^{OAT}_{m_2}\} = \phi \qquad (6.1)$$

Since the OAT-domains in general consist of several BOAT-domains, one for each flow dependency of the corresponding arrays, the problem translates into a check of the projections of each possible pair of BOAT-domains, consisting of one BOAT-domain of both arrays:

$$\forall i_1, j_1, k_1, l_1, i_2, j_2, k_2, l_2: \qquad (6.2)$$

$$\{t \mid \exists a_1, a_2 \text{ s.t. } [a_1, t] \in \mathbf{D}^{BOAT}_{i_1 j_1 k_1 l_1 m_1} \wedge [a_2, t] \in \mathbf{D}^{BOAT}_{i_2 j_2 k_2 l_2 m_2}\} = \phi$$

In case the BOAT-domains are linearly bounded lattices (LBL's), each of these checks can be easily translated into a relatively simple ILP feasibility problem. Unfortunately, the worst case number of ILP problems to be solved can become relatively large, as it equals the product of the number of flow dependencies of both arrays. Moreover, if this check has to be performed for each possible combination of arrays, the number of ILP problems to solve could become very large for real life applications.

Figure 25:
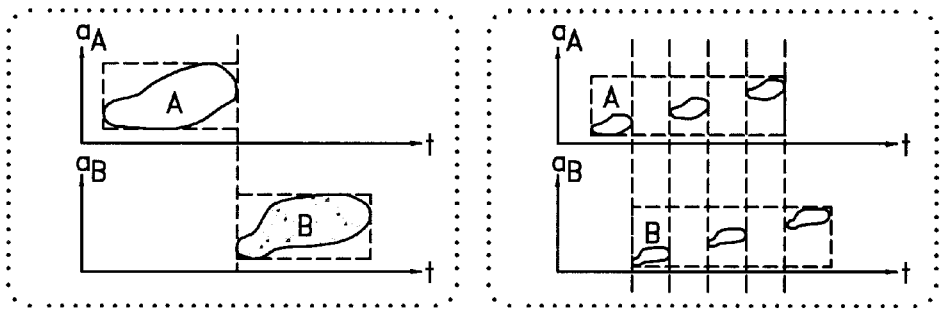
FIG. 25 shows two compatibility scenarios according to the present invention.

In practice however, there are a few scenarios for which we can decide more easily whether two arrays are compatible or not:

During the execution of the algorithm, the last read access to one of the arrays occurs before the first write access to the other array. An example of this scenario is depicted in FIG. 25a. This case is very easy to detect and requires only a few relatively simple calculations.

During the execution of the algorithm, the arrays are periodically and alternately alive. This is for instance the case in the example of FIG. 25b. This case is also relatively easy to detect: first, we can use common dependency analysis techniques to find out which common loops are invariant and do not carry any of the dependencies of both arrays. After "removing" these loops, we can proceed with the method described in the first item.

Note that checking for compatibility allows us to go further than simply approximating an OAT-domain by a rectangle. In fact, if two arrays are compatible, we know that their OAT-domains can never overlap, even if their approximating rectangles do, as in FIG. 25b.

In our prototype tool, we first assume the simplest scenario. If that compatibility test fails, we try the second one. If that one fails too, we fall back on the exhaustive pairwise BOAT-domain projection overlap test. In many cases we can obtain a definite answer with only the simpler tests. Moreover, even during the exhaustive test we can often use similar simplifications as described later. As a result of all of this, the run-times turn out to be acceptable for realistic applications.

Figure 26:
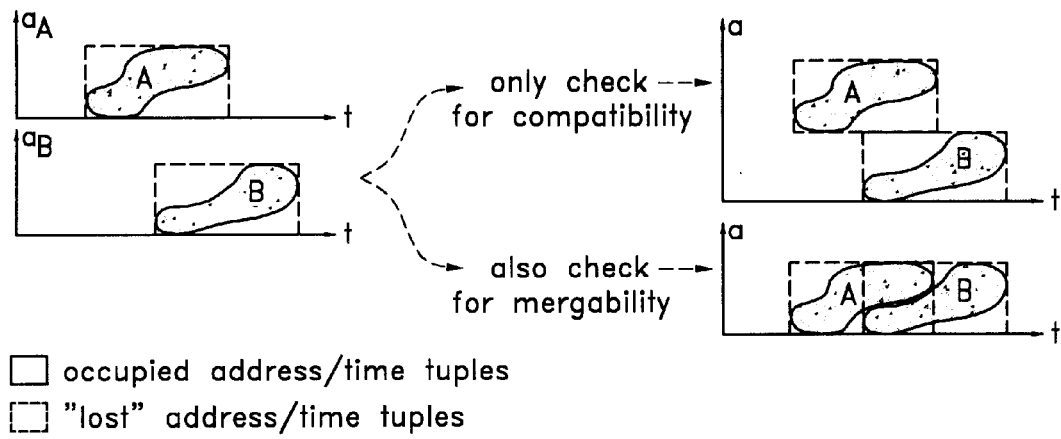
FIG. 26 shows mergability according to the present invention.

If the tests indicate that two arrays are not compatible, in general we have to make sure that their address ranges do not overlap. Otherwise we cannot guarantee correct behavior, without checking the complex constraints described by equation 3.16. However, there is a special case that is relatively easy to check and that has some practical relevance. A commonly occurring pattern in practice is the calculation of elements of a new array based on the corresponding elements of another array. If the elements of the original array are no longer needed after these calculations, it may be possible to reuse their memory locations immediately for storing elements of the new array. If this is possible, we consider these arrays to be mergable. An example of this is shown in FIG. 26.

Note that if we would only check for compatibility between the arrays, we would not be able to overlap their address ranges, because then we effectively approximate the OAT-domains by rectangles. If the mergability check succeeds, we know that even though the rectangles overlap when aligned at the bottom, there is no overlap cf the actual OAT-domains (of which we don't know the exact shape in general). So during the placement, we have to make sure that the rectangles are either perfectly aligned at the bottom, or totally non-overlapping.

Mathematically we can express this check as follows for a pair of arrays $m_1$ and $m_2$:

$$\mathbf{D}^{OAT}_{m_1} \cap \mathbf{D}^{OAT}_{m_2} = \phi \qquad (6.3)$$

or in terms of the composing BOAT-domains:

$$\forall i_1, j_1, k_1, l_1, i_2, j_2, k_2, l_2: \; \mathbf{D}^{BOAT}_{i_1 j_1 k_1 l_1 m_1} \cap \mathbf{D}^{BOAT}_{i_2 j_2 k_2 l_2 m_2} = \phi \qquad (6.4)$$

The check for mergability is slightly more complex than the worst-case check for compatibility, because we also have to take the address dimension into account, but we prefer only to perform this check for a pair of arrays when the following preconditions hold:

the arrays are not compatible;

the arrays are not folded, i.e. their window sizes equal the product of the sizes of the non-projected dimensions.

The last precondition is necessary because the test of equation 6.3 only guarantees that the non-folded OAT-domains don't overlap. If one or both of the OAT-domains are folded by means of a modulo operation, this check is not sufficient to make sure that the folded OAT-domains don't overlap.

This is illustrated in FIG. 27. In practice, this means that the full mergability check is usually triggered only a few times.

We could extend the test of equation 6.3 to take into account folding. For a pair of arrays $m_1$ and $m_2$ with window sizes $W_1$ and $W_2$ respectively, the extended test would be the following:

$$\{[a_1 \bmod W_1, t] \mid [a_1, t] \in \mathbf{D}_{m_1}^{OAT}\} \cap \{[a_2 \bmod W_2, t] \mid [a_2, t] \in \mathbf{D}_{m_2}^{OAT}\} = \phi$$

We can get rid of the modulo operations by piece-wise linear indexing mentioned above:

$$\{[f_1, t] \mid \exists k_1 \in \mathbb{Z} \text{ s.t. } a_1 = k_1 W_1 + f_1 \wedge [a_1, t] \in \mathbf{D}_{m_1}^{OAT}\} \cap \quad (6.5)$$
$$\{[f_2, t] \mid \exists k_2 \in \mathbb{Z} \text{ s.t. } a_2 = k_2 W_2 + f_2 \wedge [a_2, t] \in \mathbf{D}_{m_2}^{OAT}\} = \phi$$

So in case the BOAT-domains are LBL's, this extended test can also be performed by solving a set of ILP feasibility problems. It is questionable whether this extended test succeeds in many practical cases. The probability that two folded OAT-domains overlap is probably much higher than for non-folded domains, because they are more dense and irregular when folded.

The (extended) mergability test described above is able to determine whether the (folded) OAT-domains of two arrays overlap or not. We could easily extend this test to check whether two OAT-domains, each shifted by an arbitrary vertical offset, overlap. However, such a test only provides a yes-or-no answer, and it gives no indication about the amount of overlap or the amount of space between the domains. A placement strategy that uses this test is therefore likely to call it many times (i.e. for many different offsets) to find an optimal solution. Since this test is fairly expensive it could have a disastrous effect on the time needed for the placement. Therefore it would be better if we could have an indication of how far two OAT-domains have to be spaced from each other to avoid memory occupation conflicts. In fact we need to know two minimal distances: one distance for the case where one OAT-domain is placed "on top of" the other one, and one distance for the opposite case. This is depicted in FIG. 28.

If we know the distances $d_{AB}$ and $d_{BA}$ in this figure, we know that there can be no conflict as long as the difference in offsets $o_A - o_B$ between A and B is either larger than or equal to $d_{AB}$ or smaller than or equal to $d_{BA}$. For differences between these two values there are potential memory occupation conflicts. We can calculate these distances for a pair of arrays $m_1$ and $m_2$ as follows, given their OAT-domain descriptions:

$$d_{m_1 m_2} = \max\{d \mid \exists a, t \text{ s.t. } [a+d, t] \in \mathbf{D}_{m_1}^{OAT} \wedge [a, t] \in \mathbf{D}_{m_2}^{OAT}\} + 1 \quad (6.6)$$

$$d_{m_2 m_1} = \min\{d \mid \exists a, t \text{ s.t. } [a+d, t] \in \mathbf{D}_{m_1}^{OAT} \wedge [a, t] \in \mathbf{D}_{m_2}^{OAT}\} - 1 \quad (6.7)$$

In other words, we can find these distances by shifting the OAT-domains as far from each other as possible (in both directions) while there is still an overlap between them. These distances, incremented and decremented by one respectively, then are the maximal and minimal safe distances. Note that the offsets of both domains are not important; only the difference in offset is. So the distance criterion that we can impose is that the difference in offset between arrays $m_1$ and $m_2$ must be either larger than or equal to $d_{m_1 m_2}$ or smaller than or equal to $d_{m_2 m_1}$. This guarantees that there cannot be a memory occupation conflict between both arrays.

Again, in case the BOAT-domains are LBL's (or unions of LBL's), these distances can be found by solving a finite number of ILP problems. The following example illustrates this.

```
       int B[5], C[10];
       for (i = 0; i < 5; ++i)
S1:      B[i] = ... ;
       for (j = 0; j < 10; ++j)
S2:      C[j] = f(B[j div 2]);
       for (k = 0; k < 10; ++k)
S3:      ... = g(C[9-k]);
```

The domain descriptions for this program are the following:

$$\mathbf{D}_B^{var} = \{b \mid 0 \leq b \leq 4 \wedge b \in \mathbb{Z}\}$$

$$\mathbf{D}_C^{var} = \{c \mid 0 \leq c \leq 9 \wedge c \in \mathbb{Z}\}$$

$$\mathbf{D}_1^{iter} = \{i \mid 0 \leq i \leq 4 \wedge i \in \mathbb{Z}\}$$

$$\mathbf{D}_{11B}^{def} = \{b \mid \exists i \in \mathbf{D}_1^{iter} \text{ s.t. } b = i\}$$

$$\mathbf{D}_2^{iter} = \{j \mid 0 \leq j \leq 9 \wedge j \in \mathbb{Z}\}$$

$$\mathbf{D}_{21C}^{def} = \{c \mid \exists j \in \mathbf{D}_2^{iter} \text{ s.t. } c = j\}$$

$$\mathbf{D}_{21B}^{oper} = \{b \mid \exists j \in \mathbf{D}_2^{iter}, n \in \mathbb{Z} \text{ s.t. } 2*b + n = j \wedge 0 \leq n \leq 1\}$$

$$\mathbf{D}_3^{iter} = \{k \mid 0 \leq k \leq 9 \wedge k \in \mathbb{Z}\}$$

$$\mathbf{D}_{31C}^{oper} = \{c \mid \exists k \in \mathbf{D}_3^{iter} \text{ s.t. } c = 9 - k\}$$

Note that we got rid of the integer division operation div in the description of $\mathbf{D}_{21B}^{oper}$ using a similar technique as for removing modulo operations. Again we assume a sequential execution order and a simple linear storage order:

$$O_1^{time}(i) = i \qquad O_{11B}^{wtime}(x) = x$$

$$O_2^{time}(j) = 2j + 5 \qquad O_{21C}^{wtime}(x) = x + 1 \qquad O_{21B}^{rtime}(x) = x$$

$$O_3^{time}(k) = k + 15 \qquad \qquad O_{21C}^{rtime}(x) = x$$

$$O_B^{addr}(b) = b \text{ and } O_C^{addr}(c) = c$$

The resulting BOAT-domain descriptions are the following (after simplification):

$$\mathbf{D}_{1211B}^{BOAT} = \{[a, t] \mid \exists n \in \mathbb{Z} \text{ s.t. } 0 \leq a \leq 4 \wedge 0 \leq n \leq 1 \wedge$$
$$t \geq a \wedge t \leq 4a + 2n + 5 \wedge a \in \mathbb{Z}\}$$

$$\mathbf{D}_{2311C}^{BOAT} = \{[a, t] \mid 0 \leq a \leq 9 \wedge t \geq 2a + 6 \wedge t \leq 24 - a \wedge a \in \mathbb{Z}\}$$

Since we have only one dependency per array, the OAT-domain descriptions coincide with the BOAT-domain descriptions. We can now calculate the minimum and maximum distances between both domains:

$$d_{BC} = \max\{d \mid \exists a, t \text{ s.t. } [a+d, t] \in \mathbf{D}_{1211B}^{BOAT} \wedge [a, t] \in \mathbf{D}_{2311C}^{BOAT}\} + 1$$

$$= \max\{d \mid \exists a \in \mathbb{Z}, t, n \in \mathbb{Z} \text{ s.t. } 0 \leq a + d \leq 4 \wedge 0 \leq n \leq 1 \wedge$$
$$t \geq a + d \wedge t \leq 4a + 4d + 2n + 5 \wedge 0 \leq a \leq 9 \wedge$$
$$t \geq 2a + 6 \wedge t \leq 24 - a\} + 1$$

$$d_{CB} = \min\{d \mid \exists a, t \text{ s.t. } [a+d, t] \in \mathbf{D}_{1211B}^{BOAT} \wedge [a, t] \in \mathbf{D}_{2311C}^{BOAT}\} - 1$$

$$= \min\{d \mid \exists a \in \mathbb{Z}, t, n \in \mathbb{Z} \text{ s.t. } 0 \leq a + d \leq 4 \wedge 0 \leq n \leq 1 \wedge$$

-continued $$t \geq a + d \wedge t \leq 4a + 4d + 2n + 5 \wedge 0 \leq a \leq 9 \wedge$$
$$t \geq 2a + 6 \wedge t \leq 24 - a\} - 1$$

Solutions to these ILP problems are: 5 and −5. We show this graphically in FIG. 29a and FIG. 29b respectively.

Unfortunately, these distance calculations turn out to be quite costly in practice for several reasons:
1. If we want to know the distances between all pairs of arrays (which are not compatible), the number of distances to be calculated is proportional to the square of the number of arrays.
2. In the simplest case, where all BOAT-domains are LBL's, each distance calculation for a pair of arrays requires a number of ILP problems to be solved that is proportional to the product of the number of dependencies of both arrays.
3. The ILP problems of this kind turn out to be the most difficult ones to solve for an ILP solver (in contrast to all the other kinds of ILP problems that we encounter with our techniques). Moreover, the simplification heuristics presented later, that help us to reduce the complexity of the other kinds of ILP problems, turn out to be less effective in this case.
4. Taking these distances into account during the actual array placement step turns out to have a disastrous effect on the performance in case many arrays have to be placed.

Figures 30, 32A, 32B:
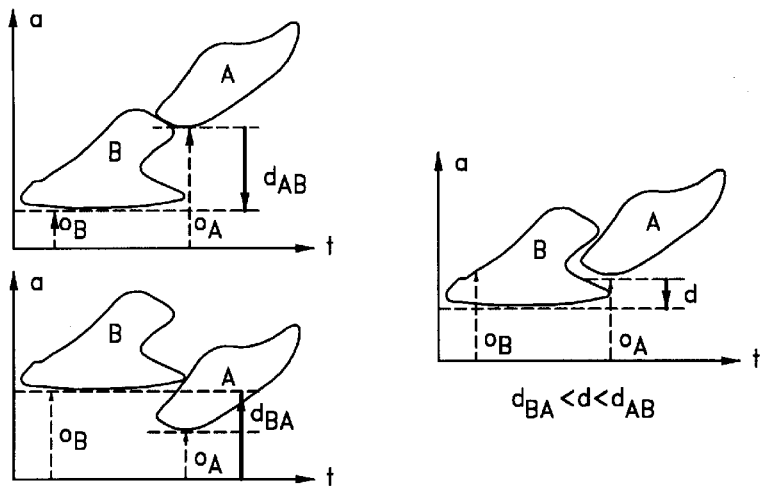
FIG. 30 shows a valid intermediate solution not satisfying a distance calculation according to the present invention.
FIGS. 32a and b show examples of allowed and non-allowed array splits according to the present invention.

Just as for the mergability check, the distance calculation described by equations 6.6 and 6.7 only makes sense in case the OAT-domains are not folded. In case one or both of the domains are folded, we can extend the test in a similar way as for the extended mergability test. Note that a violation of the distance criterion not necessarily means that there is a memory occupation conflict. In other words, the distance criterion is a sufficient but not a necessary condition. An example of this is depicted in FIG. 30. In practice this case is probably unlikely to occur, and if it would occur, it would be very difficult to detect/exploit. Therefore we do not consider this case any further.

Finally, it is important to note that, at least in theory, if we decide to calculate the minimal and maximal distances, the mergability criterion does not become superfluous. It could be that a relative offset of zero (which corresponds to the mergability criterion), violates the distance criterion, but still represents a valid solution.

Above we derived several conditions that allow us to check whether a certain relative placement of arrays is valid or not. In the following we present an embodiment of the placement algorithm in accordance with the present invention and some possible extensions. For complexity reasons, the placement algorithm in accordance with the present invention need not take into account minimal and maximal distances.

Our placement algorithm according to the present invention, which tries to find an optimal offset for each array in a memory, proceeds with the following steps:
1. We start by setting up two sets of arrays: those that have been placed (i.e. those whose offset has been fixed) and those that still have to be placed. Origirnally, all arrays belong to the second set, and we assume that all their offsets are zero.
2. We select from the arrays-to-place set, the array that currently has the lowest offset. If two arrays have the same offset, we select the one with the largest window size. By doing so we decrease the probability that the array "sticks out" later on and increases the peak storage size require- ments. If the arrays also have an equal window size, we select the one which has the smallest number of compatible and mergable arrays, as it has to largest number of constraints and is therefore likely to be difficult to place later on. Finally, if this selection procedure does not yield a new candidate, we pick a random one from the set.
3. We then compare the selected array with those that have already been placed, and check for conflicts. Two arrays have no conflicting positions if: they are compatible, or they have non-overlapping address ranges, or they are mergable and aligned at the same offset. If there is no conflict with any of the arrays placed, we place the selected array at its current position, and transfer it to the placed-array set. If there is a conflict, we move the array upwards until its base crosses the top of an already placed array, and leave it in the arrays-to-place set. In both cases, we return to step 2, unless there are no more arrays to place.

Figure 31:
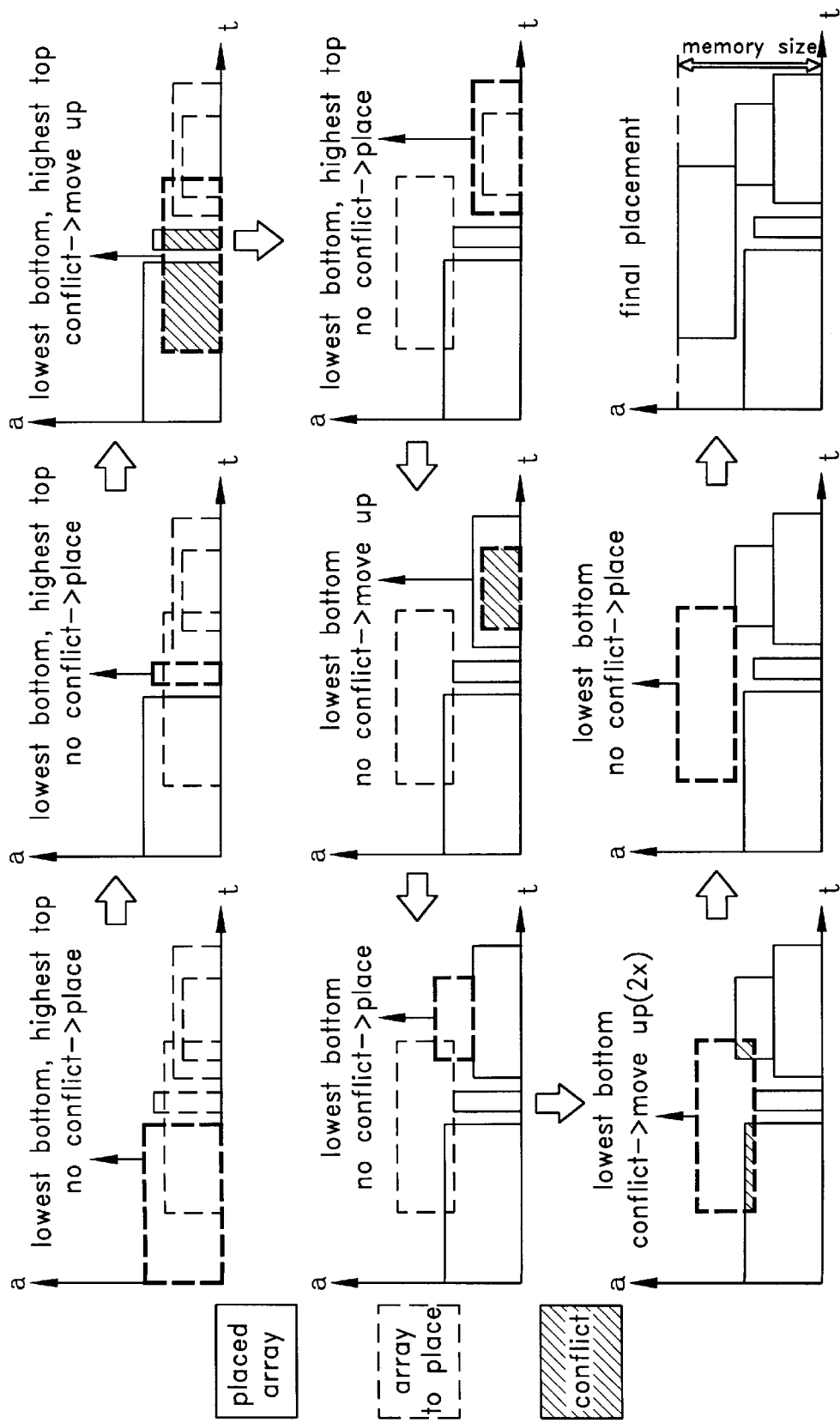
FIG. 31 shows an embodiment of the placement strategy according to the present invention.
Figure 33A:
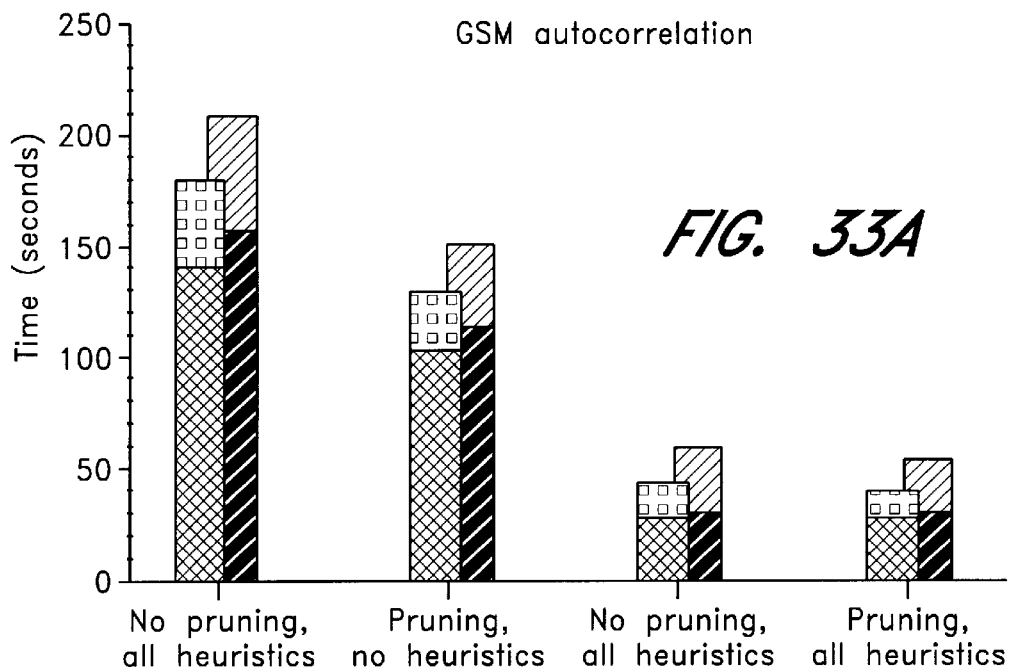
FIG. 33 shows optimization run-times for an overall optimization strategy according to the present invention.
Figure 33B:
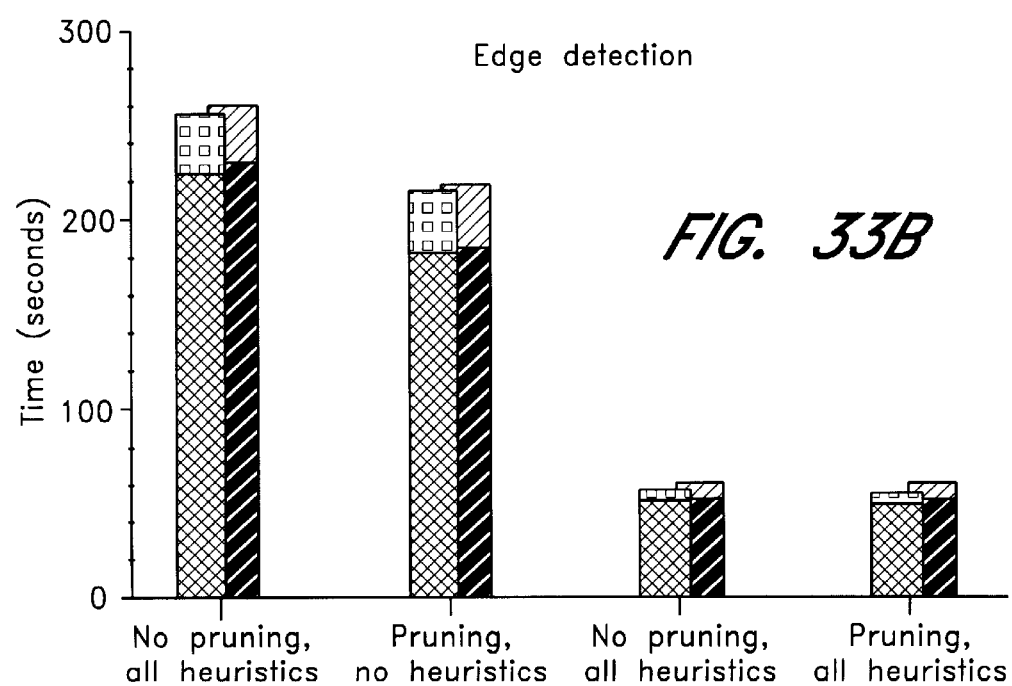
Figure 33E:
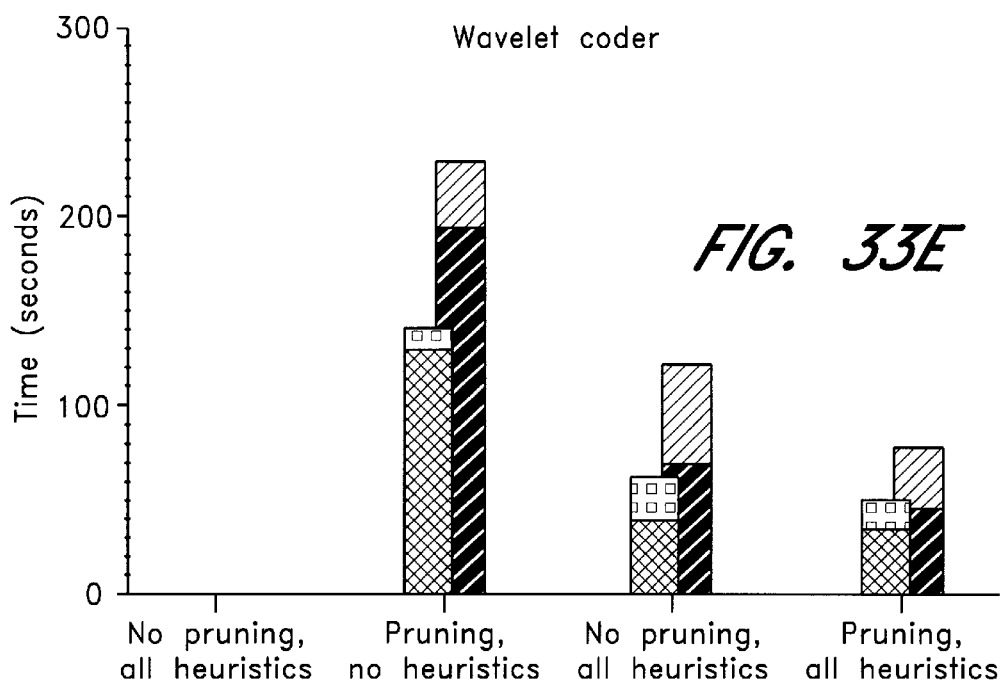
Figure 33F:
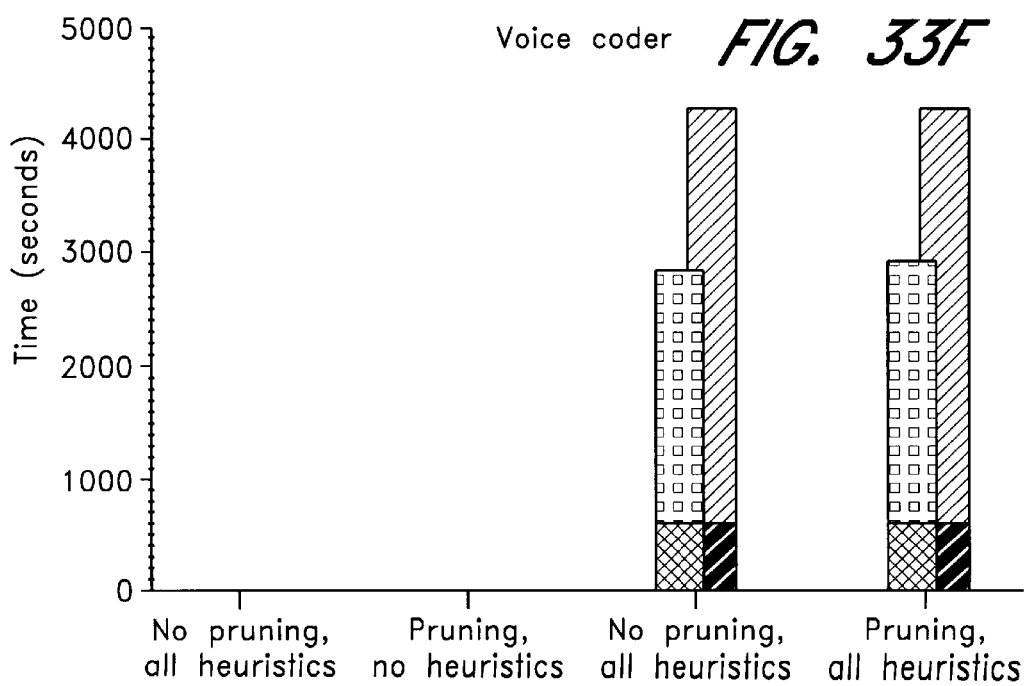

In FIG. 31 the different moves of the placement algorithm are shown for a small example. Note that the steps are presented in zigzag order. The algorithm is greedy in the sense that when placing an array it selects the one that firstly can be placed as low as possible, and secondly has the largest window (step 2).

Implementing this algorithm in a naive way would result in a relatively high run-time complexity due to a large number of array comparisons, but by sorting the array sets in an intelligent way for instance, we have been able to keep the placement run-times negligibly small, compared to the intra-array optimization phase.

We can further enhance our overall storage size reduction strategy, by allowing an additional degree of freedom. Namely, in many practical cases it is possible to identify subsets of an array that are completely "independent" of each other. For instance, it is possible that the odd and even elements of an array are treated separately. If we then would separate these subsets as the first step in our global optimization strategy, i.e. before the intra-array phase, we could optimize and also place them separately, which could possibly lead to a better overall solution. The identification of good subsets is not trivial, especially because we want to keep the effect on the address generation overhead minimal. In a worst case scenario, an array would be split into nothing but scalars, each being addressed separately. This is obviously unacceptable for data-dominated multimedia applications. Therefore we impose the following constraint on the identification of subsets: if an array is split, it should not introduce extra conditions in the program to select the correct subset being accessed by a statement, i.e. the split should coincide with the "statement boundaries". For instance, we do not allow a split as indicated in FIG. 32a. In contrast, splits as indicated in FIG. 32b are allowed, as they do not affect the addressing and control overhead.

We can easily identify the candidate subsets from the results obtained by our original data-flow analysis. It is also possible to allow user interaction with respect to these decisions (e.g. a designer may indicate where an array should be split, even if it would introduce extra conditions).

After the identification of the potential sub-arrays, we perform a contraction step, which detects periodical "holes" in the different dimensions of the sub-arrays (e.g. due to an odd/even split) by means of a simple GCD-based algorithm and which contracts these dimensions to make them dense again if possible. However, it is not guaranteed that a split of an array leads to better results. In some cases it might even lead to much worse results (e.g. when the resulting subsets are no longer dense and cannot be contracted).

Therefore we perform the intra-array storage order optimization step for each of the sub-arrays, but also for the original non-split array, followed by the compatibility and mergability calculations described above. Then, before we start the actual placement, we decide for each array that can be split whether it should be split or not. We make this decision as follows:

If the average window height over time of the sub-arrays is smaller than the average window height of the original array and the difference is relevant (a difference of more than 10% seems to be a good practical criterion), we decide to split the array, as it is likely to lead to a better overall result.

If, on the other hand, it is larger and the difference is relevant, we decide to keep the array together, as a split is likely to give worse results.

If it is about the same size, we perform the following steps:
  If the different sub-arrays of the array are all mergable, with keep them together. Splitting them would increase the number of "lost" address/time tuples (see FIG. 26).
  Otherwise, if the split allows additional merging with other arrays or their sub-arrays, we split the array, as it increases the memory reuse opportunities.
  Otherwise, if at least some of the sub-arrays are compatible with each other, we decide to split them, as this introduces additional freedom without, any clear disadvantages.
  Finally, if none of the tests can give a definite answer, we decide to keep the original array together, as the split offers no clear advantages and would only increase the placement complexity. After this decision, we proceed with the placement step as described above.

In practice, the number of opportunities for splitting arrays is relatively small (i.e. usually only a few arrays are candidates for splitting), and if an array is a candidate, the number of possible sub-arrays is also usually small (e.g. 2 to 4). Therefore the effect of the possible additional splitting on the overall run-time is relatively small in practice, whereas it may provide some relevant additional optimization opportunities.

In Table 3 we present some of the results that were obtained by a prototype tool in accordance with the present invention for the (multimedia) applications and application kernels that we also used before. We also made the same assumptions (all arrays in one memory and a sequential execution order) and the experiments were run under similar conditions. The table contains the results for the dynamic windowed strategies (i.e. with the additional placement step described above), with and without the array splitting option enabled respectively.

TABLE 3

| Application | Dynamic Windowed (words) | Dynamic Windowed + Array splitting (words) |
| --- | --- | --- |
| Updating SVD | 312 | 312 |
| 2D Wavelet | 2846 | 2846 |
|  | (832) | (832) |
| Edge detection | 189 | 189 |
| 3D volume rendering | 25603 | 25603 |
| Voice coder | 1120 | 1120 |
| GSM autocorrelation | 248 | 223 |

When we compare the results in this table with the multiple- and single-assignment figures in Table 1, we can see that for most examples the potential reduction in storage size requirements is considerable. Moreover, a comparison with the results in Table 2 reveals that the dynamic aspect of our approach (i.e. the sharing of memory locations between different arrays) can result in a large gain compared to a static approach with no memory reuse between arrays. In most cases, we even come close to the scalar minimum (see Table 1), without the run-time and implementation overhead associated with a scalar expansion. This clearly demonstrates that the approach in accordance with the present invention is very valuable as it tractable and leads to near optimal results (in an acceptable time,).

Also, table 3 indicates that the additional gain obtained by allowing array splits may be worthwhile (e.g. a 10% reduction for the GSM application).

As already mentioned for the 2D wavelet kernel our simple projection test could not detect a relevant projection opportunity for 2 of the arrays. The results between brackets indicate the results that would be obtained if we used an extended projection test.

In FIG. 33 we present the optimization run-times that were required by our prototype tool. We have again investigated four possible configurations (pruning and speed-up heuristics enabled or disabled). The figure contains the results with and without the optional splitting step enabled. The bars in the figure contain 2 components: the lower parts correspond to the time needed for the window calculation and the upper parts correspond to the time needed for the compatibility and mergability calculations and the actual placement. Missing bars correspond to experiments that failed (except for the wavelet coder: there the missing bars are relatively large (up to >4000) and they are left out because they would distort the rest of the graph too much). For the window optimization the B&B search strategy was used. The run-times are certainly acceptable in an embedded system design exploration context, especially when both pruning and speed-up heuristics have been applied. The figures indicate that the speed-up heuristics are more effective than the pruning, but also that both of them are necessary to reduce the possibility of failure to an acceptable level. For most of our test vehicles, the window calculation consumed the largest amount of time. Only for the voice coder application was the second (inter-array) phase dominant. This can be explained by the fact that this application has a relatively large number of arrays (>200). The complexity of the window calculation phase increases linearly with the number of arrays, but the complexity of the compatibility and mergability calculations in the second phase increases quadratically with the number of arrays. Hence, when the number of arrays increases, which can be expected in complex multimedia applications like MPEG-type video compression, the second phase is likely to become dominant.

The figures also illustrate that the effect of the optional additional step on the overall run-time is limited (a maximal increase of 50% when pruning and heuristics have been applied). Considering the fact that the splitting can result in a relevant storage size reduction, this optional splitting step is certainly worthwhile.

Figure 34:
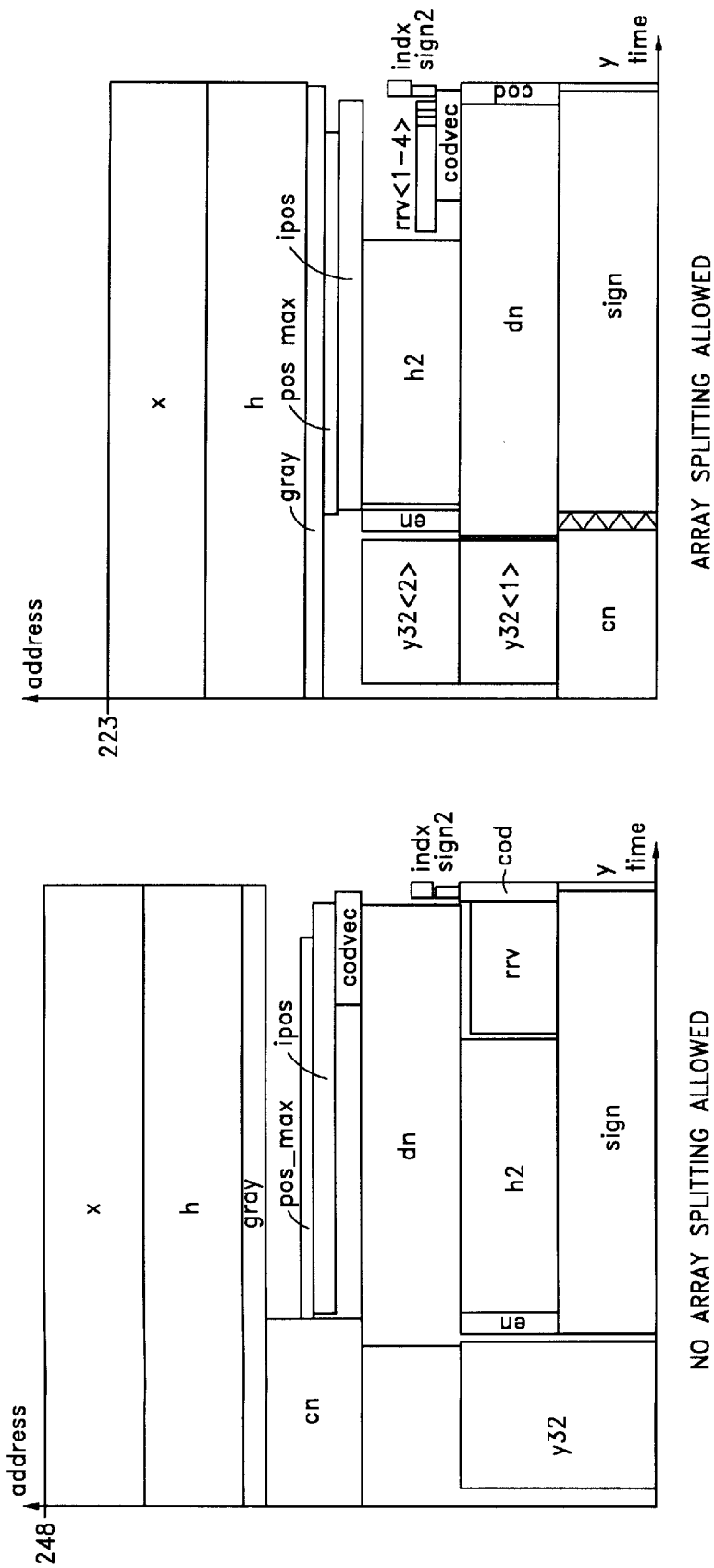
FIG. 34 shows optimized memory layouts according to the present invention.

In FIG. 34 we also present the memory layout obtained for the GSM autocorrelation application (extracted from a public domain GSM specification). Note that the (virtual) overlap between merged arrays is indicated by zigzag lines. All of the arrays in this example have 16-bit word size, except for array y32, which has 32-bit word size. We assumed a 16-bit memory, and so we modeled the 32-bit array as a 16-bit array with an extra dimension (for storing the lower and higher 16-bit words). Note that in case we allow array splitting, our prototype tools detects that this extra dimension can be split and decides to do this, because it enables merging with array dn. The tool also detects that array rrv actually consist of 4 independent sub-arrays, which are interleaved in one dimension with a period of 5. The array is split and each of the sub-arrays is then contracted It also detects that the resulting sub-arrays are alternately alive, i.e. that they are compatible, and that they can have overlapping address ranges. For arrays ipos, indx, and dn our tool also identified sub-arrays (not shown on the figure), but decided not to split them because there was no clear indication that this could result in a better overall solution. Also note that in the second case arrays cn and sign are merged, whereas this did not happen in the first case (although it is also possible).

The run-times of a software tool implementing the optimization strategy in accordance with the present invention are heavily dependent on the software implementation itself, but pure software optimization techniques can not solve some of the intrinsic difficulties. Intrinsic difficulties in our strategy are the potentially large number of ILP problems to be solved, and the fact that most of these ILP problems have a property that can make it hard for a solver to find the solution, even though the problems themselves are relatively small (e.g. at most a few dozen of variables and constraints). In order to keep the run-times reasonable and to avoid getting stuck because of ILP solvers breaking down, the present invention includes several heuristics. Note that these heuristics are exact, i.e. the solution itself is not influenced. Only the time needed to come to a solution and the probability of getting stuck are likely to be drastically reduced. Most of the techniques and strategies presented above require many relatively small optimization or feasibility problems to be solved. Since, in practice, multimedia applications contain mostly linear array accesses the vast majority of these problems can be formulated as integer linear programming (ILP) problems. Even the non-linear problems can usually be converted to ILP problems, e.g. by making some worst-case assumptions. The number of ILP problems to be solved for a realistic multimedia application can be huge though. For instance, a full search for the optimal intra-array storage order of an array with D dimensions and F flow dependencies requires in the order of $2^D D! F^2$ ILP problems to be solved. Therefore we have already presented some more intelligent search strategies that make use of special properties of the storage order functions. Moreover, in many cases we are able to prune the search space by making use of projections, such that the effective number of dimensions can be reduced. These techniques allow us to reduce the number of ILP problems quite heavily in practice (they reduce the $2^D D!$ factor), but they can only be used for the intra-array storage order optimization. Unfortunately, many of our other techniques also require many ILP problems to be solved, such that the overall number of ILP problems remains quite high for real life applications, for instance because the complexity of most of these techniques is quadratic in the number of flow dependencies. Moreover, although the ILP problems themselves are relatively small (i.e. at most a few dozen variables and constraints), most of them have a property that can easily lead to numerical instabilities in a generic ILP solver. A straightforward software implementation of the techniques is therefore likely to be relatively slow, especially for large applications, and may even break down because the ILP solver breaks down.

Therefore we have to intervene in the solving of the ILP problems to make the techniques practically feasible. In practice there are three things that we can do:

1. We can try to simplify the ILP problems before we send them to a solver, and in that way reduce the chance of numerical instabilities or long solving times. We can do this by making use of (extensions of) common dependency analysis techniques. In this way we can reduce the number of variables and/or constraints in many cases. Sometimes this even allows us to avoid sending the problem to a solver at all, for instance when we can detect that the problem is infeasible.
2. We can try to avoid the solving of ILP problems. For instance, if we can make a quick estimate of an upper or lower bound on the solution, we may be able to decide that the exact solution cannot be interesting for our purpose.
3. If all else fails and the ILP solver breaks down, we can try to obtain the solution in another way, for instance by decomposing the problem in simpler sub-problems. This technique is not a speed-up heuristic in the strict sense, but it heavily reduces the chance that our techniques get stuck and cannot come up with a solution. In general it is far from obvious to decompose an ILP problem, but for some of the problems that we encounter we have been able to make use of special properties to achieve this goal.

Although we classify these techniques as heuristics, they always lead to exact solutions. The heuristic aspect is the fact that it is not guaranteed that these techniques result in a speed-up. For instance, in some cases the additional analysis ever results in a slow-down if the simplification or avoidance fails. However, on the average these heuristics result in a worthwhile speed-up.

Figure 35:
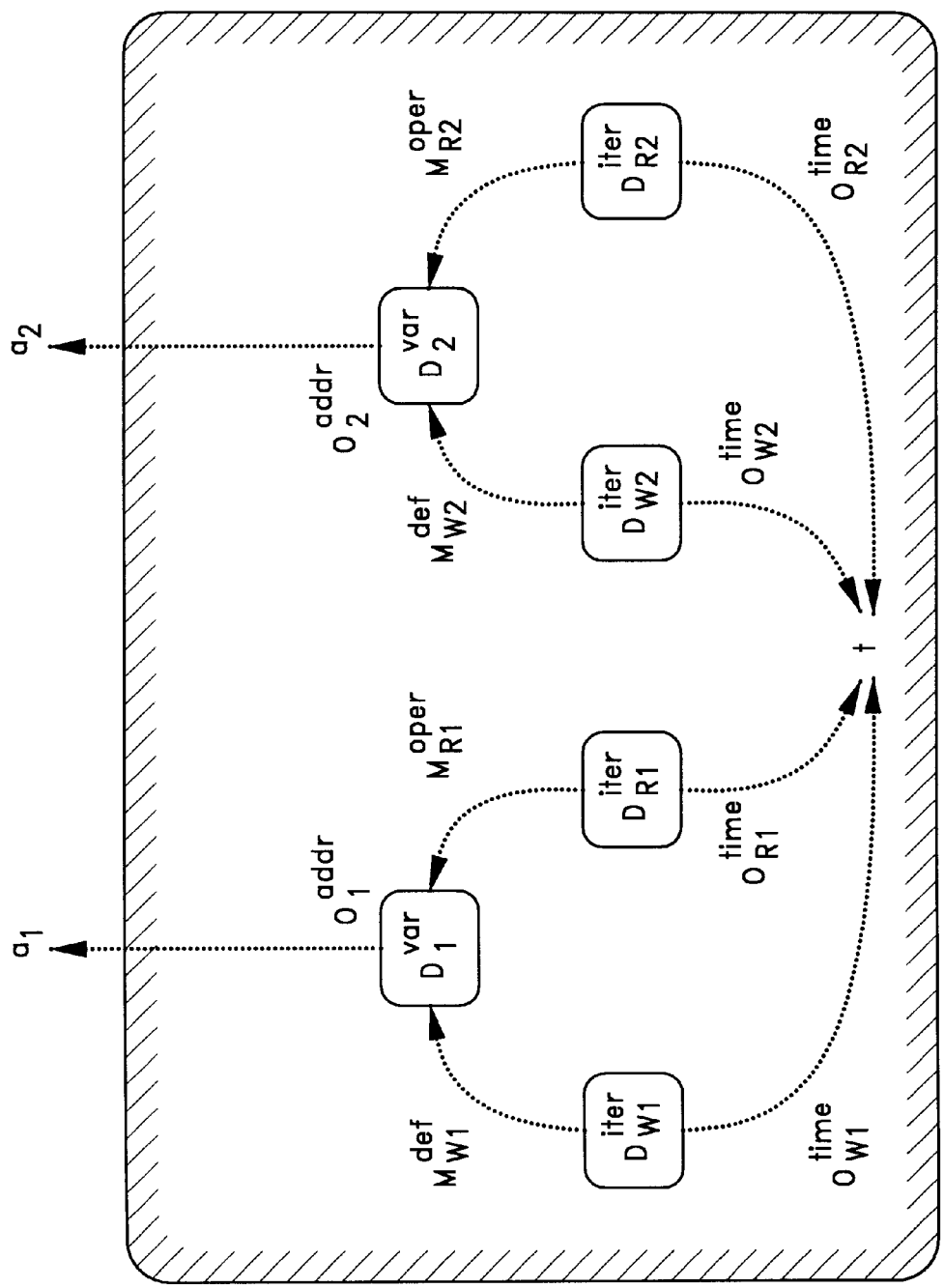
FIG. 35 shows a common structure of ILP problems according to the present invention.

The strongly coupled concepts of a flow dependency and a BOAT-domain, play an important role in the construction of our ILP problems. Most of the problems that we encounter are directly related to the presence of two dependencies, and therefore have a largely common structure. In FIG. 35 we have depicted the part of the structure that is common to the most important types of ILP problems that we encounter. On the left we see the description of the iteration domains of the writing and reading statements of the first dependency. These iteration domains are linked to the variable domain of the first array via the definition mapping and operand mapping respectively. This variable domain is then linked to the first address dimension (a1) through the storage order function of the first array. At the bottom we have the links between the iteration domains and the time dimension via the execution order functions. This left part is actually nothing else but the description of the BOAT-domain of the first dependency (see equation 3.11). At the right side a similar structure is repeated for the second dependency (of a potentially different array). The only thing that links the two dependencies to each other is the common time dimension. These links, which take the form of inequalities, guarantee that if the ILP problem is feasible, then the solution occurs for a value of t at which both dependencies are alive. If no such value exists, the problem must be infeasible.

Figure 36:
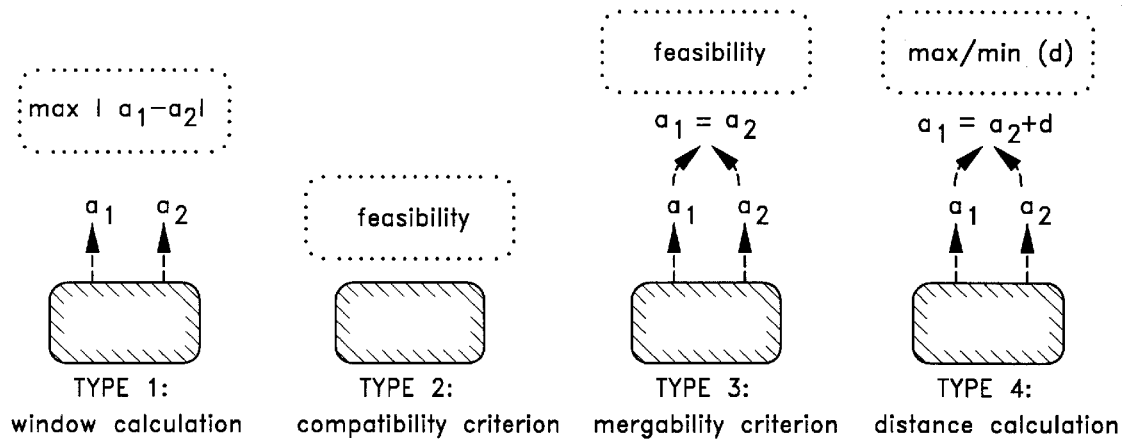
FIG. 36 shows additional ILP problem structures.

In FIG. 36 we can see the remaining parts of the ILP problem structures, which are different for the four types that we encounter. The empty boxes correspond to the common structure that is shown in FIG. 35. For the first type of ILP problem, which we encounter during the window evaluation steps, we are interested in the maximal absolute distance between the two address dimensions. For the second type, encountered during the evaluation of the compatibility criterion, we are only interested in the feasibility of the problem in the box, i.e. we want to know whether there exists a common value for t. The address dimensions are not important in that case, so we can remove them (together with the storage order functions). The third type, encountered during the evaluation of the mergability criterion, is also a feasibility problem, but in that case the values of the two address dimensions must be equal. Finally we have the problem that we encounter during the distance calculation. In that case we want to find the minimal and maximal value of a distance d such that the constraint $a_1=a_2+d$ is still satisfied. Note that the problem of type 1 is the only one in which both dependencies belong to the same array.

When looking at the description of a BOAT-domain in equation 3.11, we note the presence of execution and storage order functions $O^{time}(\ )$ and $O^{addr}(\ )$ in several (in)equalities. A potential difficulty may be that the execution and storage order functions may contain coefficients whose absolute values range over several orders of magnitude within the same function. Incorporating this kind of functions in the constraints of an ILP problem can easily lead to numerical instabilities or long solving times. The size of the largest coefficient in the execution order functions is directly related to the total execution time of the algorithm, which can easily exceed several millions of clock cycles for realistic multimedia applications (e.g. a video application with a frame rate of 25 Hz and a clock frequency of 100 MHz requires 4 million cycles/frame). The size of the largest coefficient in the storage order functions on the other hand, is directly related to the size of the arrays, and since we assume single-assignment code, the size of the arrays can be very large too.

However, the difficulty with the storage order functions is less critical in practice. Firstly, the storage order functions do not occur in all of the ILP problems that we encounter. For instance, the problems of type 2 do not take into account the storage order. Secondly, the intra-array storage order pruning techniques allow us to reduce the effective number of dimensions of the arrays through projections in many cases. Consequently the dimensions with the largest coefficients in the storage order functions usually disappear. Nevertheless, the storage order functions may still occasionally cause trouble, especially when they are directly linked to the cost functions of the ILP problems (which is the case for problems of types 1 and 4). The execution order functions on the other hand appear in nearly all ILP problems that we have to solve, and are not affected by the possible projection of array dimensions. Therefore our ILP simplification techniques mainly focus on the reduction of the complexity caused by the execution order functions. There are a few important differences between the ILP problems encountered in known contexts and the ILP problems that we encounter:

Our ILP problems usually contain only a few dozen variables and constraints. In contrast, the ones originating from synthesis problems usually contain many variables and many constraints (typically hundreds). The heuristics and techniques used in the synthesis context are therefore targeted towards large ILP problems, and are likely to be less effective or even useless in our context.

In the synthesis context one usually has to solve only one or a few (large) problems. In contrast, we encounter many (small) problems, typically thousands or tens of thousands. Therefore we must focus on different aspects.

Synthesis-related ILP problems are usually a direct translation of the optimization problem that has to be solved. In our context on the other hand, we only use ILP formulations for evaluation purposes. The optimization problem itself is not translated in an ILP problem. Instead we use a (pragmatic) solution strategy in which we encounter several sub-problems that are formulated as ILP-problems.

In the synthesis context, one usually tries to find a global solution in one shot, i.e. one tries to optimize several design parameters at once. Many times one can "naturally" partition the full problem in several (nearly) independent sub-problems. Our ILP problems have a completely different nature though, and these partitioning techniques are therefore not applicable.

For synthesis purposes, one may be satisfied with a near-optimal solution, especially if the exact solution is too hard to find. In contrast, for our ILP problems we require the exact solution or at least an upper bound. Otherwise, we cannot guarantee a correct solution to the overall problem.

These differences make it unlikely that any techniques used in the synthesis context can be reused. In contrast, in the parallel compiler and regular array synthesis worlds geometrical models are being used. However, there are again some important differences with the ILP problems encountered in our context:

In the parallel compiler and regular arrays synthesis contexts usually only one dependency is involved. In contrast, most of our ILP problems involve pairs of dependencies which are coupled via the time dimension, resulting, in an inherently higher complexity.

Execution order and certainly storage order functions are usually not even present during parallelization.

In many cases, parallelization requires only a yes-or-no answer and the exact description of a dependency is not always required to obtain such an answer. This allows the use of several simpler dependency abstractions, which result in easier to solve ILP(-like) problems. In contrast, we often need quantitative answers (for problems of type 1 and type 4). So we cannot use these abstractions, and even if we could, our results could be highly suboptimal.

The four types of ILP problems that we encounter have a structure that is largely common. Not surprisingly, most of the following simplification techniques are applicable to all four types. An important concept in dependency analysis is that of loops carrying a dependency. A strongly related concept is that of a dependence distance vector. The following example illustrates this.

```
int A[5][5][5][5];
for (i = 0; i < 5; ++i)
    for (j = 0; j < 5; ++j)
        for (k = 0; k < 5; ++k)
            for (l = 0; l < 5; ++l)
S1:             A[i][j][k][l] = ...;
            for (m = 0; m < 5; ++m)
            {
S2:             ... = g(A[i][j][k][m]);
                if (j >= 1)
S3:                 ... = f(A[i][j-1][k][m]);
            }
```

Analysis of this code reveals that there are two dependencies present: one from S1 to S2 and one from S1 to S3, described by the following dependency relations:

$$M^{flow}_{1211\,A} = \{[i,j,k,l] \to [i',j',k',m] \mid 0 \le i = i' \le 4 \wedge 0 \le j = j' \le 4 \wedge$$

$$0 \le k = k' \le 4 \wedge 0 \le l = m \le 4 \wedge [i,i',j,j',k,k',l,m] \in \mathbb{Z}^8\}$$

-continued $$M_{1311 A}^{flow} = \{[i, j, k, l] \rightarrow [i', j', k', m] \mid 0 \leq i = i' \leq 4 \wedge 0 \leq j = j' - 1 \leq 3 \wedge$$
$$0 \leq k = k' \leq 4 \wedge 0 \leq l = m \leq 4 \wedge [i, i', j, j', k, k', l, m] \in \mathbb{Z}^8\}$$

From each of these dependency relations we can extract a distance vector. The components of this vector correspond to the distances between the iterator values of the loops surrounding both the source and the sink of the dependency. We can readily extract these distances from the dependency relations by evaluating (i–i',j–j', k–k'). In this case we end up with the (constant) vectors (0,0,0) and (0,1,0) respectively. The fact that the components of the first vector are all zero indicates that the elements of A that are being consumed by statement S2 during a certain execution of the (i,j,k)-loop nest have been produced by S1 during the same execution. The second vector on the other hand has a non-zero second component. This indicates that the elements of A that are being consumed by statement S3 have been produced by S1 during a different execution of the (i,j,k)-loop nest. Because the j-component is the first non-zero component, the dependency between S1 and S3 is said to be carried by the j-loop. Also, because this component is constant, the dependency is said to be carried over a constant distance (of 1 in this case). In contrast, the dependency between S1 and S2 is not carried by any loop.

Note that a dependency can be carried by at most one loop: the one corresponding to the first non-zero component of the distance vector. The loops corresponding to the remaining components of the vector can be divided into two groups: the loops surrounding the carrying loop and the loops surrounded by the carrying loop. The loops surrounding a carrying loop always have a zero component in the distance vector, meaning that elements being consumed during a certain execution of that loop are also produced during the same execution (in the context of the dependency). We therefore refer to these as invariant loops.

Figure 37:
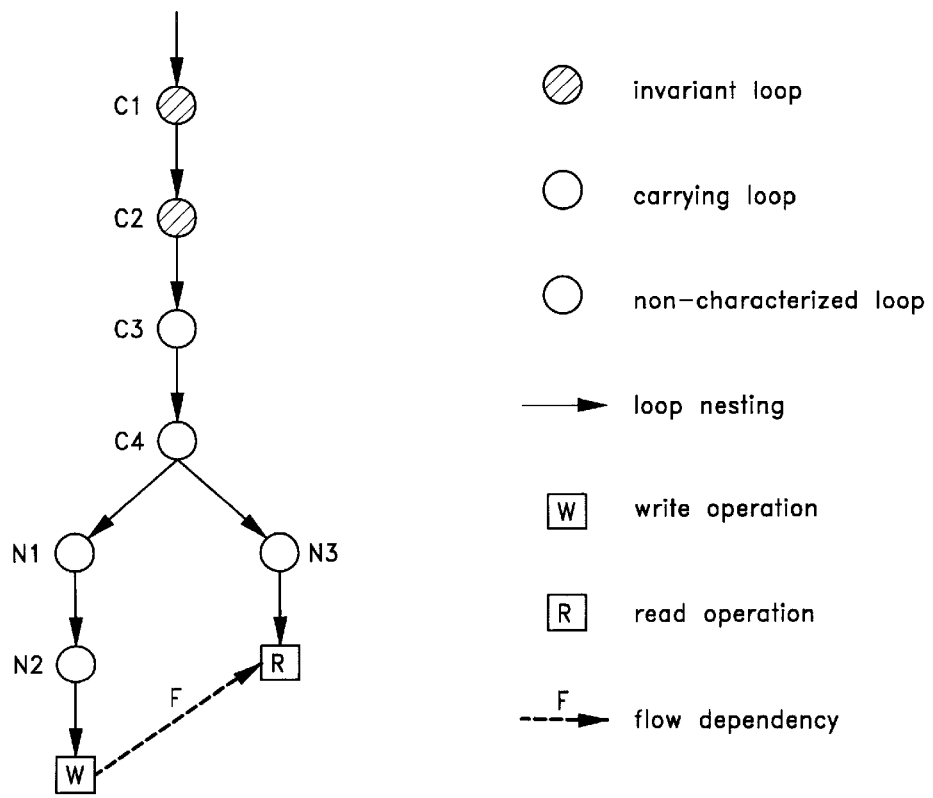
FIG. 37 shows the concept of invariant and carrying loops according to the present invention.

For the loops surrounded by a carrying loop on the other hand, the components of the distance vector may or may not be zero. But whatever the value of these components is, a characterization of these loops is meaningless because they are already surrounded by a carrying loop and so there is no relation between the elements being consumed and produced during the executions of these loops for a certain execution of the carrying loop. A typical situation is depicted in FIG. 37. In this figure the circles represent the different loops and the arrows represent the loop nesting. The loop nests around the source and the sink of the dependency share four common loops: C1, C2, C3, and C4. The third one has been identified as carrying the dependency. Therefore, the outer two are invariant. The fourth one cannot be characterized because the third one is already carrying the dependency. Also the loops N1, N2, and N3, which are not common, cannot be characterized in this way.

The concepts of distance vectors and carrying loops are very important for the parallelization of code. Loops that do not carry any dependencies can be executed in parallel, as there is no dependency between the different executions. These concepts can be exploited in other ways too. Above we have shown how the presence of invariant loops allows us to detect projection opportunities during our search for optimal intra-array storage orders. We can exploit the presence of invariant loops and carrying loops to reduce the complexity of the ILP problems that we have to solve. The common structure of the ILP problems that we encounter during our optimization is always related to the presence of a pair of dependencies. We can exploit knowledge about these dependencies in two ways: we can apply techniques to each dependency separately, and to the pairs. If the source and sink loop nests of a dependency share common loops, the iterator of each of these loops is instantiated at least two times in the ILP problems related to the dependency: once for the source, i.e. the writing statement, and once for the sink, i.e. the reading statement. We refer to these instantiations as the write iterator and the read iterator respectively.

If we know the distance vector of the dependency, we can use it to simplify the ILP problems as it precisely describes the relations between the write and read iterators of the common loops. If these relations are simple, we can easily eliminate some of these iterator instances. More in particular, if some of the components of the distance vector are constant, we can directly substitute the corresponding read (or write) iterator by the corresponding write (or read) iterator and a constant offset in each of the (in)equabilities of the ILP problem, without affecting the solution. In this (easy) way we can reduce the number of variables in the ILP problem by one for each loop of this kind.

For non-constant components of the distance vector we may use similar techniques, but in general the elimination can become much more complex. However, in practice non-constant components appear only occasionally, and therefore they are probably not worth spending the extra effort.

We can use similar techniques to try to reduce the complexity of ILP problems originating from dependency pairs, albeit in a less straightforward way. First let us assume that both dependencies share a common invariant loop. Then there are four instances of its iterator present in the ILP problem, namely a write and a read iterator for each dependency. Because the distance vector components corresponding to the invariant loop are zero for both dependencies, there exist simple relations between the write and read iterators of each dependency separately (see above). In contrast, the distance vectors tells us nothing about the relation between the write and read iterator of different dependencies.

Figure 38:
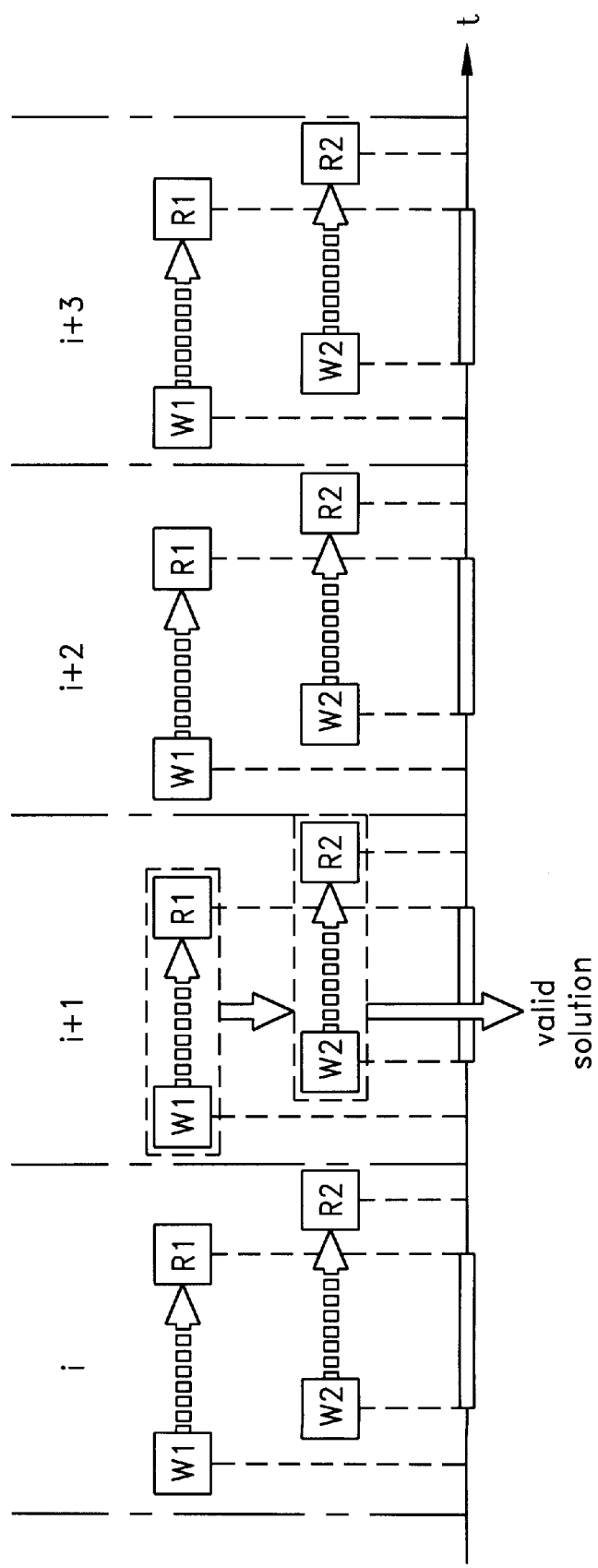
FIG. 38 shows a common variant loop for two dependencies according to the present invention.

However, the relations with the time dimension t mentioned above, guarantee that if the problem is feasible both dependencies are alive at the same time. But since the loop is invariant for both of them, neither of them is alive in between its executions. So they can only be simultaneously alive during an execution of the loop, i.e. for the same iterator value. This is depicted in the graphical abstraction of FIG. 38, where we have "unrolled" the invariant loop and the two dependencies. So if two dependencies share a common invariant loop, the corresponding iterator instances are all locked to each other, which allows us to eliminate three out of four of them. An important consequence of this elimination is that the four inequalities containing execution order functions (two for each dependency) necessarily contain an identical term consisting of a product of the common iterator with a coefficient. Since these are the only (in) equalities of the ILP problem that contain the time variable, we can virtually shift the time axis by removing this common term from them. Now, since only outer loops can be common and invariant, the coefficients of their iterators in the common terms are also the largest ones. The fact that we can remove these terms from the time-related inequalities is therefore very important, as we have identified these large coefficients (in combination with smaller ones) as a potential cause for numerical instabilities.

In many cases we can even further simplify the ILP problem. When the common loop is invariant for both dependencies, one might be tempted to believe that the optimal solution is independent of the value of the common iterator. In many cases this is indeed true, and consequently we can often substitute the iterator by an arbitrary allowed value (i.e. one for which both write and read operations are executed), i.e. fix it at a certain value. This would mean that all four instances of the iterator are eliminated. However, this simplification is not always valid. The fact that the loop is invariant for the dependencies only means that the "direction" of the dependencies at that level is constant. The "structure" of the dependencies may still vary for different executions of the loop body, especially if there are lower level loops. If we would encounter this situation during a window evaluation, it would be incorrect to evaluate the window for an arbitrary value of the iterator of the common loop, as the window size varies with the value of the iterator. So in this case we must rely on the ILP solver to find the optimal value for the common iterator.

Luckily, such a case is easy to detect. In general, if the ILP problem contains an (in)equality which contains the targeted iterator and an other iterator, we know that the dependency structure may vary with the value of the targeted iterator. This varying structure phenomenon may affect the solution of the four different types of ILP problems, because the variation affects the time dimension as well as the address dimension, so we always have to perform this check.

There is another case in which the substitution by an arbitrary allowed value is not allowed, i.e. when the BOAT-domains are diverging, i.e. the address dimension varies at different speeds for the two domains. This is caused by the different scaling factors for the iterator in the index expressions. Therefore we again have to rely on the ILP solver to find the optimal value of the iterator.

The detection of this case is again relatively simple: we have, to make sure that if there is a relation between the address dimension and the targeted iterator, the coefficients for the iterator in these relations are identical for both dependencies. In this way we are sure that the "address-speeds" of both BOAT-domains are the same and no divergence can occur. This issue only affects the ILP problems in which the address dimension plays a role, because the time dimension is not related to the "address-speed". Therefore this check only has to be performed when solving ILP problems of type 1, 3, and 4.

Finally, next to elimination and fixation of iterators of common invariant loops, we can also do similar things with iterators of carrying loops. This also requires syntax tree analysis. The syntax tree may provide us with relevant information about the position of reading and writing statements causing the dependencies. This information is also implicitly present in the inequalities related to the execution order, but a syntax tree allows us to analyze some of this information more efficiently.

An important underlying assumption that we make is that the, program is procedurally executed, i.e. there is a direct relation between the position of statements in the syntax tree and their execution order. In the following we also assume that the iterators of all the common invariant loop have been (partly) eliminated by the techniques described above. So there are only two possibilities left: either there is no other common loop left, or the outer remaining loop is carrying at least one of the dependencies.

In case the dependencies do not share any remaining loop, there are two cases in which we can simplify the problem in accordance with the present invention, or even solve it without calling an ILP solver:

Case 1: The two dependencies are never simultaneously alive.

Figure 39:
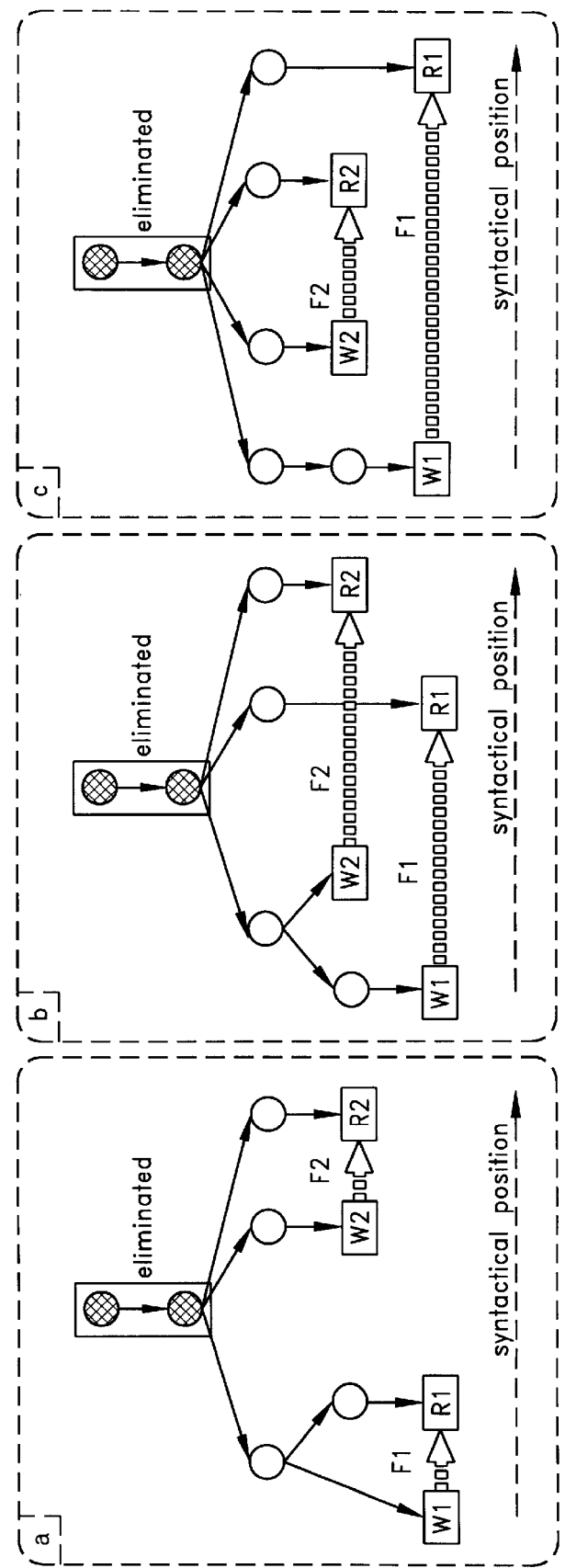
FIG. 39 shows syntax tree analysis according to the present invention.

An abstraction of an example is depicted in FIG. 39a. In this case, we know that the ILP problem must be infeasible because there is no value of t for which both dependencies are alive. We can therefore avoid any further evaluation. A set of sufficient conditions for this case is the following:

The syntactical position of the reading statement of one dependency is smaller than that of the writing statement of the other dependency.

This reading and writing statement only share loops that are invariant for both dependencies (otherwise the analysis becomes more complex, see further).

Case 2: One dependency is "stable" for a while and the other one is either also stable during this period, or all its writes and/or all its reads occur during this period.

We define a dependency to be stable during a period if it is alive and no writes or reads occur during this period. Abstractions of two examples are presented in FIG. 39b and FIG. 39c. In case we are trying to solve a problem of type 1, 2, or 4, we know that it must be feasible (which is all we need to know for type 2). In case we are trying to solve a problem of type 1, 3, or 4, we can make an important simplification. We can understand this as follows: during the stable period of the first dependency, all of the corresponding addresses are being occupied. If the other dependency is also stable, or all its writes and/or all its reads occur during this period, we know that all of the corresponding addresses must be occupied at least for a while during this period. In other words, we know that during this period each possible combination of two addresses, one for each dependency, is being occupied at least for a while. We also know that the (optimal) solution of these types of ILP problems, if it exists, corresponds to a combination of two addresses that are being occupied at the same time, one for each dependency. Now, the time-related inequalities are there to make sure that they are simultaneously occupied. However, from the above reasoning we know that every possible combination is simultaneously occupied somewhere during the stable period of the first dependency. Therefore it is not necessary that we impose this via the time related inequalities. In other words, we can simply remove all the time-related inequalities. We have already identified these inequalities as a potential cause for numerical instabilities, and it is therefore very beneficial for the complexity of the ILP problem if we can get rid of them. A set of sufficient conditions to detect this case is the following:

The writing statement of one dependency and the reading statement of the other one only share loops that are invariant for both dependencies and vice versa.

The syntactical position of the writing statement is smaller than that of the reading statement (also for both cases).

In case we are solving a problem of type 1, we can go even further. After removing the time-related inequalities, we end up with two unrelated subsets of (in)equalities (one for each dependency). We could therefore even split the ILP problem in two smaller ILP problems, but we do not discuss this any further.

In case the two dependencies share a loop that is carrying at least one of them, and the dependency(ies) is/are carried over a constant distance, we can perform similar simplifications. We could make a distinction between 2 cases:

The common loop is invariant for one of the dependencies and is carrying the other one over a constant distance.

Both dependencies are carried by the common loop, potentially over different constant distances.

However, we can see an invariant loop as a degenerate case of a carrying loop with a constant distance of zero. Therefore, we do not make a distinction between the two cases and act as if both dependencies are carried.

Case 3: One dependency is "stable" for a while and the other one is either also "stable" during this period, or all of its writes and/or all of its reads of a certain execution of the loop body occur during this period.

Figure 40:
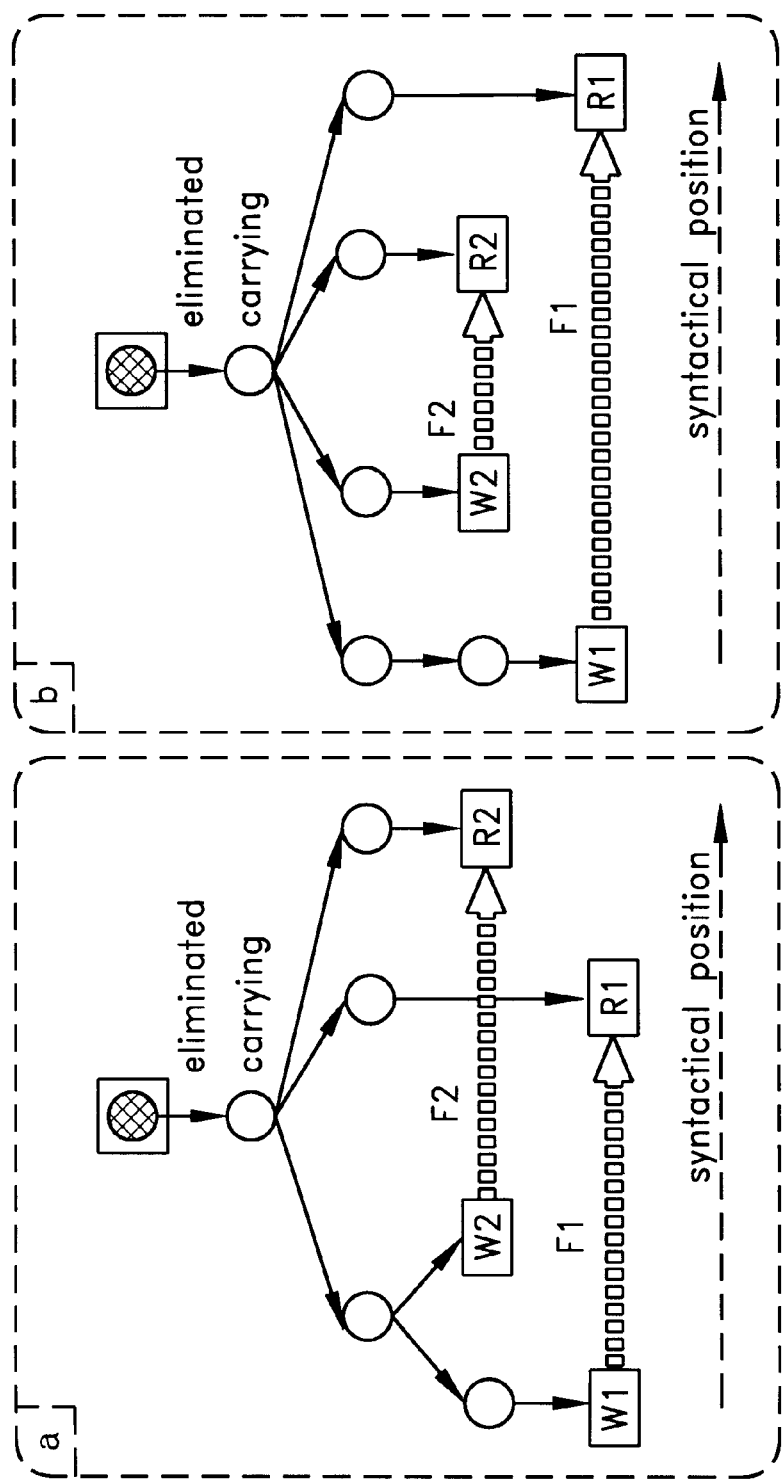
FIG. 40 shows syntax tree analysis with carrying loop according to the present invention.

Note that this case is similar to case 2, but this time there still is a common carrying loop present. A few abstractions of examples are shown in FIG. 40. We might be tempted to draw the same conclusions as in case 2, and remove the time-related inequalities from the ILP problem. However, in that case the iterator instances of all the common (invariant) loops were already locked to each other. In this case there is still one common loop left, and its iterator instances have not been explicitly locked to each other yet. They are still locked via the time-related inequalities, but removing these inequalities would "break" the lock, and therefore we might end up with a invalid solution to the ILP problem.

Figure 41:
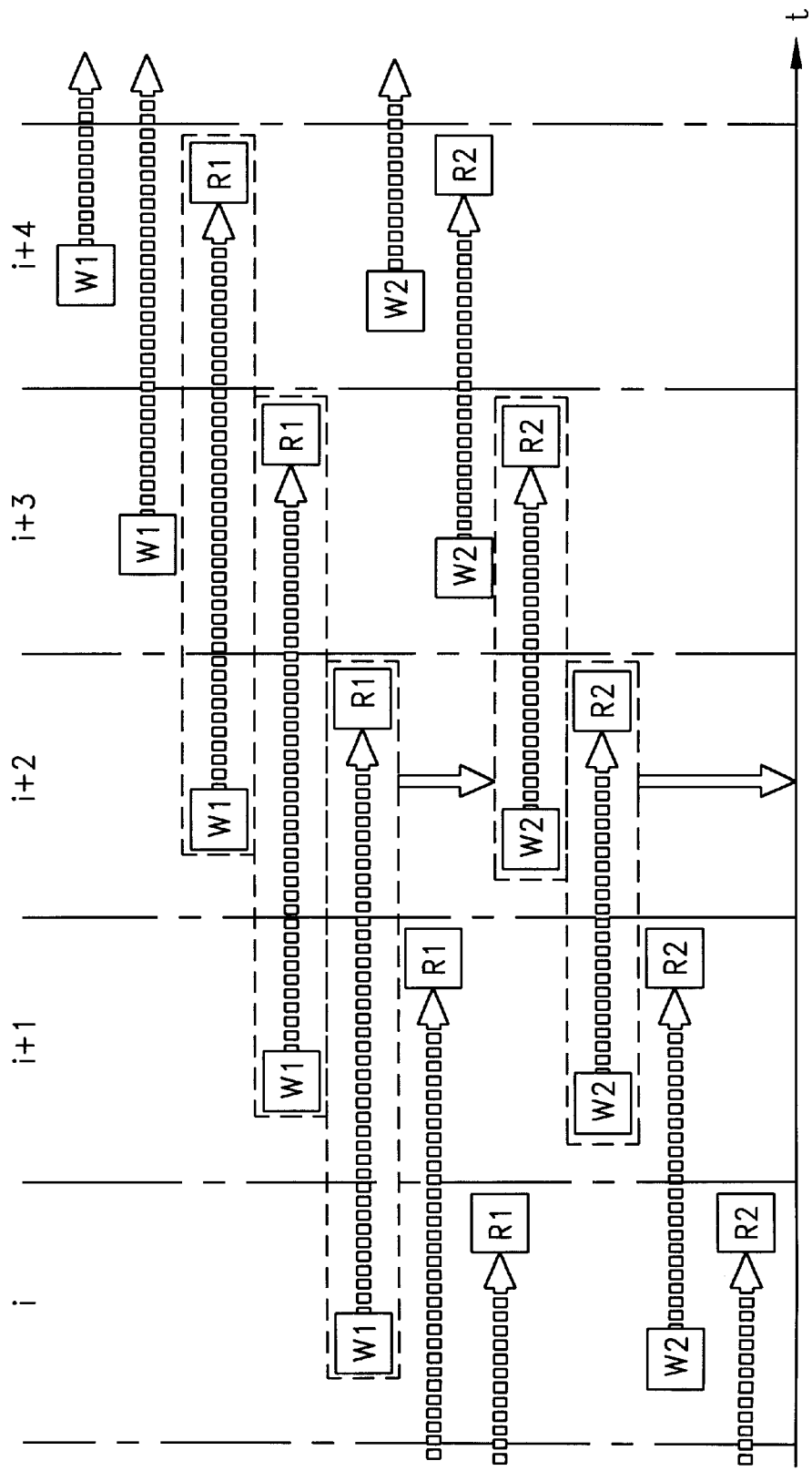
FIG. 41 shows possible solutions for a pair of carried dependencies according to the present invention.

We cannot lock the iterator instances in the same way as before though. The two instances for each dependency can be locked at a constant distance, but we cannot do this for the iterator instances of different dependencies in this case. This can be understood from FIG. 41, in which 2 "unrolled" carried dependencies are shown.

Figure 42A:
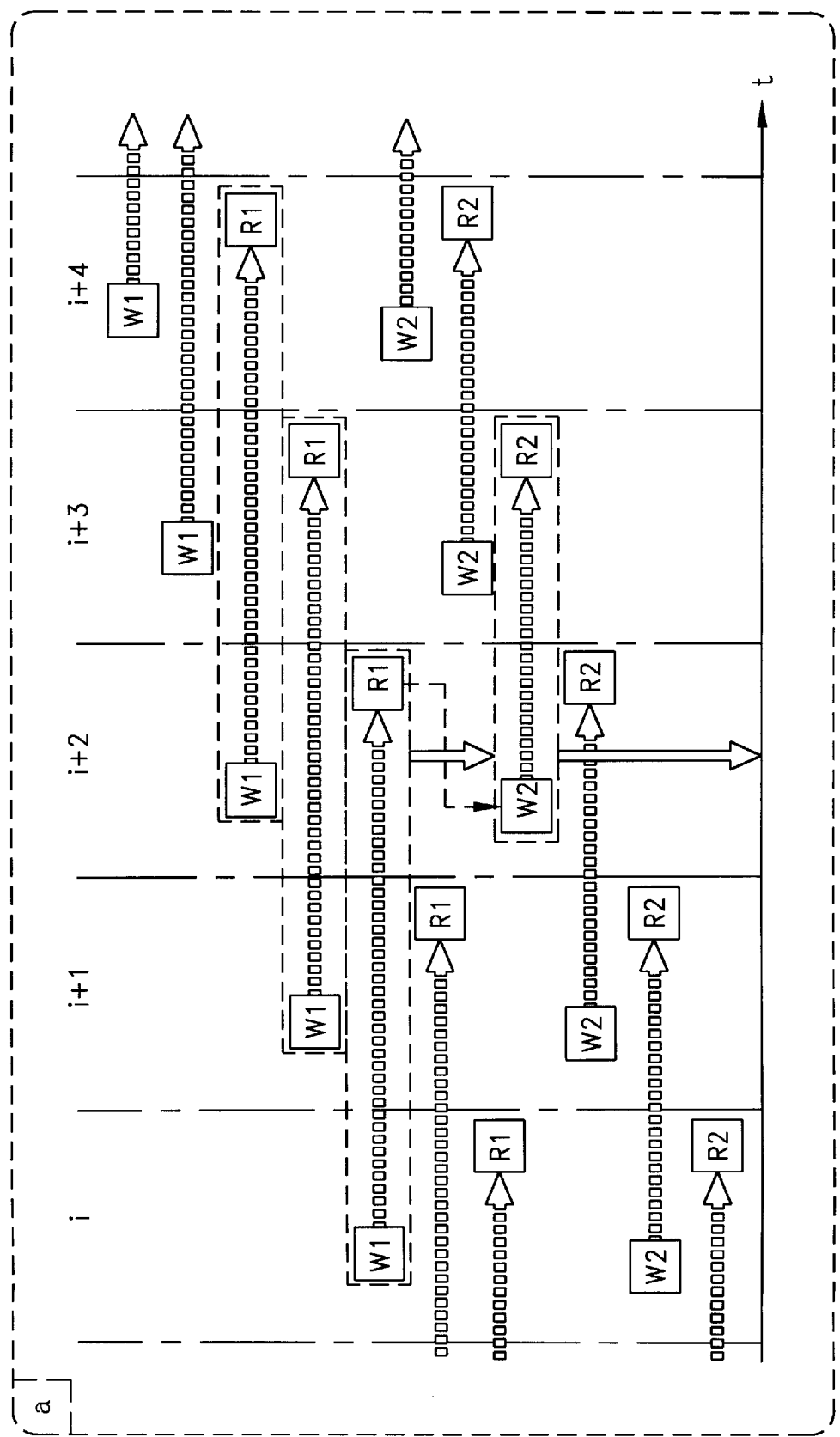
FIGS. 42a and b show locking of iterator instances according to the present invention.

If we assume that the solution to the ILP problem corresponds to the moment in time indicated by the thick vertical arrows, we see that there are several components of each dependency alive at that time. Therefore we cannot say which write iterator of each dependency corresponds to this solution. In this example, for the dependency carried over a distance of 1, there are 2 possibilities and for the one carried over a distance of 2, there are 3 possibilities. In general the number of possibilities also depends on the syntactical position of the writing and reading statement. Two examples are depicted in FIG. 42.

Let us assume that the write iterator instances of the two dependencies are represented by $i_{w1}$ and $i_{w2}$ respectively, and the carrying distances by $d_1$ and $d_2$ respectively. In the first case, depicted in FIG. 42a, the syntactical position of the writing statement of the second dependency is smaller than that of the reading statement of the first dependency. From the figure we can see that there are only a limited number of possibilities for the first dependency. We can derive that the following must hold: $i_{w2}-i_{w1} \leq d_1$.

Figure 42B:
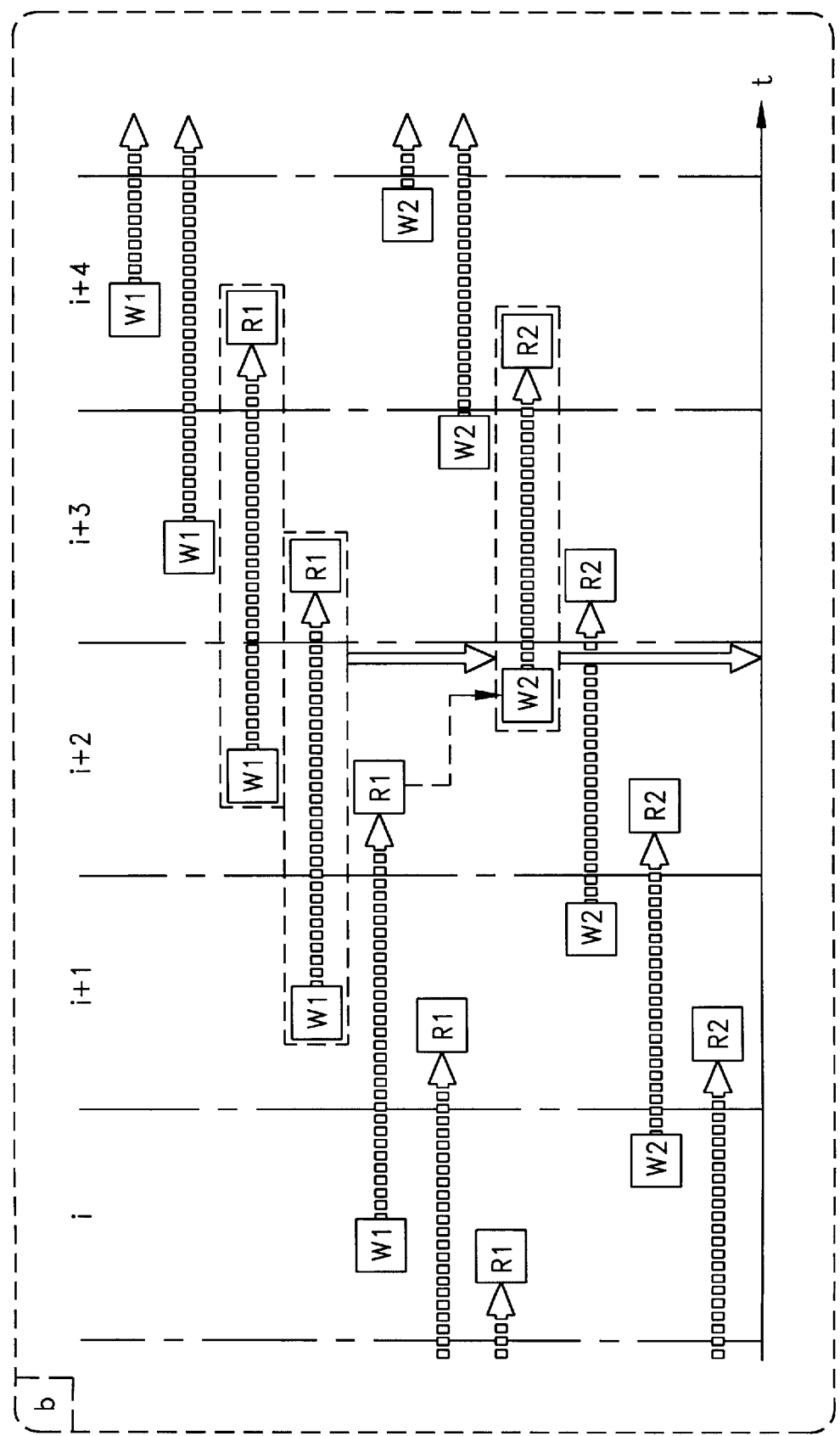

In the second case, depicted in FIG. 42b, the syntactical position of the writing statement of the second dependency is larger than that of the reading statement of the first dependency. In that case we can derive that the following must hold: $i_{w2}-i_{w1} \leq d_1-1$. We can switch the roles of the two dependencies and draw similar conclusions for that case. Consequently we can derive an upper and a lower bound on the "slack" between the values of the two write iterator instances. If we add these (simple) inequalities to the ILP problem, we can safely remove the (problematic) time-related inequalities from it, and hence reduce the complexity of the ILP problem.

A sufficient condition to detect this case is the following:

The writing statement of one dependency and the reading statement of the other one only share loops that are either invariant for both of the dependencies, invariant for one of them and carrying the other one, or carrying both of them and vice versa.

Figure 43:
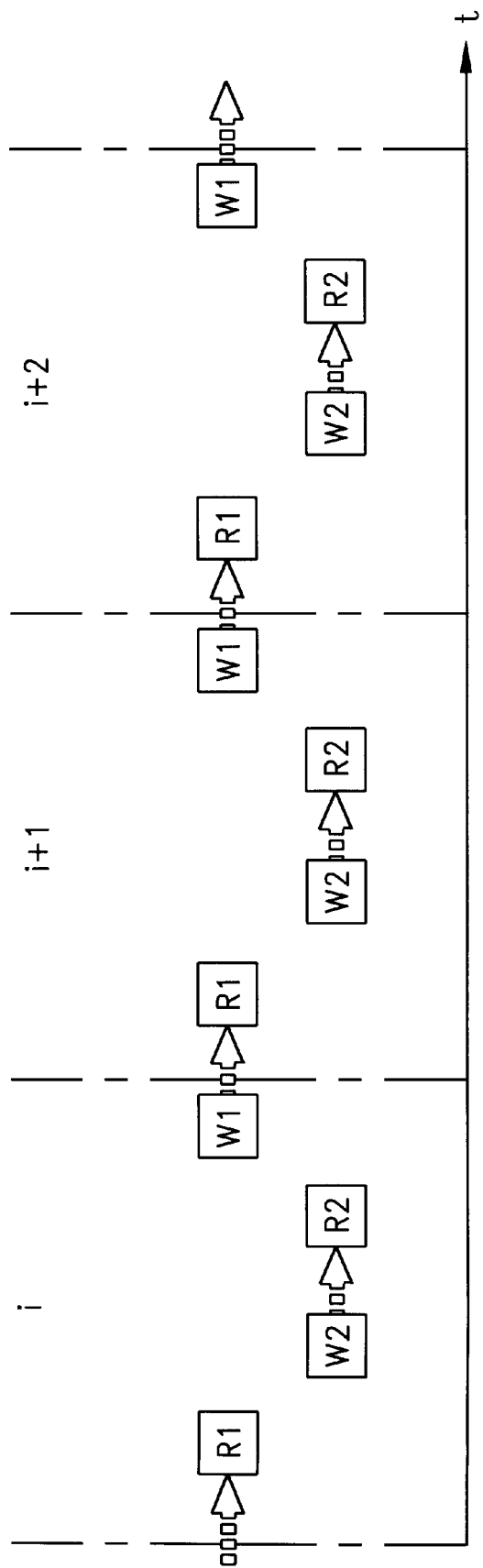
FIG. 43 shows an infeasible solution to an ILP problem.

In some cases we may find an upper bound for the slack that is lower than the lower bound. This means that the ILP problem is infeasible. It can only occur when one of the dependencies is not carried, the other one is carried over a distance of 1, and they are never simultaneously alive. An example is depicted in FIG. 43.

Actually, cases 1 and 2, where there are only invariant common loops, are degenerate cases of case 3 as we can treat an invariant loop as a carrying loop over a zero distance. Therefore it is sufficient to implement only this most general case. Moreover, the iterator slack limiting technique of case 3 can even be applied when the preconditions for this case are not fulfilled. The iterator elimination technique for pairs of dependencies, presented above, is actually a degenerate case of the slack limiting technique. The upper and lower bound on the slack between the iterator instance values are then both zero, which allows us to eliminate some of the iterator instances. The preconditions of case 3 have to be fulfilled though in order to be able to remove the time-related inequalities (and in that case we must also limit the slack).

Above we describe several techniques that allow us to decrease the complexity of the ILP problems that we have to solve. However, we can also try to reduce the number of (difficult) ILP problems.

The ILP problems of type 1, 2, 3, and 4, always appear as sub-problems in a higher level problem (e.g. the window calculation for a given storage order of an array), which we refer to as the meta-problem. The meta-problem always involves all the dependencies of two arrays (possible twice the same array), and can be solved by solving one or a few ILP problems for each combination of two dependencies. As a consequence the (worst case) number of ILP problems that we have to solve for the meta-problem is always proportional to the product of the number of dependencies of both arrays. Therefore it would be beneficial for the run-times if we could reduce the (average) number of ILP problems that we really have to solve.

We have described above a technique that may help us to reduce the number of ILP problems to solve: the simple compatibility test. This test tries to decide whether an ILP problem possibly is feasible or not based on a crude life-time analysis. If it turns out to be infeasible, there is no need to send the ILP problem to a solver. Depending on the type of meta-problem, there are several other things that we can do:

For types 2 and 3, which are feasibility problems, we only need to know whether one of the ILP sub-problems is feasible. Therefore, if only one dependency combination is feasible, we can already reduce the number of problems to solve by a factor of 2 on the average. If more combinations are feasible we can reduce the average number of problems to solve even further. Of course, if none of the ILP problems is known to be feasible, we have to solve them all in order to be sure that the meta-problem is infeasible. The reduction of the number of ILP problems to solve can be worthwhile, especially as it requires no additional effort.

For the other two types of meta-problems, namely types 1 and 4, we need to know the overall optimal solution for all possible combinations of dependencies. Therefore one may be tempted to believe that it is not possible to avoid any of the ILP problem evaluations. This is indeed true if we have to solve only one instance of the meta-problem for a certain pair of arrays, as for the distance calculation meta-problem (type 4). For the window calculation meta-problems (type 1) on the other hand, the situation is different, at least if we use one of the intra-array storage order search strategies presented above. In that case we have to solve many window calculation meta-problems for the same dependency combinations, albeit for different storage orders. It turns out that we can use several techniques to reduce the average number of ILP problems that we have to solve. These are described in the following.

Figure 44:
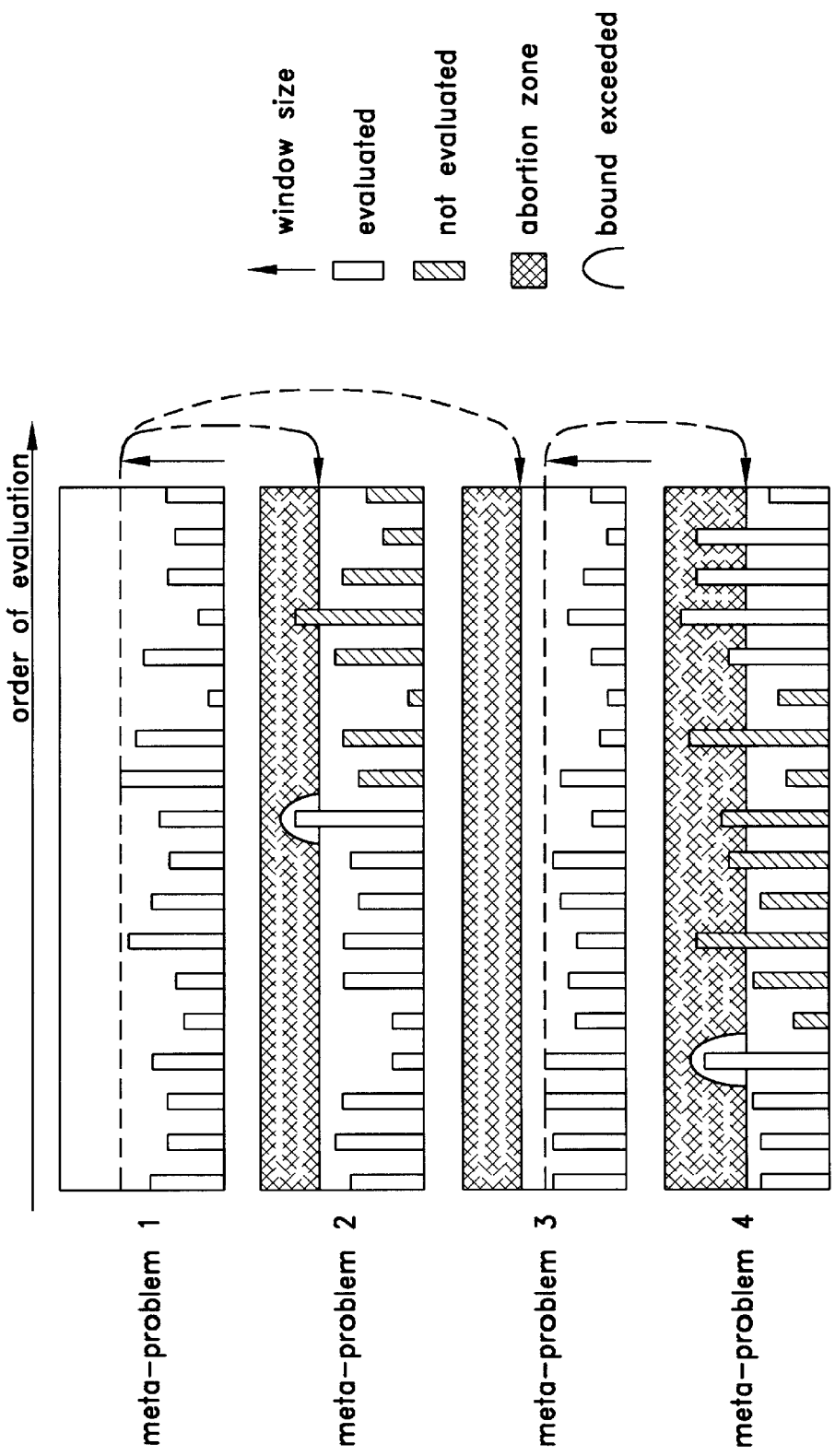
FIG. 44 shows abortion of window calculations according to the present invention.

During our search for the optimal intra-array storage order we have to evaluate the window for several possible orders, i.e. we have to solve several window calculation meta-problem. We are only interested in the storage order(s) that result(s) in the smallest window size though. This may allow us to skip the solving of several ILP sub-problems. We will illustrate this by means of the example in FIG. 44. The different ILP sub-problems are represented by the vertical bars whose heights correspond to the window sizes for the corresponding dependency combinations.

Let us assume that we have solved meta-problem 1, i.e. that we know the window size for the corresponding (full) storage order. If we have to evaluate another order, we have to solve several ILP sub-problems to obtain the solution for the corresponding meta-problem too. However, if the solution to one of these sub-problems is larger than or equal to the solution for the first meta-problem, we know that the window size of the second storage order cannot be smaller than that of the first one, no matter what the solution of the remaining sub-problems is, and we can simply abort the evaluation of the second meta-problem. This is illustrated in the figure for meta-problem 2.

We can easily generalize this to the case were we have to evaluate the window size for several (full) storage orders: at each moment in time we have to remember the smallest solution for the meta-problems encountered till then. If during the evaluation of another meta-problem, the solution to one of the sub-problems exceeds this smallest solution, we can abort the evaluation of that meta-problem. For instance, for meta-problem 3 in FIG. 44, the window size is smaller than for the previous two meta-problems. Therefore we use this size as a new and tighter abortion boundary when evaluating the next storage order (meta-problem 4). This allows us to avoid again a relatively large number of ILP sub-problems (indicated by the gray-shaded bars).

When we are evaluating partial storage orders, the situation is slightly different because we only have upper and lower bounds on the window sizes. In that case we have to compare the lowest upper bound for the meta-problems solved to the lower bounds for the sub-problems. If the lower bound for one of the sub-problems exceeds this upper bound, we know that any full storage order derived from this partial order must be suboptimal and that we can abort the evaluation for this partial order (and of course prune the corresponding part of the search tree).

The more meta-problems that we have to solve, the larger the probability that we avoid having to solve many sub-problems. In practice, the reduction of the number of ILP sub-problems to evaluate is considerable. We can decrease this number even further by combining this technique with the ones described in the following.

During the search for an optimal intra-array storage order, we have to evaluate the window size for each pair of dependencies several times, each time for a different storage order. The resulting ILP problems are therefore very similar. The only difference is the storage order, which appears in the cost function of the ILP problems.

The general form of the intra-array storage order functions is given by equation 4.1. Consequently, the cost function for the ILP problems, which is the absolute value of the difference between two addresses, has the following format:

$$\left| \sum_{j=1}^{D} N_j |a_{n_j 1} - B_{n_j}^{up/lo}| - \sum_{j=1}^{D} N_j |a_{n_j 2} - B_{n_j}^{up/lo}| \right| = \left| \sum_{j=1}^{D} \pm N_j |a_{n_j 1} - a_{n_j 2}| \right|$$ (7.1)

where the D is the number of dimensions of the array and the $N_j$ coefficients are given by equation 4.2. These coefficients are the only ones that differ for the different storage orders. The choice for the signs in equation 7.1 depends on the choice that was made for the directions of the dimensions. The equality is validated by the fact that either $a_{nj1;2} \geq B_{nj}^{up/lo}$ or $a_{nj1;2} \leq B_{nj}^{up/lo}$. We can easily derive an upper bound for the maximum value of the cost function, given that the $N_j$ coefficients always have positive values:

$$\max \left| \sum_{j=1}^{D} \pm N_j |a_{n_j 1} - a_{n_j 2}| \right| \leq \sum_{j=1}^{D} N_j \max |a_{n_j 1} - a_{n_j 2}|$$ (7.2)

In other words, if we know the maximal absolute values of the distances for the different dimensions of the array, we can calculate an upper bound for the maximal distance between the corresponding addresses, i.e. the window size, for this pair of dependencies. The dimension distances can be found by simply substituting the cost function of the ILP problem and solving it. The $N_j$ coefficients for the different storage orders also differ, so we have a different upper bound for each order. However, if we know upper bounds for the dimension distances, we can quickly estimate an upper bound for the address distance. Therefore we have to calculate the dimension distances only once, and then we can use the results to estimate upper bounds for all possible storage orders that we consider.

Figure 45:
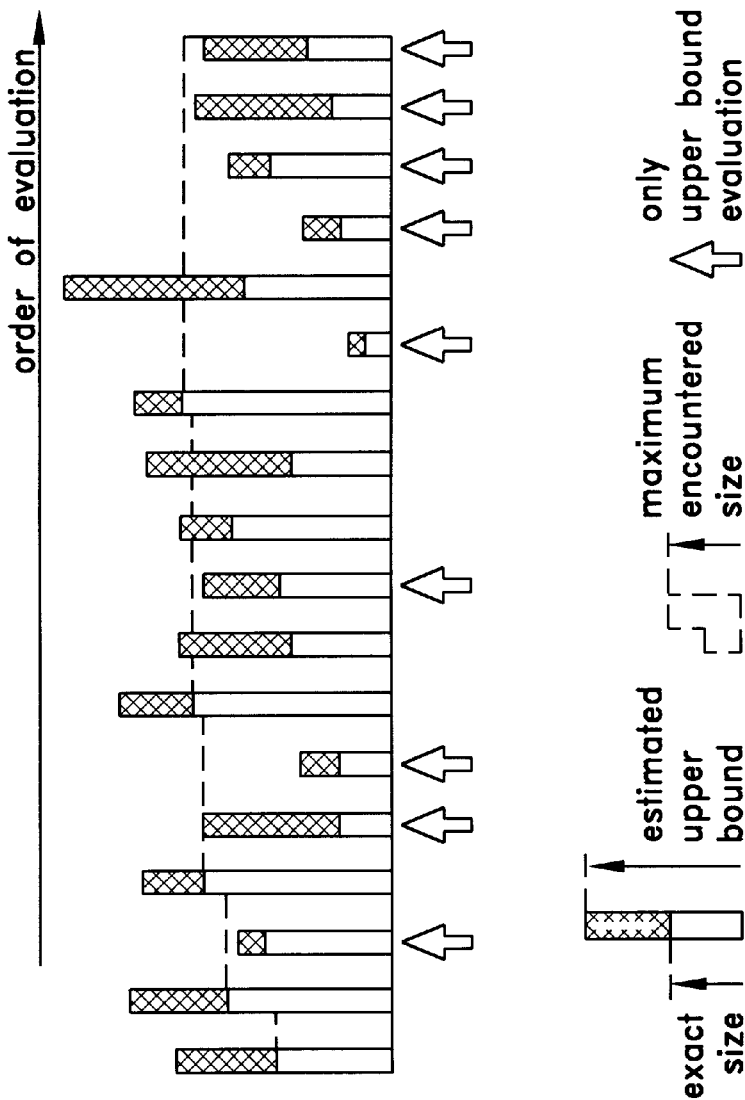
FIG. 45 shows avoiding exact ILP solutions through upper bound estimations according to the present invention.

We can use such an upper bound during the window calculation meta-problem. We solve this problem by searching for the sub-problem that results in the largest address distance. Consequently, if we encounter a sub-problem whose estimated upper bound is smaller than the largest solution found until then, we know that the exact solution of the sub-problem cannot be of interest, as it is certainly not the largest one. Therefore, we can avoid having to solve the corresponding ILP problem(s) exactly. This is illustrated in FIG. 45. The boxes correspond to the exact and estimated sizes of the window for the different dependency combinations. If we evaluate them from left to right, we can avoid the exact ILP solution for several combinations (indicated by the vertical arrows).

The time required to estimate an upper bound on the address distance, given that we know the estimations for the different dimensions, is negligible compared to the time required for solving the ILP problem that results in the exact distance, because the estimation only consists of a sum of products. Therefore we can speed up the window calculation process considerably if we can avoid many ILP problems in that way. Our experiments indicate that this is indeed the case in practice.

Figure 46:
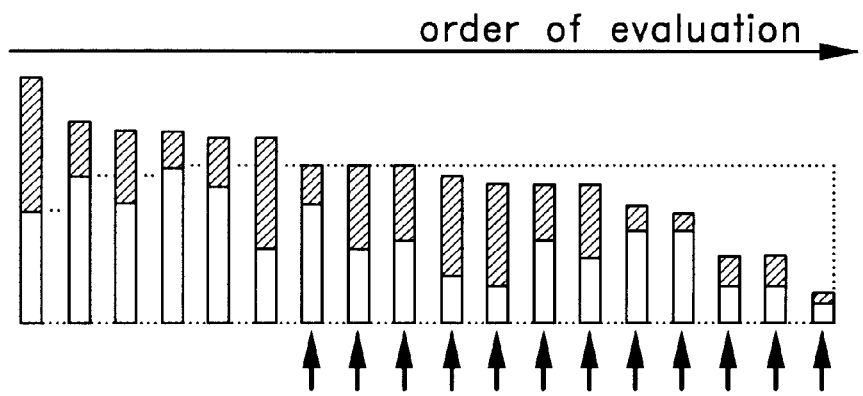
FIG. 46 shows sorting of dependency combinations according to the present invention.

The upper bound estimation technique presented above allows us to avoid having to evaluate many ILP problems exactly. We can do even better considering the fact that the dependency combinations with the largest upper bound estimations are also likely to have larger exact window sizes. Therefore, if we start by evaluating the combinations that have the largest estimated upper bounds, it is likely that we encounter the combinations with the largest exact sizes sooner. As a result, the largest encountered size is likely to increase more rapidly, and the number of exact evaluations that we need is likely to decrease. This is illustrated by the example of FIG. 46, which is identical to the one of FIG. 45, except for the order of the combinations.

We can see that the number of required exact evaluations has indeed decreased compared to FIG. 45 because the number of cases where the upper bound estimation is sufficient, has increased.

This effect is already worthwhile on its own, but the sorting also has a positive effect on the abortion technique described above. Due to the sorting, the probability that we encounter the dependency combinations with the largest window sizes sooner increases. Therefore, if the abortion bound is exceeded during the solving of a meta-problem, it is likely to be exceeded sooner. In that way we can avoid even more exact ILP problem evaluations in practice.

The techniques described above allow us to decrease both the complexity of the ILP problems that we encounter and their number. This results in a significant speed-up in practice. Despite these techniques, the number of ILP problems to be solved for the optimization of realistic multimedia applications still remains relatively high. Therefore there is a non-negligible probability that our ILP-solver runs into problems sooner or later, e.g. due to numerical instabilities. There are of course a few software-based techniques that can help us to circumvent some of these difficulties (e.g. use a backup solver that uses different techniques and that takes over when the main solver gives up). Although these techniques may be quite effective in practice, they cannot avoid all of the problems. For instance, if an ILP problem is too complex for any solver, there is not much that we can do with purely software-based techniques.

However, we must find the solution to all the ILP problems that we encounter, because otherwise our optimization strategy breaks down. If we fail to find the solution to one of the ILP problems, we may be completely stuck, or in the best case we may have to make some worst-case assumptions which may lead to a (highly) suboptimal design decisions. Therefore we have to come up with some more fundamental techniques, that allow us to reduce the risk of getting stuck to negligible proportions.

It is nearly impossible to predict in advance whether an ILP solver will get stuck for a certain problem or not. Moreover, different solvers are likely to get stuck for different problems. Fortunately we can classify the ILP problems that we encounter in 4 types, and we can identify the types that are more likely to give rise to problems.

First of all we can make a distinction between the optimization problems (types 1 and 4) and the feasibility problems (types 2 and 3). Feasibility problems; are inherently simpler because it is sufficient that the solver finds a solution. Especially when we apply the simplification heuristics above, the probability of running into problems becomes negligibly small in practice. This was confirmed during our experiments, where we never encountered any difficulties with these types of problems (at least when we applied the simplification heuristics).

The optimization problems on the other hand are more sensitive to e.g. numerical instabilities. Both for the window calculation and the distance calculation problems we occasionally observed during our experiments that the ILP solver ran into problems or simply gave up.

Preferably the distance calculations are not used in our optimization strategy, so we can ignore this type of ILP problems (at least for now). Therefore, the most critical type of ILP problem is the one related to the window calculation, namely type 1. We have identified above the (in)equalities containing execution and storage order functions as being potential causes of numerical instability or other problems in the ILP solvers. We have also described some techniques which may allow us to reduce the complexity of the execution order related inequalities or even remove them completely. Moreover, we have indicated how the intra-array storage order search space pruning techniques may help us to reduce the effective number of dimensions of an array. This also has a positive effect on the complexity of the storage order function as in that case the number of terms with large coefficients is reduced.

Unfortunately, in some cases none of these simplification heuristics succeed, or the simplifications are not sufficient to avoid e.g. numerical instabilities in the ILP solver. We know, however, that the ILP feasibility problems of types 2 and 3 do not give rise to instabilities in practice. So if we can bring the problems of type 1 closer to those of type 2 or 3, we can reduce the probability of getting into trouble. The difference with these types of problems is the relatively complex cost function, which is directly related to the storage order of the array. Therefore we have to focus our attention on this cost function.

It turns out that, to achieve this goal, we can again make use of the special properties of our abstract address equations (i.e. the intra-array storage order functions), properties that we also use in our partial window evaluation techniques. Suppose that we are trying to evaluate the window size for a (full) intra-array storage order or, equivalently, an abstract address equation that has the format of equation 4.1. Since we know the order of the dimensions, we can instantiate the nj subscripts. As a result we obtain the following equations:

$$A^{abstr}(a_1, a_2, \ldots, a_D) = \sum_{i=1}^{D} N_i |a_i - B_i^{up/lo}| \quad (7.3)$$

$$\text{where } N_i = \prod_{k=i+1}^{D} S_i, N_D = 1 \quad (7.4)$$

$$\text{and } S_i = B_i^{up} - B_i^{lo} + 1 \quad (7.5)$$

During the window calculation we are trying to find the maximal distance between two addresses. Following a similar reasoning as for the partial window evaluation, we know that the optimal solution W must correspond to a certain vector of distances per dimension $(d_1, d_2, \ldots, d_D)$:

$$W = \left| \sum_{i=1}^{D} N_i d_i \right| + 1 \text{ where } |d_i| \leq S_i - 1 \quad (7.6)$$

The fact that we are looking for the distance with the maximal absolute value implies that we cannot find the maximum by solving only one ILP problem, but we can find it by solving 2 of them: one in which we maximize the summation and one in which we minimize the summation. We refer to the solutions of the problems as $W^M$ and $W^m$ respectively. The overall optimal is then equal to the maximal absolute value, incremented by one: $W=\max(W^M, -W^m)+1$. We concentrate on the calculation of $W^M$, since a similar reasoning can be followed for $W^m$. We can express $W^m$ as follows (assuming that $W=W^M+1$):

$$W^M = \sum_{i=1}^{D} N_i d_i \text{ where } |d_i| \le S_i - 1 \quad (7.7)$$

We would obtain a serious reduction of the ILP problem complexity if we would be able to find the distances that result in the optimal solution separately. However, if we would maximize each of these distances separately, it would not be guaranteed that the combination of all these maximal distances corresponds to a valid solution. We can obtain a valid solution if we proceed in the following way: first we maximize the distance for one dimension. Then we add a constraint to the problem that locks this distance to its maximal value, and we proceed similarly with the next dimensions until no more dimensions are left. Then we evaluate the total distance of equation 7.7. In this way we obtain a valid solution to the ILP problem, i.e. we know that the combination of these distances satisfies the constraints of the ILP problem. It might be assumed that this series of maximization problems leads to the maximal solution of the original problem. Unfortunately, this is not true, i.e. the solution obtained in this way is not guaranteed to be optimal. We can understand this as follows: if we maximize the first distance (which has the largest coefficient), this corresponds to a partial window evaluation in which only the first dimension is taken into account. Consequently, the upper and lower bound estimations provided by equation 5.9 can also be used here. If we assume that the maximal distance is represented by $d^*_1$, we obtain the following bounds:

$$N_i d^*_1 - N_i + 1 \le W^M \le N_i d^*_1 + N_i - 1 \quad (7.8)$$

However, this does not necessarily mean that the distance $a_1$ is equal to $a_1$ in the overall optimal solution. It is possible that a smaller value of $d_1$ leads to a better overall solution. It cannot be arbitrarily small though. Let us assume that $d_1 = d^*_1 - x$, where x is a positive integral value, leads to the overall optimal solution. Then we can also derive the corresponding boundaries:

$$N_i(d^*_1 - x) - N_i + 1 \le W^M \le N_i(d^*_1 - x) + N_i - 1 \quad (7.9)$$

For certain values of x the corresponding range for the overall solution partly overlaps with the range for the case where $d_1 = d^*_1$, which is the actual range of $W^M$ at this time. As long as the upper bound of equation 7.9 is larger than or equal to the lower bound of equation 7.8, we cannot exclude the corresponding value of x, so we can derive a valid range for x:

$$N_i(d^*_1 - x) + N_i - 1 \ge N_i d^*_1 - N_i + 1$$
$$-xN_i + N_i - 1 \ge -N_i + 1$$
$$(2 - x)N_i \ge 2$$

Figure 47:
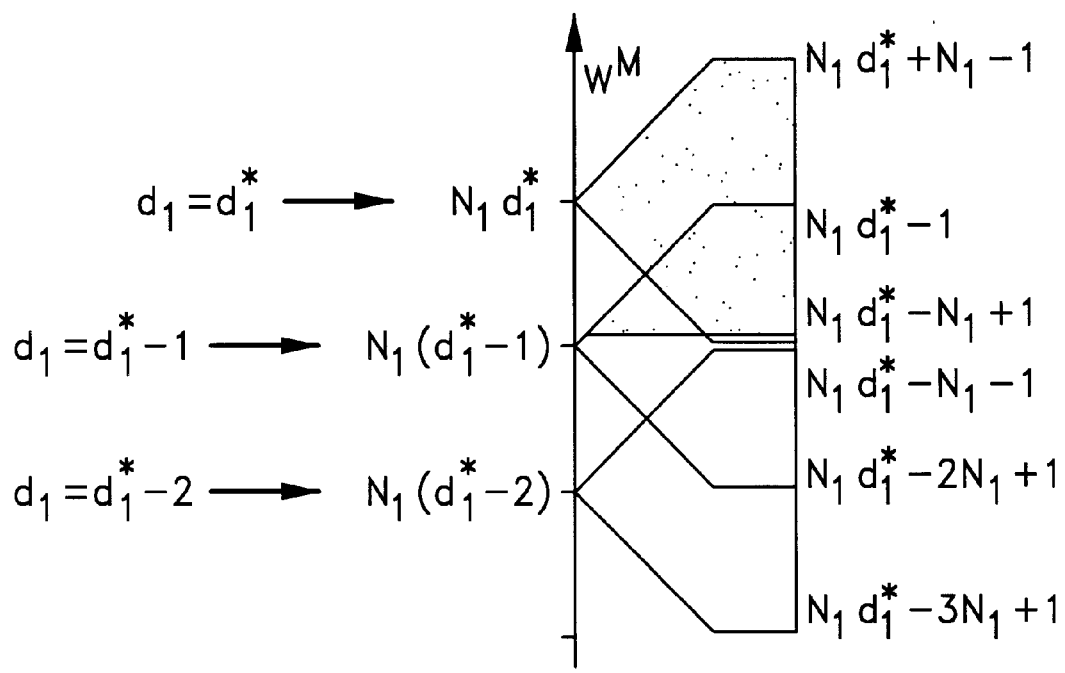

Since we know that $N_i \ge 1$, the only valid values for x are 0 and 1, i.e. the optimal value for $d_1$ is either equal to $d^*_1$ or to $d^*_1 - 1$. We can also verify in FIG. 47 that there is no solution for values of x that are larger than 1. The gray-shaded region corresponds to the possible range of $W^M$. For the cases where $d_1 \le d^*_1 - 2$, the corresponding ranges do not overlap with the possible range of $W^M$.

So now we know that for the overall optimal solution either $d_1 = d^*_1$ or $d_1 = d^*_1 - 1$ must hold. Let us assume that the first hypothesis holds. In that case we can lock the distance to this value by adding an additional constraint to the ILP problem. Then we proceed in a similar way with the second dimension, i.e. we search for the maximal distance $d^*_2$, given the constraint $d_1 = d^*_1$. Again we can draw similar conclusions about the boundaries of the range of $W^M$, but this time the range is smaller, and again we must take into account the possibility that this distance is 1 less in the final solution. This is depicted in FIG. 48a.

Then we assume that the other hypothesis holds, namely $d_1 = d^*_1 - 1$ and we proceed in the same way, as depicted in FIG. 48b. Again we obtain two possibilities for the second distance. Note that the lower bound obtained during the process for the first dimension overrides the lower bound for this case. Next we combine the results for the two hypotheses, as shown in FIG. 48c. We can see that for this example, one of the possibilities falls outside the valid range for $W^M$ (the valid range is determined by the largest encountered lower and upper bound). Therefore a solution corresponding to these hypotheses cannot be optimal, and we can discard this combination of hypotheses.

For the combinations of hypotheses that are still viable we proceed in a similar way with the remaining dimensions. The more dimensions we take into account, the narrower the allowed range of $W^M$ becomes. Eventually the upper and lower bounds coincide for the different hypotheses. The hypothesis that results in the largest value for $W^M$ must then correspond to the optimal solution for the original ILP problem. This illustrated in FIG. 49, where we continued with the 3 remaining hypotheses of FIG. 48. In FIGS. 49a, b, and c we illustrate the process for the 3 hypotheses. In FIG. 49d the combined result is shown, and the optimal series of hypotheses is highlighted.

For the search of the minimal value $W^m$ we can follow a similar procedure. Moreover, we can use $-W^M$ as an upper bound during our search for $W^m$ (in that case we search in the other direction). Therefore the number of hypotheses that can be pruned during that search is likely to be larger.

What we have described here is branch-and-bound-like procedure to obtain the window size for a given storage order by searching for maximal distances for the different dimensions, i.e. we have decomposed the original ILP problem into a series of ILP problems. The ILP problems to be solved for these distance calculations are inherently simpler than the original ILP problem for the window size, because the cost functions only involve the distance in one dimension. Moreover, the more hypotheses we add to the problem, the closer it resembles a feasibility problem, i.e. it is as if we steer the ILP solver to the optimal solution. Therefore the probability that the ILP solver gets stuck due to numerical instability or other problems is reduced considerably.

Unfortunately, this procedure has one large disadvantage: the worst-case number of ILP problems to be solved equals $2 \times (2^D - 1)$, where D is the number of dimensions of the array, compared to only 2 if we try to solve the problem in one shot. Considering the fact that due to our simplification heuristics this kind of ILP solver difficulties occurs only occasionally in practice, our run-times are likely to go up if we would always use this alternative procedure. Therefore this procedure should only be used in case of emergency, i.e. if the solver gets stuck on the original problem. If we can detect this (which is not hard in practice), we can abort the calculation and switch to this backup procedure. This strategy turns out to be very effective in practice.

In the following we describe some of the experimental results that we obtained from our prototype tool. All of the experiments were performed on a Hewlett Packard K260/4 workstation with 1.6 GB of RAM and 4 PA-8000 CPUs running at 180 MHZ. For these experiments we used the public domain (M)ILP solver called "LP_SOLVE".

In FIG. 50 we summarize the results of our experiments to illustrate the applicability and the effectiveness of the different speed-up heuristics. The figure shows the results of six different experiments that we ran on each of the six applications described previously. The interaction between the pruning of the search space and the application of speed-up heuristics for the intra- and inter-array storage order optimization phases has already been described. Hence we applied search space pruning in each of the experiments described here, and concentrate on the relative influence of each of the speed-up heuristics. Moreover, we did not activate the optional splitting step as its effect has already been described. The search strategy used during the intra-array optimization phase is the B&B one.

The six sets of experiments that we performed are the following:
no heuristics applied (experiment set A);
iterator elimination and fixation applied (experiment set B);
syntax analysis applied which also implies iterator elimination (experiment set C);
ILP avoidance techniques applied but without the simple compatibility test (experiment set D);
simple compatibility test instead of the full test, (experiment set E);
all heuristics applied simultaneously (experiment set F).

The results presented in FIG. 50 consist of 2 kinds of measurements. For each experiment, the striped bars at the left hand side correspond to the measured optimization CPU times. They have been broken up in two ways: the slantwise striped bars correspond to the CPU time spent on the window calculation phase and the placement phase (including compatibility and mergability calculation) respectively. The horizontally striped bars correspond to the CPU time spent in the ILP solver and the rest of the tool respectively. At the right hand side the number of calls to the ILP solver is presented for each experiment, broken up in 4 parts: the number of window calculation calls, the number of compatibility calculation calls, the number of mergability calculation calls, and finally the remaining number of ILP calls of miscellaneous nature (mainly encountered during dependency analysis). Note that these last ILP problems are usually much simpler than the first three groups, as they only involve one dependency.

Missing bars in the graphs correspond to experiments that failed (i.e. because the ILP solver gave up) or that were aborted due to too long run-times (i.e. several hours).

From these experiments we can conclude the following:

Each of the heuristics results in a worthwhile speed-up in most of the cases, even when applied separately.

The ILP avoidance techniques generally have the largest impact on the speed (experiment set D). They are very effective in reducing the number of window calculation ILP calls. For the edge detection application for instance, a reduction by a factor of almost 50 was obtained. The effect on the overall run-time is usually less dramatic but certainly worthwhile, i.e. a reduction by a factor of about two in most cases.

The other heuristics reduce the time spent in the ILP solver at the cost of a (smaller) increase of the time spent in the prototype tool itself. When combined with the ILP avoidance heuristics though, both the time spent in the tool and in the ILP solver are reduced.

The iterator elimination heuristics (experiment set B) are the most crucial ones. Without them, two of the applications could not be optimized (3D volume rendering and voice coder) because the ILP solver got stuck.

The simple compatibility test (experiment set E) results in a considerable reduction of the number of compatibility ILP calls (by a factor of between 2 and 25) for these applications.

Syntax tree analysis (experiment set C) has a very application dependent effect but can reduce the run-time significantly (e.g. for the wavelet filter kernel).

The combination of all of the heuristics results in speed-up of a factor of 3 to 4.5 (for the applications where it is possible to optimize them without heuristics). Note that search space pruning was enabled for each of the experiments. The overall gain is hence higher.

During the experiments, the window calculation decomposition backup procedure was triggered only a few times. When all heuristics were activated, it was only required for the voice coder application, namely 6 times on a total of 2576 window calculation ILP calls. This illustrates that the heuristics are very effective in avoiding numerical instabilities in the ILP solver, but nevertheless the backup procedure is vital to obtain a solution for very large applications such as the voice coder. The experiments also confirm that the ILP problems of type 1 (window calculation) are more difficult than those of types 2 and 3 (compatibility and mergability), as these last two types did not result in numerical instabilities (when heuristics are applied).

Figure 51:
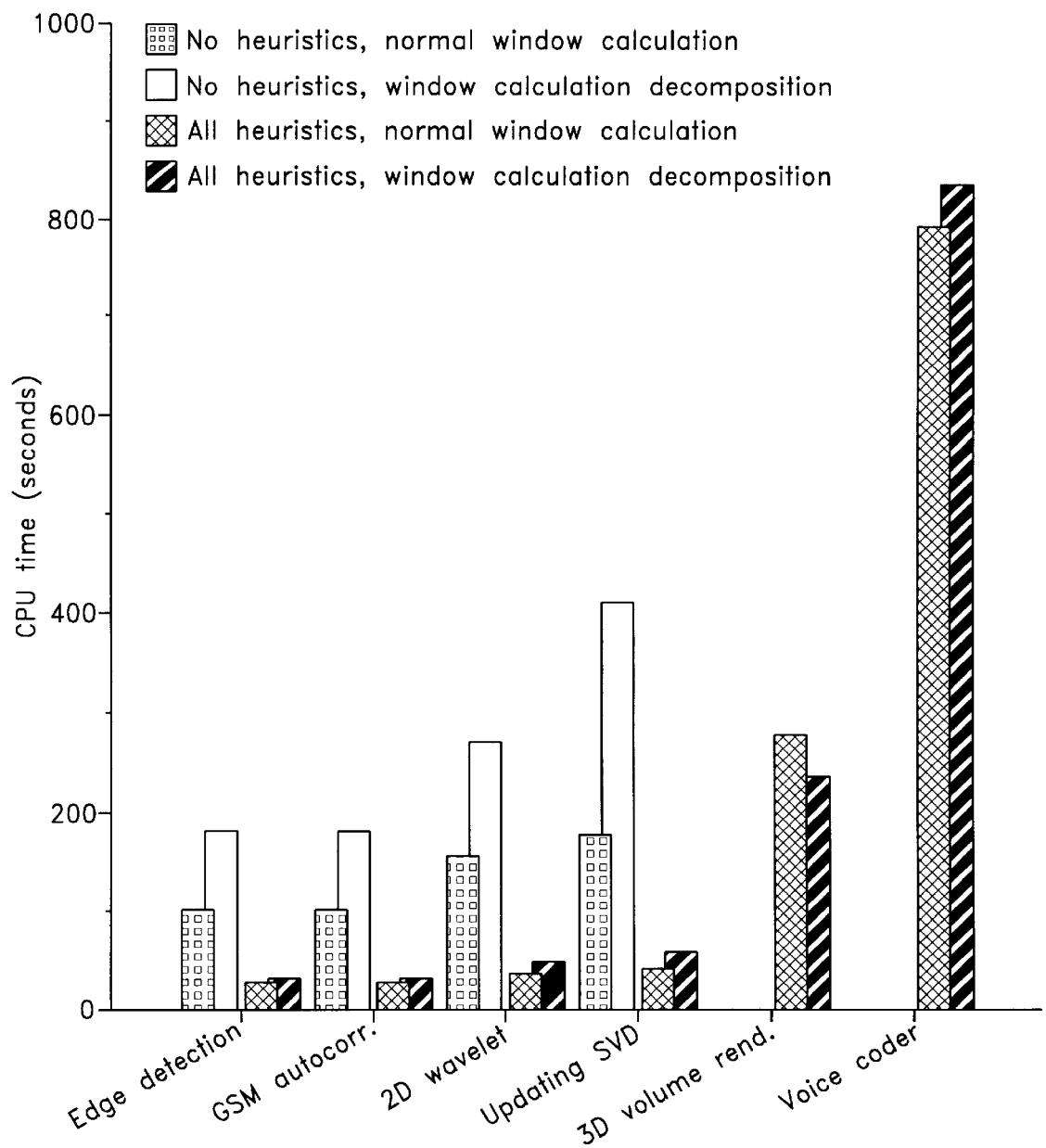
FIG. 51 shows the effect of window calculation decomposition technique on optimization run-times for intra-array storage order according to the present invention.

In an other series of experiments we have measured the effect of using the window calculation decomposition technique described above as an alternative for the normal window calculation procedure (and not only as a backup). In FIG. 51 the resulting CPU times for the intra-array optimization phase are shown for six applications, using the following four configurations:
no heuristics applied, using the normal window calculation procedure;
no heuristics applied, using the window calculation decomposition;
all heuristics applied, using the normal window calculation procedure;
all heuristics applied, using the window calculation decomposition. In all cases search space pruning was applied and the branch-and-bound search strategy was used. Missing bars again correspond to experiments that failed. From FIG. 51 we can conclude the following:

The window calculation decomposition technique is, as we expected, usually slower than the normal window calculation procedure. The overhead lies around 100% when no speed-up heuristics are applied, but is reduced to (much) less than 40% otherwise.

For one application, namely the 3D volume rendering, the CPU time for the normal window calculation procedure is even 10% higher than for the decomposition procedure. This indicates that the ILP solver is at the edge of having serious numerical instability problems when using the normal procedure, causing it to loose a relatively large amount of time. Because the overhead of the decomposition technique is usually not negligible (even when heuristics are applied), we think it is better to use it only as a backup alternative.

The techniques described above result in a significant speed-up) of the optimization run-times for several data-dominated multimedia applications and application kernels, as illustrated by the experimental results described above. The ILP simplification techniques are useful for the optimization of large applications, because a straightforward implementation of our optimization techniques (i.e. without heuristics) may break down due to numerical instabilities in the ILP solver. The simplification techniques reduce the probability that these instabilities occur, which results in shorter ILP solving times and a smaller probability that the ILP solver gives up completely.

The ILP avoidance techniques are not vital to come to a solution, but they yield the largest speed-up and are therefore also very valuable. Also the simple compatibility test generally results in a significant speed-up. Nevertheless, in some (rare) cases the speed-up heuristics are not sufficient to avoid serious numerical instabilities in the ILP solver. In these cases it is useful to have a backup procedure. This is only necessary for the window calculation type of problems in practice, and the window calculation, decomposition procedure is a satisfactory backup. It is even possible (but not recommended) to use this decomposition procedure as a full alternative, as the CPU time overhead is usually limited to less than a few 10%.

What is claimed is:

1. A method for optimizing before run-time the size of a storage unit for storing temporary data, comprising:

loading into a compiler execution commands and a definition of at least a first data structure, at least one of the execution commands requiring access to the at least first data structure; and optimizing the storage size of the temporary data in the storage unit required for the execution of the commands with a substantially given execution order, the storage size optimizing including intra-structure optimizing an intra-structure storage order at least within the first data structure and the optimizing including calculating a window size for the first data structure, the intra-structure optimizing being based on a geometric model, wherein the intra-structure optimizing also includes selecting an at least piecewise affine storage order for the first data structure.

2. The method of claim 1, wherein each of said data structures occupy abstract addresses, and the abstract addresses occupied by a data structure at each time over a period of time is called the occupied address/time domain of that data structure and calculation of the window size of the first data structure includes calculating the maximum distance in address space between two abstract addresses in the occupied address/time domain of the first data structure.

3. The method of claim 2, wherein the occupied address/time domain of the first data structure includes a plurality of value based flow dependencies and the calculating the window size of that data structure includes calculating the window size of each pair of dependencies and selecting the window size for the first data structure from the pair of dependencies which generates the maximum window size.

4. The method of claim 1, further comprising:

selecting the intra-structure storage order for the first data structure which provides the minimum window size of the relevant data structure, and wherein the data structures has a plurality of dimensions and each dimension may have a storage order in at least one direction and the selecting the minimum window size includes determining upper and lower bounds of the window size for the relevant data structure when the position in the storage order and the storage order direction of a limited number of the dimensions are fixed.

5. The method of claim 4, wherein the determining includes:

calculating the upper and lower bounds of the window size for each direction/dimension combination generated by fixing one combination of one of the plurality of dimensions and one direction in turn;

discarding direction/dimension combinations which cannot lead to an optimum solution;

for each of the selected dimension/direction combinations calculating the upper and lower bounds of the window size for each of the direction/dimension combinations generated by fixing one further combination of one of the plurality of dimensions and one direction in turn;

discarding direction/dimension combinations which cannot lead to an optimum solution; and repeating the above until all dimensions and directions are fixed.

6. The method of claim 5, wherein the discarding processes include discarding all direction/dimension combinations except the one which gives the smallest upper bound.

7. A method for optimizing before run-time the size of a storage unit for storing temporary data, comprising:

loading into a compiler a definition of at least a first data structure and a second data structure and execution commands, at least one of the execution commands requiring access to at least one of the first and second data structures;

optimizing the storage size of the temporary data in the storage unit required for the execution of the commands with a substantially given execution order, the storage size optimizing including inter-structure optimizing which optimizes an inter-structure storage order between the first and second data structures, the inter-structure optimizing being based on a geometric model;

intra-structure optimizing which independently optimizes an intra-structure storage order within each of the first and second data structures to form an abstract address equation for each data structure the intra-structure optimizing being based on a geometric model:

using the abstract address equations in the inter-structure optimizing.

8. The method of claim 7, wherein the inter-structure optimizing includes placement optimizing the placing of data structures in the storage unit to minimize the maximum distance in address space between two addresses being occupied at the same time but not necessarily in the same data structure.

9. The method of claim 8, wherein the abstract addresses occupied by a data structure at the same time over a period of time is called the occupied address/time domain of that data structure and the placement optimizing includes rearranging the occupied address/time domains within the address space without collisions, calculating a common window size for each arrangement of occupied address/time domains and selecting the arrangement with the minimum common window size.

10. The method of claim 9, further comprising calculating rectangular bounds for each occupied address/time domain and rearranging, the rectangular bounds within the address space to determine the minimum common window of the rectangular bounds.

11. The method of claim 9, wherein the folded occupied address/time domain is used instead of the occupied address/time domain of each data structure.

12. A compiler, comprising:

means for loading a definition of at least a first data structure and a second data structure and execution commands, at least one of the execution commands requiring access to at least one of the first and second data structures;

means for reducing the storage size of the temporary data required for the execution of the commands with a substantially given execution order, the reducing means including means for optimizing an inter-structure storage order between the first and second data structures, the inter-structure optimizing means being adapted to carry out the optimization based on a geometrical model, wherein the inter-structure optimizing means includes means for selecting the intra-structure storage order for at least one data structure which provides the minimum window size of the relevant data structure, and the data structures have a plurality of dimensions and each dimension may have a storage order in at least one direction and the selecting means includes means for determining upper and lower bounds of the window size for the relevant data structure and for fixing the position in the storage order and the storage order direction of a limited number of the dimensions.

13. The compiler of claim 12, wherein the inter-stricture optimizing means includes means for the placing of data structures in the storage unit to minimize the maximum distance between two addresses in address space being occupied at the same time but not necessarily in the same data structure.

14. The compiler of claim 13, wherein the abstract addresses occupied by a data structure at the same time over a period of time is called the occupied address/time domain of that data structure and the placement means includes means for rearranging the occupied address/time domains within the address space without collisions, means for calculating a common window size for each arrangement of occupied address/time domains and means for selecting the arrangement with the minimum common window size.

15. The compiler of claim 12, further comprising means for independently optimizing an intra-structure storage order within each of the first and second data structures based on a geometrical model to form an abstract address equation for each data structure.

16. A compiler, comprising:
means for loading execution commands and a definition of at least one data structure, at least one of the execution commands requiring access to at least one data structure; and
means for reducing the storage size of the temporary data in the storage unit required for the execution of the commands with a substantially given execution order, the reducing means including intra-structure optimizing means for optimizing an intra-structure storage order at least within the one data structure, the intra-structure optimizing means including means for calculating a window size for the one data structure, the intra-structure optimizing being based on a geometric model, wherein the at least one data structure occupies abstract addresses, and the abstract addresses occupied by the at least one data structure at each time over a period of time is called the occupied address/time domain of the data structure and the calculation means is adapted to calculate the maximum distance in address space between two abstract addresses in the occupied address/time domain.

17. The compiler of claim 16, wherein the occupied address/time domain of a data structure includes a plurality of value based flow dependencies and the calculating means is adapted to calculate the window size of each pair of dependencies and to select the window size for the data structure from the pair of dependencies which generates the maximum window size.

18. The compiler of claim 16, wherein the data structure has a plurality of dimensions and each dimension may have a storage order in at least one direction, the calculating means including means for fixing the position in the storage order and the storage order direction of a limited number of the dimensions and for then determining upper and lower bounds of the window size for the data structure.

19. A program storage device storing instructions that when executed by a computer perform the method comprising:
loading into a compiler execution commands and a definition of at least a first data structure, at least one of the execution commands requiring access to the at least first data structure; and
optimizing the storage size of the temporary data in the storage unit required for the execution of the commands with a substantially given execution order, the storage size optimizing including intra-structure optimizing for optimizing an intra-structure storage order at least within the first data structure and the optimizing including calculating a window size for the first data structure, the intra-structure optimizing being based on a geometrical model, wherein the intra-structure optimizing also includes selecting an at least piecewise affine storage order for the first data structure.

20. A program storage device storing instructions that when executed by a computer perform the method comprising:
loading into a compiler execution commands and a definition of at least a first data structure, at least one of the execution commands requiring access to the at least first data structure; and
optimizing the storage size of the temporary data in the storage unit required for the execution of the commands with a substantially given execution order, the storage size optimizing including intra-structure optimizing for optimizing an intra-structure storage order at least within the first data structure and the optimizing including calculating a window size for the first data structure, the intra-structure optimizing being based on a geometrical model, wherein the intra-structure optimizing which independently optimizes an intra-structure storage order within each of the first and second data structures forms an abstract address equation for each data structure, the intra-structure optimizing being based on a geometrical model; and
using the abstract address equations in inter-structure optimizing.

21. A program storage device storing instructions that when executed by a computer perform the method comprising:
loading into a compiler execution commands and a definition of at least a first data structure, at least one of the execution commands requiring access to the at least first data structure;
optimizing the storage size of the temporary data in the storage unit required for the execution of the commands with a substantially given execution order, the storage size optimizing including intra-structure optimizing for optimizing an intra-structure storage order at least within the first data structure and the optimizing including calculating a window size for the first data structure, the intra-structure optimizing being based on a geometrical model; and
selecting an intra-structure storage order for at least one data structure which provides the minimum window size of the first data structure, and the at least one data structure has a plurality of dimensions and each dimension may have a storage order in at least one direction and the selecting includes determining upper and lower bounds of the window size for the at least one data structure and for fixing the position in the storage order and the storage order direction of a limited number of the dimensions.

22. A program storage device storing instructions that when executed by a computer perform the method comprising:

loading into a compiler execution commands and a definition of at least a first data structure, at least one of the execution commands requiring access to the at least first data structure; and optimizing the storage size of the temporary data in the storage unit required for the execution of the commands with a substantially given execution order, the storage size optimizing including intra-structure optimizing for optimizing an intra-structure storage order at least within the first data structure and the optimizing including calculating a window size for the first data structure, the intra-structure optimizing being based on a geometrical model, wherein the abstract addresses occupied by the first data structure at each time over a period of time is called the occupied address/time domain of the first data structure and the calculation means is adapted to calculate the maximum distance in address space between two abstract addresses in the occupied address/time domain.

23. An executable computer program, wherein the size of a storage unit for storing temporary data of the computer program was optimized before run-time by the method comprising:

loading into a compiler execution commands and a definition of at least a first data structure used by computer program, at least one of the execution commands requiring access to the at least first data structure; and optimizing the storage size of the temporary data in the storage unit required for the execution of the commands with a substantially given execution order, the optimizing including intra-structure optimizing for optimizing an intra-structure storage order at least within the first data structure and the optimizing including calculating a window size for the first data structure, the intra-structure optimizing being based on a geometrical model, wherein the intra-structure optimizing also includes selecting an at least piecewise affine storage order for the first data structure.

24. An executable computer program, wherein the size of a storage unit for storing temporary data of the computer program was optimized before run-time by the method comprising:

loading into a compiler execution commands and a definition of at least a first data structure used by computer program, at least one of the execution commands requiring access to the at least first data structure; and optimizing the storage size of the temporary data in the storage unit required for the execution of the commands with a substantially given execution order, the optimizing including intra-structure optimizing for optimizing an intra-structure storage order at least within the first data structure and the optimizing including calculating a window size for the first data structure, the intra-structure optimizing being based on a geometrical model, wherein the inter-structure optimizing means includes means for selecting the intra-structure storage order for at least one data structure which provides the minimum window size of the relevant data structure, and the data structures have a plurality of dimensions and each dimension may have a storage order in at least one direction and the selecting means includes means for determining upper and lower bounds of the window size for the relevant data structure and for fixing the position in the storage order and the storage order direction of a limited number of the dimensions.

25. An executable computer program, wherein the size of a storage unit for storing temporary data of the computer program was optimized before run-time by the method comprising:

loading into a compiler execution commands and a definition of at least a first data structure used by computer program, at least one of the execution commands requiring access to the at least first data structure; and optimizing the storage size of the temporary data in the storage unit required for the execution of the commands with a substantially given execution order, the storage size optimizing including intra-structure optimizing for optimizing an intra-structure storage order at least within the first data structure and the optimizing including calculating a window size for the first data structure, the intra-structure optimizing being based on a geometrical model, wherein the first data structure occupies abstract addresses, and the abstract addresses occupied by the first data structure at each time over a period of time is called the occupied address/time domain of the data structure and the calculation means is adapted to calculate the maximum distance in address space between two abstract addresses in the occupied address/time domain.

26. A method for optimizing before run-time the size of a storage unit for storing temporary data, comprising:

loading into a compiler execution commands and a definition of at least a first data structure, at least one of the execution commands requiring access to the at least first data structure; and optimizing the storage size of the temporary data in the storage unit required for the execution of the commands with a substantially given execution order, the storage size optimizing including intra-structure optimizing an intra-structure storage order at least within the first data structure and the optimizing including calculating a window size for the first data structure, the intra-structure optimizing being based on a geometric model.

27. A method for optimizing before run-time the size of a storage unit for storing temporary data, comprising:

loading into a compiler a definition of at least a first data structure and a second data structure and execution commands, at least one of the execution commands requiring access to at least one of the first and second data structures; and optimizing the storage size of the temporary data in the storage unit required for the execution of the commands with a substantially given execution order, the storage size optimizing including inter-structure optimizing which optimizes an inter-structure storage order between the first and second data structures, the inter-structure optimizing being based on a geometric model.

28. A compiler, comprising:

means for loading a definition of at least a first data structure and a second data structure and execution commands, at least one of the execution commands requiring access to at least one of the first and second data structures; and means for reducing the storage size of the temporary data required for the execution of the commands with a substantially given execution order, the reducing means including means for optimizing an inter-structure storage order between the first and second data structures, the inter-structure optimizing means being adapted to carry out the optimization based on a geometrical model.

29. A compiler, comprising:

means for loading execution commands and a definition of at least one data structure, at least one of the execution commands requiring access to at least one data structure; and means for reducing the storage size of the temporary data in the storage unit required for the execution of the commands with a substantially given execution order, the reducing means including intra-structure optimizing means for optimizing an intra-structure storage order at least within the one data structure, the intra-structure optimizing means including means for calculating a window size for the one data structure, the intra-structure optimizing being based on a geometric model.

30. A program storage device storing instructions that when executed by a computer perform the method comprising:

loading into a compiler execution commands and a definition of at least a first data structure, at least one of the execution commands requiring access to the at least first data structure; and optimizing the storage size of the temporary data in the storage unit required for the execution of the commands with a substantially given execution order, the optimizing step including an intra-structure optimizing step for optimizing an intra-structure storage order at least within the first data structure and the optimizing including calculating a window size for the first data structure, the intra-structure optimizing step being based on a geometrical model.

31. An executable computer program, wherein the size of a storage unit for storing temporary data of the computer program was optimized before run-time by the method comprising:

loading into a compiler execution commands and a definition of at least a first data structure used by computer program, at least one of the execution commands requiring access to the at least first data structure; and optimizing the storage size of the temporary data in the storage unit required for the execution of the commands with a substantially given execution order, the optimizing step including an intra-structure optimizing step for optimizing an intra-structure storage order at least within the first data structure and the optimizing including calculating a window size for the first data structure, the intra-structure optimizing step being based on a geometrical model.

* * * * *

UNITED STATES PATENT AND TRADEMARK OFFICE
CERTIFICATE OF CORRECTION

PATENT NO. : 6,078,745
DATED : June 20, 2000
INVENTOR(S) : Eddy De Greef, Francky Catthoor and Hugo De Man It is certified that error appears in the above-identified patent and that said Letters Patent is hereby corrected as shown below:

Assignee: Interuniversitaire Micro-Elektronica Centrum (IMEC vzw), Leuven Belgium
Siemens AG, Munich Germany Signed and Sealed this Seventeenth Day of April, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,078,745
DATED : June 20, 2000
INVENTOR(S) : De Greef, et al.

It is certified that error appears in the above-identified patent and that said Letters Patent is hereby corrected as shown below:

Column 81,
Line 17, please remove the word "inter-stricture" and replace therefor
-- inter-structure --.

Signed and Sealed this

Thirteenth Day of November, 2001

Attest:

NICHOLAS P. GODICI
Attesting Officer
Acting Director of the United States Patent and Trademark Office